(12) United States Patent
Jovancevic

(10) Patent No.: US 9,699,663 B1
(45) Date of Patent: Jul. 4, 2017

(54) SPECTRUM SHARING SYSTEM

(71) Applicant: Kathryn Jovancevic, Fairfax, VA (US)

(72) Inventor: Kathryn Jovancevic, Fairfax, VA (US)

( * ) Notice: Subject to any disclaimer, the term of this patent is extended or adjusted under 35 U.S.C. 154(b) by 0 days.

(21) Appl. No.: 15/049,305

(22) Filed: Feb. 22, 2016

Related U.S. Application Data

(60) Provisional application No. 62/119,081, filed on Feb. 20, 2015.

(51) Int. Cl.
| | | |
|---|---|---|
| H04W 72/00 | (2009.01) |
| H04W 16/14 | (2009.01) |
| H04W 4/02 | (2009.01) |
| H04W 72/04 | (2009.01) |
| H04W 72/10 | (2009.01) |

(52) U.S. Cl.
CPC .......... *H04W 16/14* (2013.01); *H04W 4/021* (2013.01); *H04W 72/0446* (2013.01); *H04W 72/0453* (2013.01); *H04W 72/10* (2013.01)

(58) Field of Classification Search
CPC ..... H04W 16/14; H04W 4/021; H04W 72/10; H04W 72/0453; H04W 72/0446
See application file for complete search history.

(56) References Cited

U.S. PATENT DOCUMENTS

| | | | |
|---|---|---|---|
| 5,963,848 A | 10/1999 | D'Avello | |
| 6,484,145 B1 | 11/2002 | Home et al. | |
| 8,982,831 B2 | 3/2015 | Crowle et al. | |
| 8,995,341 B2 | 3/2015 | Selen et al. | |
| 9,000,971 B2 | 4/2015 | Crowle et al. | |
| 2001/0049281 A1 | 12/2001 | Duplessis et al. | |
| 2002/0155811 A1 | 10/2002 | Prismantas et al. | |
| 2004/0028003 A1* | 2/2004 | Diener et al. | H04L 1/0001 370/319 |
| 2004/0156336 A1* | 8/2004 | McFarland et al. | H04L 1/22 370/329 |
| 2004/0192341 A1 | 9/2004 | Wang et al. | |
| 2008/0069079 A1 | 3/2008 | Jacobs | |
| 2008/0112359 A1 | 5/2008 | Cleveland et al. | |
| 2012/0135772 A1* | 5/2012 | Demessie et al. | H04W 16/14 455/511 |
| 2013/0029706 A1 | 1/2013 | Sachs et al. | |
| 2014/0237547 A1* | 8/2014 | Bose | H04W 16/14 726/3 |
| 2014/0313910 A1 | 10/2014 | Appleton | |
| 2015/0036509 A1* | 2/2015 | Lopes et al. | H04W 16/10 370/241.1 |

(Continued)

*Primary Examiner* — Ricky Ngo
*Assistant Examiner* — Lan Huong Truong
(74) *Attorney, Agent, or Firm* — Richard C. Litman

(57) ABSTRACT

A Spectrum Sharing System (SSS) is a system and method which allows Radio Frequency (RF) wireless mobile and fixed devices to operate in the 3100-3650 MHz frequency band while simultaneously protecting radar operations from interference. The SSS includes equipment which utilizes spectrum sensing, GPS data, and database technology to provide a solution by which mobile and fixed wireless devices can be allowed use of the 3100-3650 MHz frequency band and share same spectrum with radar systems. The spectrum sharing action is only possible when radar emissions are not detected within the licensed service in the 3100-3650 MHz spectrum, and SSS has determined that geographical area of interest is not occupied by radar systems.

20 Claims, 23 Drawing Sheets

SSS TO SSS COMMUNICATIONS

(56) References Cited

U.S. PATENT DOCUMENTS

| | | |
|---|---|---|
| 2015/0042505 A1* | 2/2015 | Hope ........................ G01S 5/06 |
| | | 342/41 |
| 2015/0098397 A1* | 4/2015 | Damnjanovic |
| | | et al. .................... H04W 74/08 |
| | | 370/329 |
| 2015/0181601 A1 | 6/2015 | Schmidt et al. |
| 2015/0245374 A1* | 8/2015 | Mitola, III et al. .... G06Q 30/08 |
| | | 370/329 |
| 2015/0289265 A1 | 10/2015 | Gormley et al. |
| 2015/0373554 A1* | 12/2015 | Freda et al. .......... H04W 16/14 |
| | | 455/450 |
| 2016/0077134 A1* | 3/2016 | Rezk et al. ............. G01S 7/021 |
| | | 324/76.39 |
| 2016/0212624 A1* | 7/2016 | Mueck et al. .... G06F 17/30545 |

* cited by examiner

SSS TO SSS COMMUNICATIONS

Examples of radar protection zones that can be constructed and generated by the geo location information.

Fig 3.
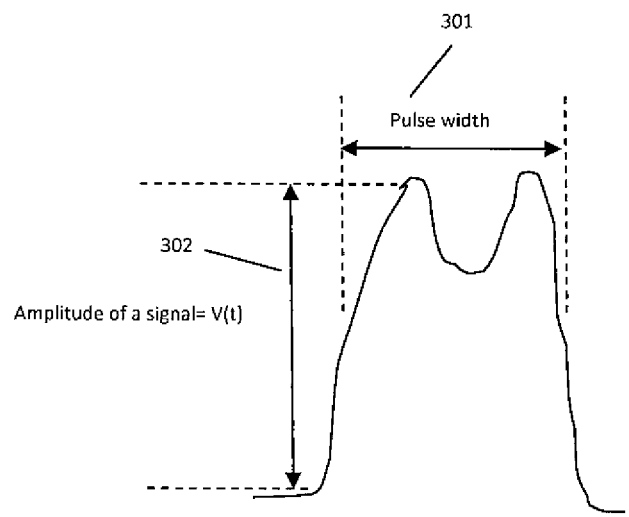
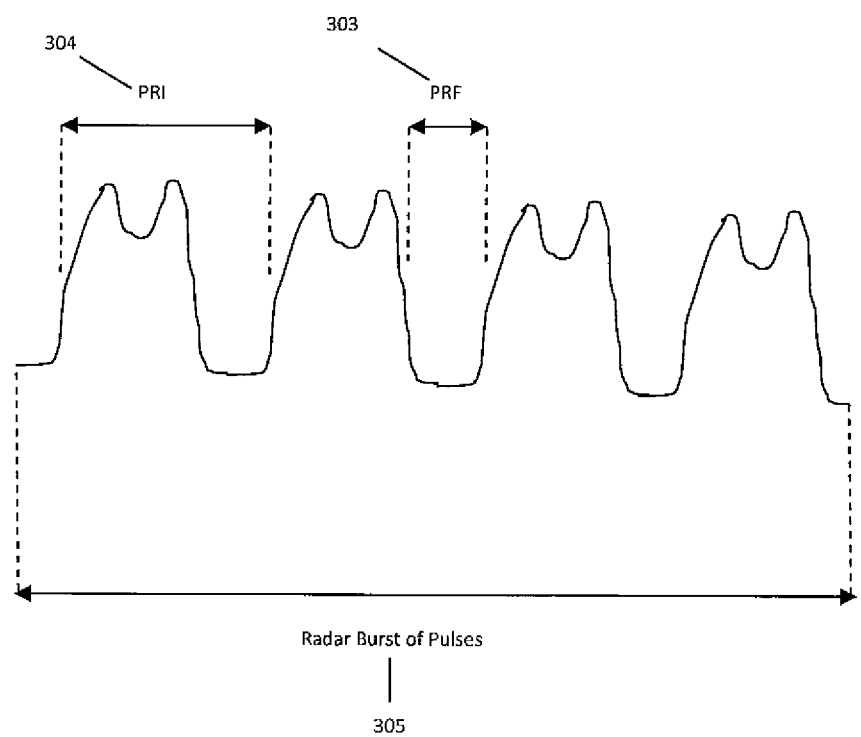

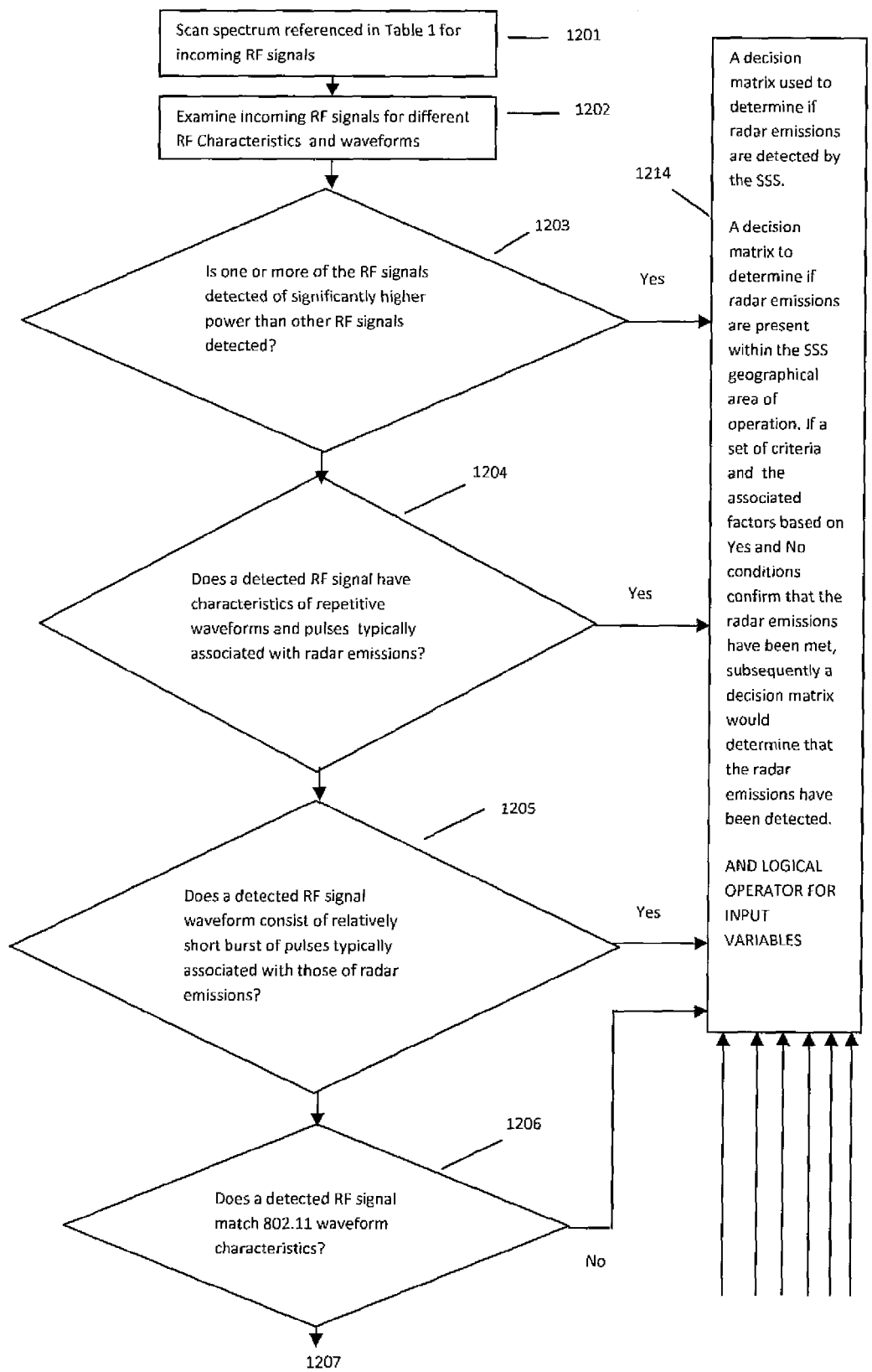

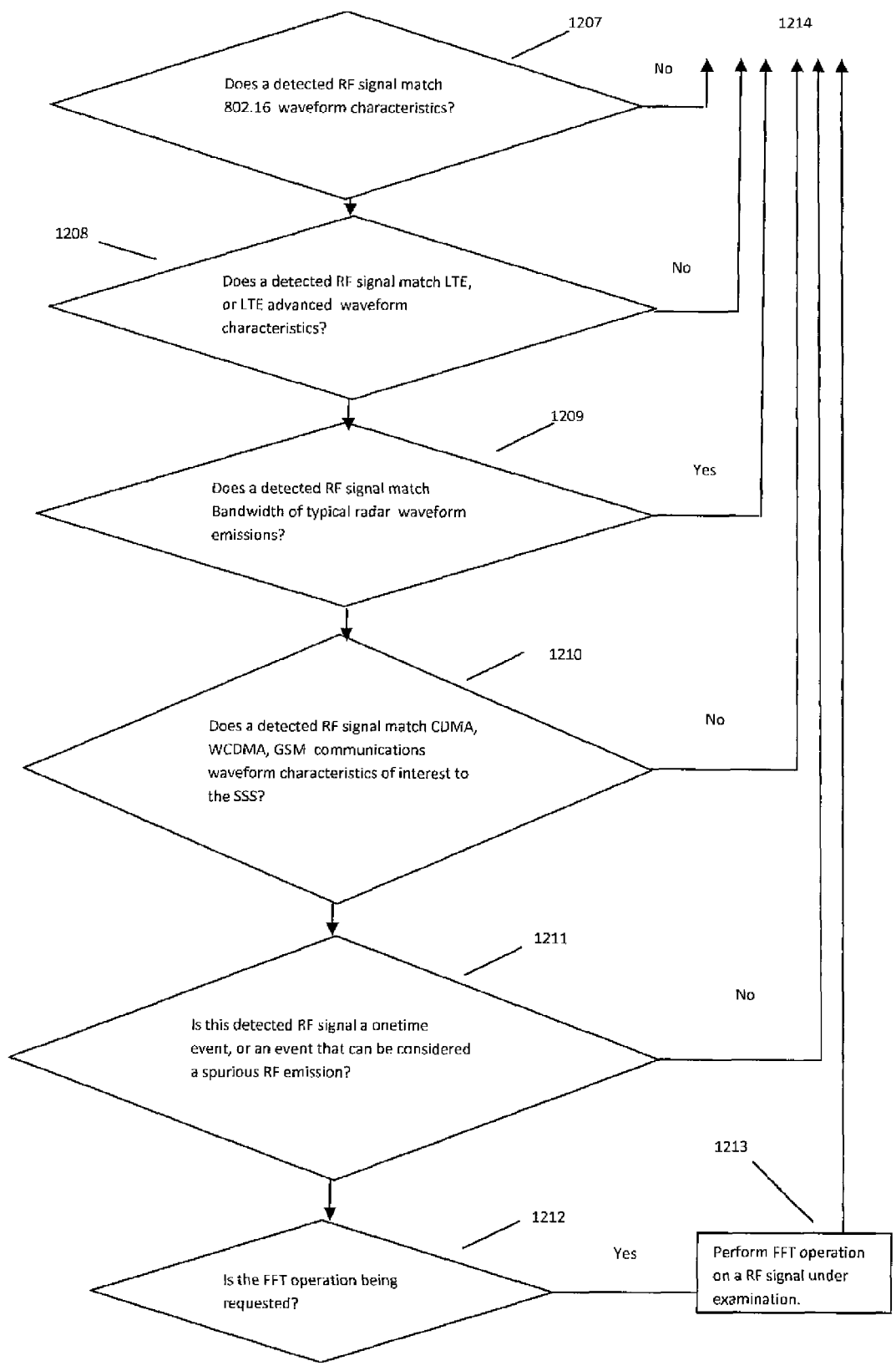

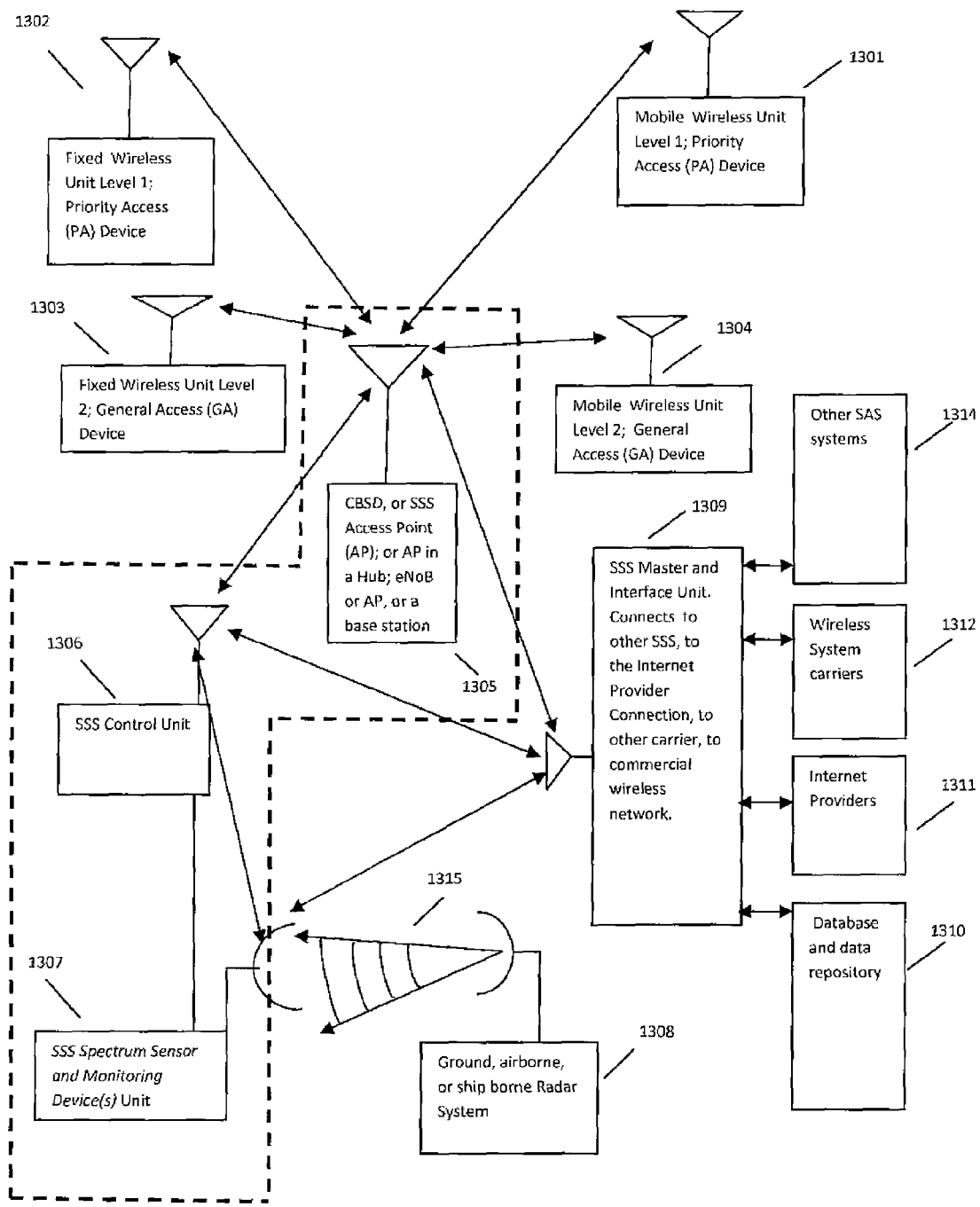
Fig. 13B CBSD/AP/CBSD/Hub unit has spectrum sensing capability; dashed lines depict functionality built/integrated into one unit/enclosure.

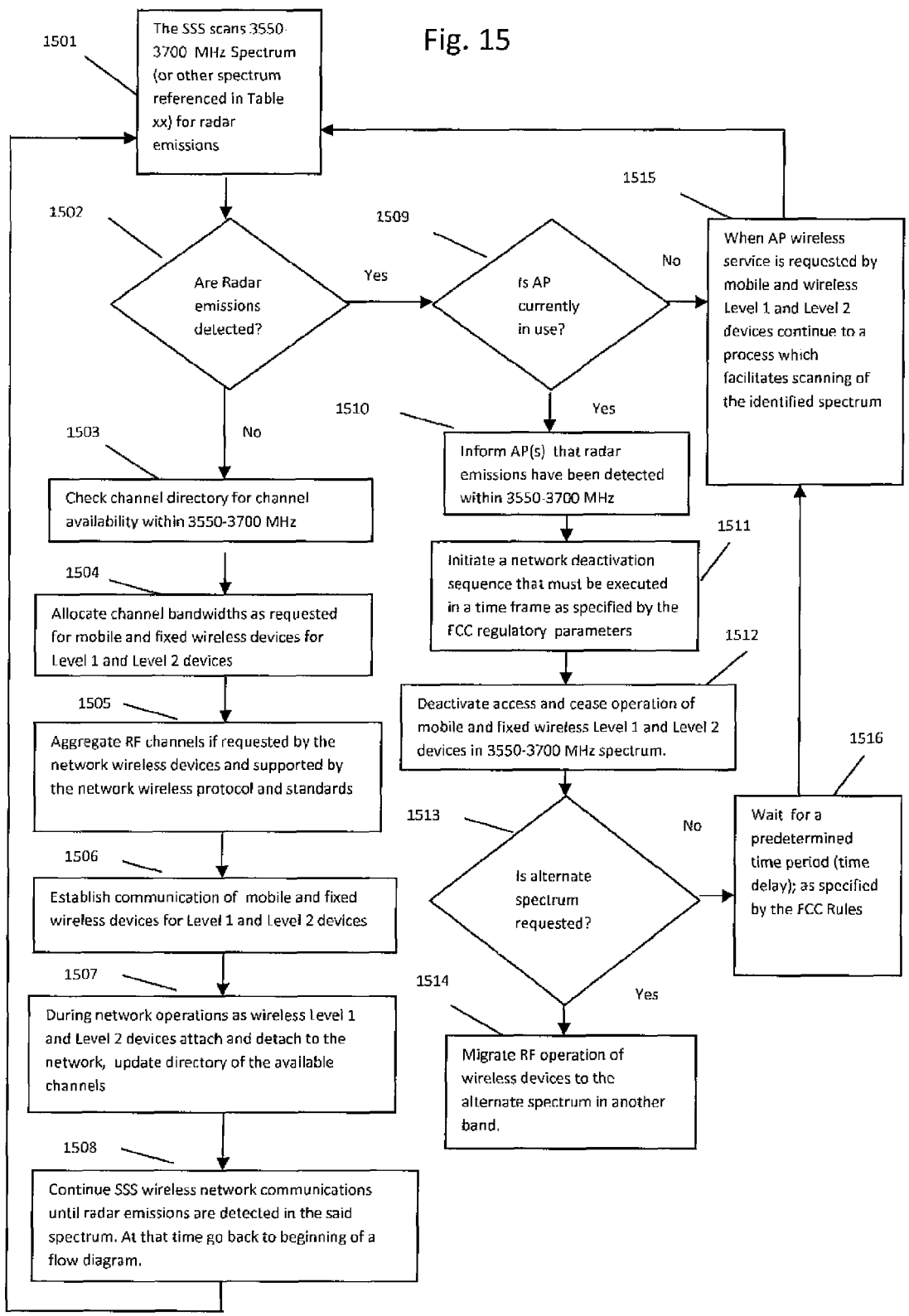

Each cross depicts a unique Lat/Long for each CBSD and ESC 1601 device
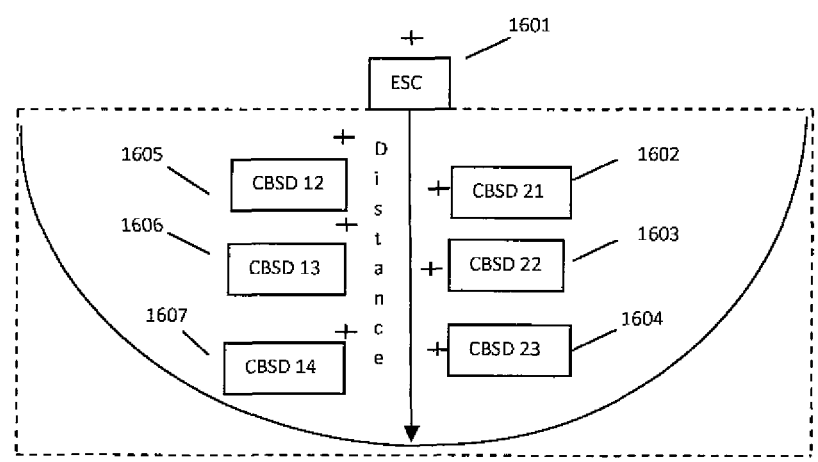
Figure 16. A geographic protection zone depicted as a semi circle with CBSD units.

Fig. 17A FLOW CHART FOR A METHOD TO CALCULATE WHICH CBSD UNITS CAN REMAIN OPERATIONAL UPON DETECTION
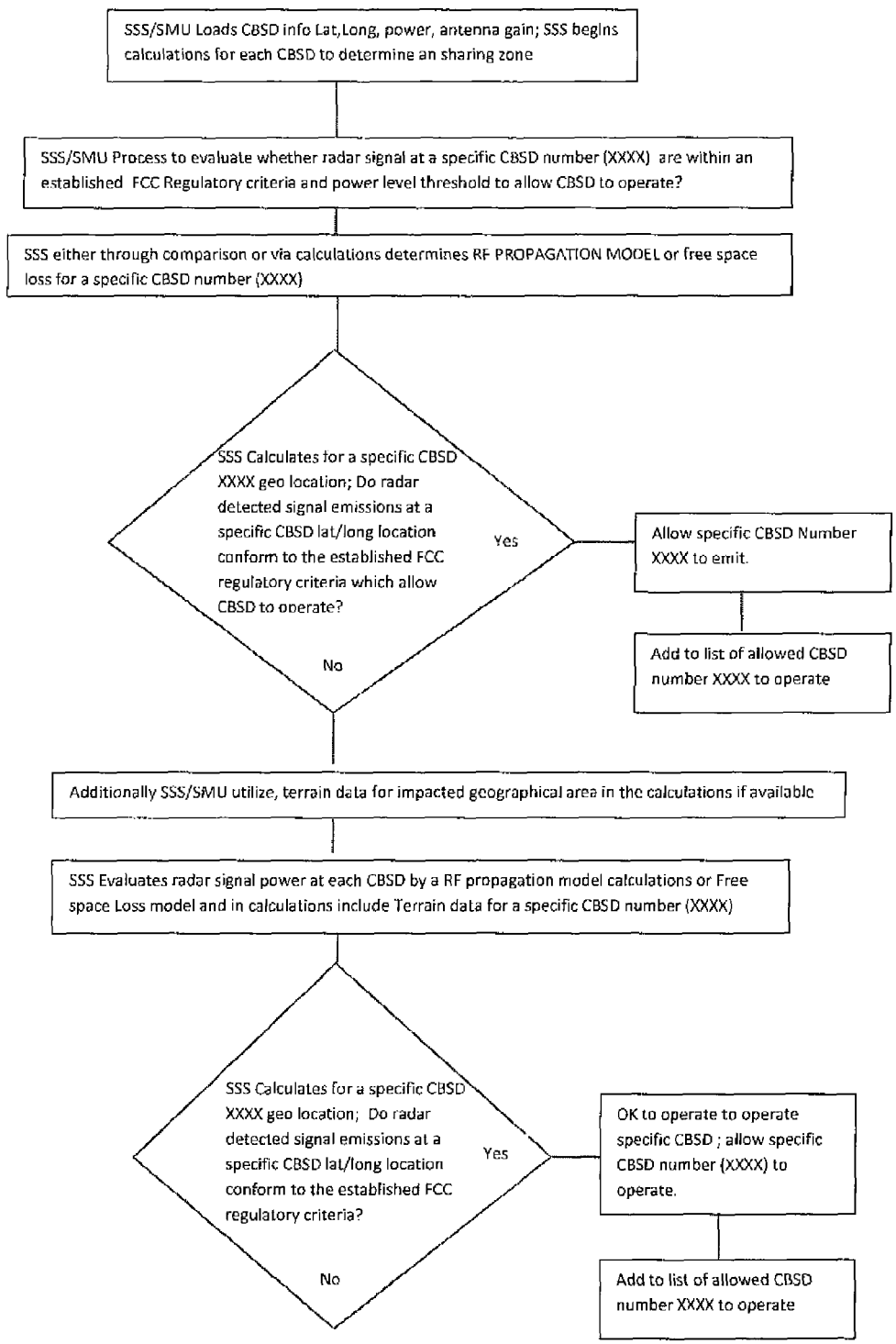

Figure 18 Depiction of CBSD units, CBSD lat/long locations and their distances separations with ESC
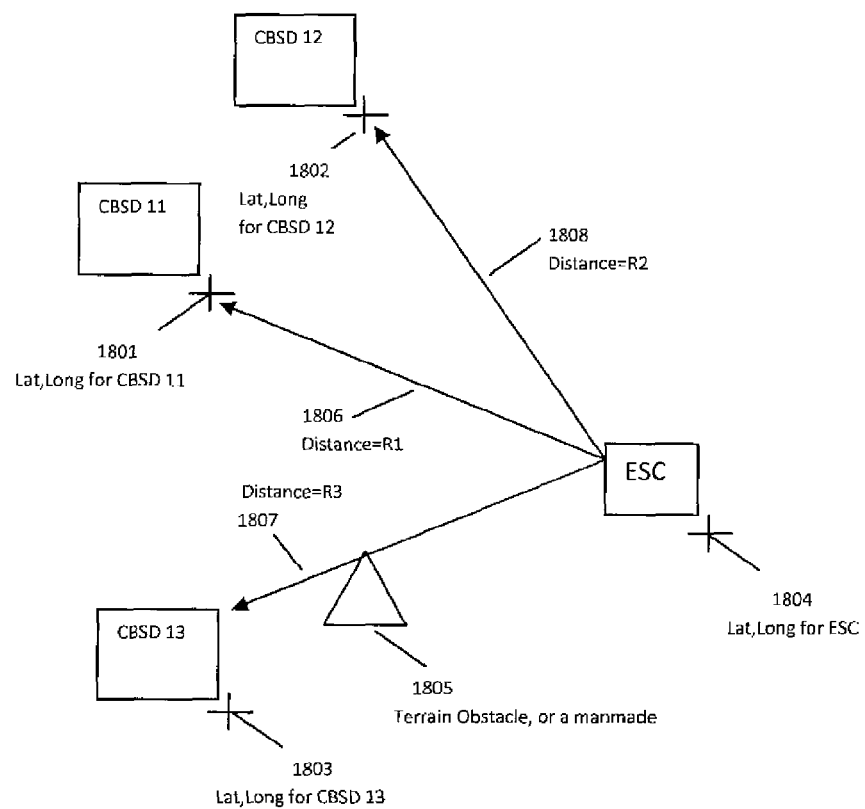

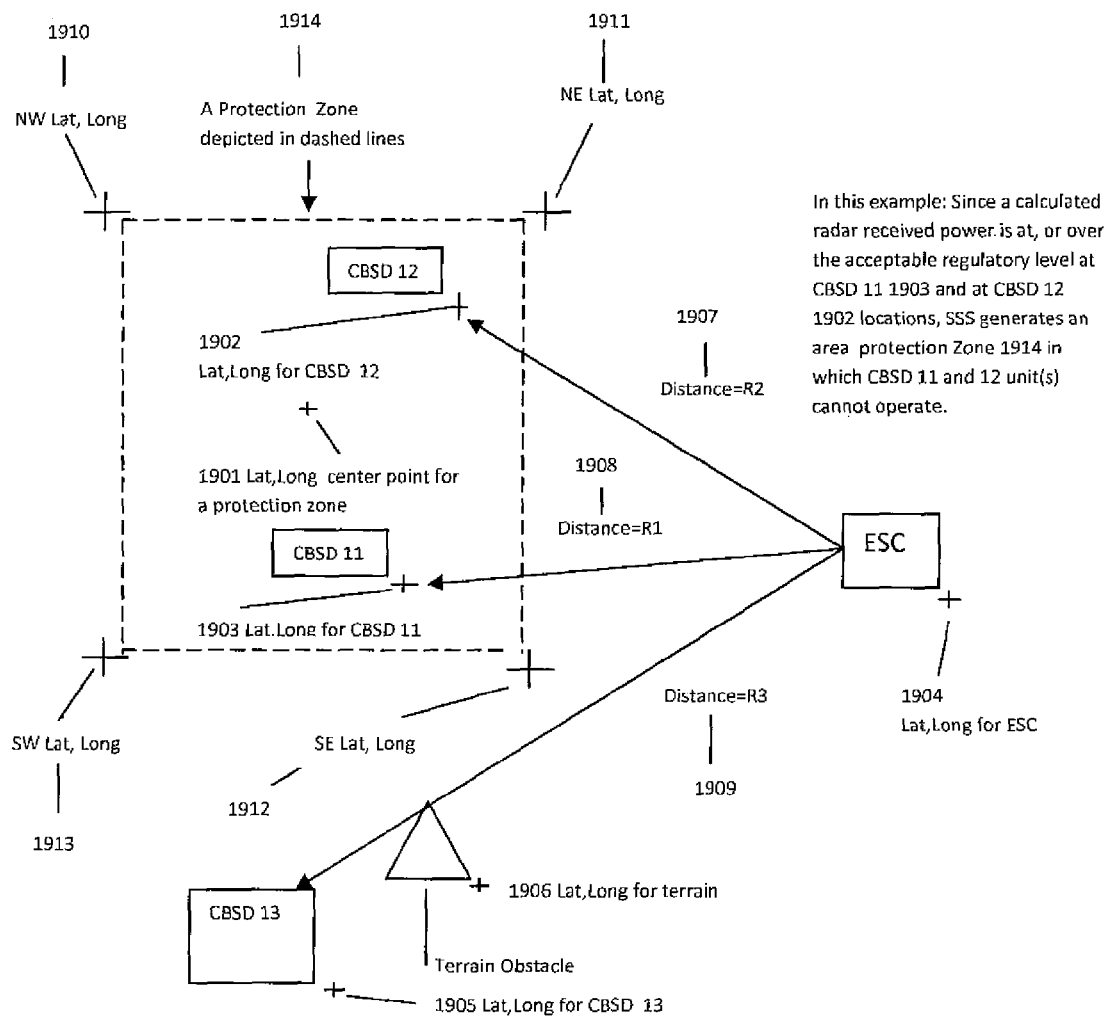
Figure 19. Depiction of Geographic Protection zone with two CBSD units inside the zone

SPECTRUM SHARING SYSTEM

CROSS-REFERENCE TO RELATED APPLICATIONS

The present application claims the benefit of U.S. Provisional Application No. 62/119,081, filed Feb. 20, 2015, which is incorporated by reference herein for all purposes.

BACKGROUND OF THE INVENTION

Field of the Invention

The present invention relates to a Spectrum Sharing System (SSS) and method which allows Radio Frequency (RF) wireless mobile and fixed devices to operate in the 3100-3650 MHz frequency band while simultaneously protecting radar operations from interference. The SSS includes equipment which utilizes spectrum sensing, GPS data, and database technology to provide a solution by which mobile and fixed wireless devices can be allowed use of the 3100-3650 MHz frequency band and share same spectrum with radar systems. The spectrum sharing action is only possible when radar emissions are not detected within the licensed service in the 3100-3650 MHz spectrum, and SSS has determined that geographical area of interest is not occupied by radar systems.

Description of the Related Art

Due to an extremely high demand for additional radio communication spectrum that could provide service to mobile and fixed wireless communication devices, new methods and systems are needed to provide technical solutions and to accommodate the spectrum expansion. The FCC is in process of creating additional regulations for Part 96 in order to reallocate licensed spectrum within 3100-3650 MHz that was traditionally utilized for radar operations. Spectrum that is used by radar systems is referenced to as RADIOLOCATION spectrum, and radar operations allocated for radar operations are referred to as a "type of service". The evolving FCC regulations would ensure that reallocated spectrum would have to continue to serve the primary and existing radar spectrum users, but also to accommodate new communication capability for mobile and fixed wireless devices within the same spectrum.

The spectrum discussed in this patent would be allocated for both (radar) RADIOLOCATION and FIXED and MOBILE on co-primary basis. The FIXED and MOBILE would be represented by commercial wireless devices such as mobile cell/smart phones, mobile communication devices, or fixed or stationary wireless data communication devices. The regulatory statute may, or may not provide details how systems design should be accomplished, or implemented. Never the less the 3.5 GHz FCC Notice of Proposed Rulemaking (NPRM) and FCC Report and Order draft rules specify that wireless mobile and fixed devices should cease their operations if presence of radar systems has been detected within a certain timeframe. The detection of a radar signal could be accomplished either via spectrum sensing means, or via sensing and RF propagation calculations. Once a radar signal was detected, the SSS and certain SSS elements would take action to deactivate CBSD units which could cause interference to an incumbent radar system. Via an internal process, the SSS would determine geographical areas in which CBSD units could cause interference to the incumbent radar systems. The geographical areas in which CBSD devices are not allowed to operate are referenced as protection/sharing zones in this patent. The SSS would create geographical protection zones in which CBSD units would be deactivated for a certain period of time. In the evolving spectrum environment, the mobile and fixed wireless devices would have to protect radar systems from interference that could originate from mobile and fixed wireless devices Radio Frequency (RF) emissions. The spectrum sharing, between primary spectrum users which are radar systems and mobile wireless network devices as well as fixed wireless network devices, in the impacted spectrum would be implemented via a system method that in this patent is called the Spectrum Sharing System (SSS).

Protocols, Standards, and waveforms used to facilitate and to support communications, data communications and data throughput by the Spectrum Sharing System network and mobile as well as fixed wireless (Level 1 and Level 2) devices referenced in this patent are listed in. Also ability by the wireless devices referenced in this patent to access spectrum and frequency bands listed in this patent and supported by protocols and includes following standards but not limited to: LTE; LTE Advanced; 3 GPP; WiMax 802.16, 3G, 2G, Mobile and Fixed Wireless Devices in this patent are also referred to as End user data communication devices and are also segregated into as Level 1 wireless devices and Level 2 wireless devices in this embodiment for 3550-3650 MHz frequency band.

Level 1 wireless device also called Priority Access Device has a higher regulatory standing over Level 2 wireless device also called General Access Device. Level 1 wireless device must be protected from interference that would be generated by Level 2 wireless device(s).

Level 2 wireless devices also called General Access Device has a lower regulatory priority than Level 1 wireless device also called Priority Access device. Level 2 must not cause interference to Level 1 wireless device(s). Level 2 wireless devices must take corrective steps to mitigate interference it caused to Level 1 wireless device(s).

Terminology and Nomenclatures Explained:

SSS: Spectrum Sharing System is a system which is comprised of a number of main elements and includes CBSD, Spectrum Sensor also referred to as Environmental Sensing Capability, and End Users. The SSS has information of lat/long of each CBSD units within its domain. The SSS ensures that CBSD units take appropriate actions and that spectrum regulatory framework is followed and enforced per FCC Rules and regulations. Upon determination that radar signal has been detected within its geographic domain, SSS will establish dynamic protection zones so that CBSD and End User devices do not interfere with radar operations in the said spectrum.

Dynamic Protection/sharing Zones: In this embodiment protection zones are also referred to or also called protection/sharing zones. Protection zones may also be called or referred to as geographic protection zones in this patent. Protection zones are Geographical Areas depicted and identified by a set of multiple Latitude and Longitude points in which CBSD and, or End User devices are not allowed to operate for a certain period of time and while radar emissions are being detected by the spectrum sensor, also called the environmental spectrum sensor (ESC).

CBSD Devices: Citizens Broadband Radio System (CBSD) RF wireless devices which serve as Hubs, Access Points, within said spectrum and can support and provide communications to the End User devices. CBSD are GPS enabled devices which communicate with SSS. Once notified that radar signal has been detected, CBSD disables communication channels with end users within N*60 seconds time frame. In certain configurations CBSD may, or can possess spectrum sensing, or environmental sensing capability. (N can be a number 1-5, integer or numeric and can represent decimal numbers).

Spectrum Sensor, or also called or referred to as an Environmental Spectrum Sensor: A RF device which detects radar signals and differentiates between communication signals and radar signals. The same device informs SSS and CBSD units that a radar signal has been detected within the SSS geographic domain. In certain configurations the spectrum sensor can be an independent, stand-alone device, or in a separate network configuration the spectrum sensing capability also referred to as the spectrum sensing capability can be integrated into the CBSD units. The spectrum sensor can also be disposed directly within the wireless or end user devices. That is, these latter devices will be designed to operate in a shared spectrum system with a radar system in the 3100-3650 MHz spectrum.

End User Devices: RF Wireless devices used by consumers for voice and broadband digital/data communications. The End User Devices will deactivate per commands issued by CBSD devices, Free Space Loss Equation: An equation which establishes RF signal loss by utilizing RF signal frequency in MHz, and distance the RF signal travels in meters, or kilometers.

RF Propagation Models and Path Loss equations: Equations and RF propagation models used by RF engineering community to calculate RF signal loss as the RF signal travels from one point to another point on the face of the earth. Such RF models may include terrain and clutter losses caused by terrain such as mountains, hills, clutter or even manmade obstacles.

dBm or decibel-milliwatt—dBm is an abbreviation for the power ratio in decibels (dB) of the measured power referenced to one milliwatt (mW).

dBW or decibel watt—a unit of power in decibel scale referenced to one watt (W). Watt (abbreviated W)—the International System of Units' (SI) standard unit of power (energy per unit time), the equivalent of one joule per second. The watt is used to specify the rate at which electrical energy is dissipated, or the rate at which electromagnetic energy is radiated, absorbed, or dissipated.

RF—Radio Frequency
MHz is Megahertz
Latitude also abbreviated as Lat in this patent.
Longitude also abbreviated as Long, or Lng.
ESC=Environmental sensing capability; also called and referred to as the spectrum sensor in this patent.
PA (Priority Access)=Level 1 End User Wireless Device.
GA (General Access)=Level 2 End User Wireless Device
Protection zones: also referred to as protection/sharing zones and also referred to as geographic protection zones. Protection Zones are in geographical areas in which CBSD units are not allowed to provide communications to the wireless end users after radar signals have been detected. The CBSD units within geographic protection zones are prevented from providing communication services to the PA and GA wireless users for as long as radar signals are being detected, and potentially for a certain period of time after radar emissions cease to be detected.

These demanding features may require wide bandwidth operation or covering operation across several frequency bands. This provides motivation for comprehensive and efficient utilization of the available spectrum. The effort to overcome inefficient and highly underutilized spectrum resources has led to concept of cognitive radio (CR). A CR system is based on structural design of software-defined radio intended to enhance spectrum utilization efficiency by interacting with the operating environment. A CR-based system must be aware of its environment by sensing spectrum usage and have the capability to switch over the operating points among different unoccupied frequency bands. A CR-based system may cover various features, including sensing the spectrum of nearby devices, switching between different frequency bands, and power level adjustment of transmitting antennas.

SUMMARY OF THE INVENTION

The spectrum sharing system (SSS) is a network system that provides Radio Frequency (RF) wireless communication for mobile, fixed wireless devices and radar within licensed service in the spectrum previously allocated for radar use. Via an internal mechanism, the SSS has the ability to determine which CBSD units would cause interference to the incumbent radar system. When the CBSD units, located within a geographic area, have been identified by the SSS as potential interferers to radar systems, these CBSD units would be grouped together and SSS would formulate protection zone(s) which would enclose identified CBSD device group(s). The CBSD units within the protection zone could be turned on and off via commands issued by the SSS. Upon removal of a radar system from the SSS environment, and when the SSS no longer detects a radar signal within its geographical area, the SSS would take action to decompose, remove, or to dissolve the protection zone and SSS would reestablish functionality of CBSD units which had been located within the protection zone(s). Depending on geography, topography and on location of a radar, or radars, it is possible for the SSS to have more than one protection zone in its domain. Each SSS protection zone may contain multiple CBSD units.

In one embodiment the SSS is used to facilitate spectrum sharing for the licensed service. Licensed service, versus an unlicensed service, is such that regulators in the U.S. have planned to implement such a technological solution for spectrum congestion within borders of United States. While the SSS methodology could be used to provide spectrum sharing even for unlicensed Part 15 devices, in one embodiment the SSS provides spectrum sharing between incumbent government radar, CBSD devices and licensed service for wireless devices. The spectrum to support communication services is made available by the SSS to wireless mobile and fixed devices when radar emissions have not been detected by the wireless network in the geographical area of coverage, and within the licensed service within the 3100-3650 MHz frequency band. In this embodiment the SSS is used to facilitate spectrum sharing for the licensed service. While the SSS methodology could be used to provide spectrum sharing even for unlicensed Part 15 devices, in this embodiment the SSS provides spectrum sharing between incumbent government radar and licensed end user devices. Providing radar emissions, and presence of radar systems have been detected in the 3100-3650 MHz and in the geographical area of coverage, then the SSS would not provide communications services to wireless devices in the protection zones as determined by the SSS network. As long as radar emissions are present and are detectable by the SSS, the SSS would not provide communication services to wireless mobile and fixed devices located in the protection zone(s). Once radar emissions are no longer detected by the SSS, the SSS would at that time provide communication services to the mobile and fixed devices within the 3100-3650 MHz frequency band, and within the SSS geographical area of coverage.

The SSS and its certain elements (called or referred to as Citizen Broadband Radio System Device (CBSD)), and Environmental Sensor (ESC) would be equipped with Global Positioning System (GPS) and SSS would possess geo location data such as latitude and longitude for certain of its elements. The SSS would have knowledge of its area of operations and its territorial geo location domain.

A Sequence of Events and Associated Steps to be Carried Out by SSS Upon Radar Detection 1) Radar Signal Detection is accomplished by the Environmental Sensor (ESC), or by the CBSD capable of spectrum sensing, or by both ESC and CBSD depending on functional configuration; 2) SSS performs identification which CBSD(s) would interfere with incumbent radar via signal measurement or via propagation calculations, or via both measurements and calculations; 3) CBSD devices are instructed to shut down and to discontinue service to end users during N*60 second time period and SSS creates Protection Zones around potentially interfering CBSD devices; 4) SSS create a list of PA and GA devices which are under control of CBSD devices in the protection zones and operate in the impacted spectrum; Those PA and GA wireless devices are to be transferred to alternate frequency within impacted spectrum, or to an alternate frequency bands; 5) Carry out transfer of CBSD/PA/GA to alternate available frequencies within the existing band; 6) If CBSD/PA/GA cannot be accommodated in the existing frequency band, carry out transfer of CBSD/PA/GA devices to other frequency bands.

By use of these two approaches which are: 1) the spectrum sensing, and 2) the spectrum sensing combined with RF propagation calculations, the SSS is able to provide the access to spectrum, or to deny spectrum access to the mobile and fixed wireless devices within its network domain. As radars systems move in and out of the 3100-3650 MHz spectrum, and in and out of geographical areas covered by SSS, the SSS creates and also decomposes/dissolves protection zones in which CBSD devices exist and operate. In that capacity the SSS serves as a dynamic switching function in time. The efficiency of the 3100-3650 MHz spectrum would increase since it would be shared between radar systems and mobile and fixed wireless devices. The network switching and the spectrum sharing function is accomplished by the SSS either providing communication channels and communications services in the said spectrum to the mobile and fixed wireless devices, or the SSS would generate protection zone(s) in which the SSS would deny access to the CBSD devices and to their channels in the said spectrum and would deny the communication services within the said spectrum.

The core elements within the SSS wireless network are: Spectrum Sensor Units, Spectrum Control Units, Spectrum Master Unit, Citizen Broadband Radio Devices (CBSD) which function as: Wireless hubs, Access Points (AP), base stations, eNoB. These SSS core elements would provide communication channels and services to its end users which are wireless mobile and fixed wireless devices. The SSS has the functionality and capability to provide and support networking wireless communication via various communication protocols listed. The SSS sends data information about radar signal detections to AP, base stations, eNoB, wireless hubs devices within its network, and under certain conditions denies communication services to the end users.

The SSS has a capability to exchange data, which includes protection/sharing zone data with other SSS systems in other, and or adjacent geographical areas. Since many SSS networks will exist in different geographical areas within a country, each SSS network will have access to the 3100-3650 MHz database with protection/sharing zone data. In this embodiment when we make a reference to a protection zone, it is synonymous with protection/sharing zone reference. As radar systems move in and out of different geographical areas, the SSS systems provide updates to a database with latest protection zone locations within SSS service area(s). The creation and decomposition of protection zones which include service to specific CBSD devices and end user devices through different geographical areas becomes information that different SSS systems could share with each other via access to the database.

The end user devices would consist of mobile and fixed wireless communication devices also referenced as Priority Access also known as Level 1 devices and General Access also known as Level 2 devices in this patent. Mobile and fixed wireless devices are consumer communication devices and also reference as the end user devices. The end user devices within the SSS would also be subdivided into two categories of users: Level 1 users which would have a priority spectrum access over Level 2 users. The SSS has to ensure that both Level 1 and Level 2 devices and their RF emissions do not cause interference to the radar systems detected by SSS within the 3100-3650 MHz spectrum and in the geographical area serviced by SSS. Also, Level 2 devices have to ensure that their RF signal emissions do not interfere with Level 1 device operation. The radar system protection would be achieved through SSS ceasing operation on certain frequencies with all or a certain number of its end users within SSS network domain. This type of protection for radar operations would be achieved through the use of the SSS. The FCC Rules allow mobile and fixed wireless devices to access spectrum in the 3100-3650 MHz frequency band via use of the SSS. The SSS control signals exchanged between SCU, SMU, AP, base stations, eNoB, and wireless hubs allow mobile and fixed end user devices access to the 3100-3650 MHz spectrum. The SSS utility and methodology outlined in this patent, which is applied to 3100-3650 MHz frequency band could, also be extended and applied to other radar frequency bands. Radar in other frequency bands could also be shared with other type of services, providing the future FCC rules and future regulatory regime could facilitate sharing between radar systems, and mobile wireless devices, as well as, fixed wireless devices. The mobile and fixed devices are communication devices for the end user in a frequency band that have not been used for this type of service previously. The mobile and fixed end user devices have ability to transmit and to receive data within 3100-3650 MHz frequency band, via multiple communication protocols. The mobile and fixed end users could also utilize future communication protocols which would make use of 3100-3650 MHz frequency band for wireless communications would also be included. The same SSS methodology could also be applicable to other frequency bands. The mobile and fixed devices are able to request access and to use channels of variable bandwidths such as, but not limited to: 1 MHz, 5 MHz, 10 MHz, 20 MHz, 40 MHz, and 80 MHz within the 3100-3650 MHz frequency band.

Through its switching and dynamic function, the spectrum efficiency would increase drastically since the spectrum sharing system (SSS) would allow for different type of RF services such as fixed as well as mobile wireless systems and radar systems to successfully share and to access the 3100-3650 MHz spectrum. In this embodiment a reference to a spectrum sensor is synonymous with a reference to an Environmental Sensor, The utility and methodology for the SSS outlined in this patent could be applied to other frequency bands. The SSS would facilitate spectrum sharing and enable interference mitigation by sensing of the spectral environment and via a control mechanism of mobile and fixed wireless devices through the networking means. Currently the FCC Rules 96 do not specify a signal threshold in watts, or dBm at which the spectrum sensor or the environmental sensor has to detect radar signals within a geographical area covered or encompassed by the SSS network. The SSS spectrum sensing function and certain SSS network elements would incorporate threshold values for detection of radar signals, as well as their associated characteristics, and values providing that such thresholds, characteristics and values are specified by the future FCC rules for the 3100-3650 MHz frequency band. The SSS functionality incorporates a N* 60 second time period by which SSS network has to stop its transmissions and operation on impacted frequencies within 3100-3650 MHz frequency band upon detection of radar transmissions. This patent incorporates a time period of N*60 seconds (60-300 seconds) where N=is a number 1 to 5 (and n can be a decimal, fractional, or an integer number) during which SSS would stop network transmissions as specified by the regulatory FCC rules. Additionally, SSS and SSS elements would incorporate threshold values for interference to radar systems providing that such threshold values are specified by the future FCC rules. The SSS would incorporates FCC regulatory values and regulatory thresholds into its functionality either in hardware, or software, or by combination of software and hardware in order to control traffic flow within its network by making use of these regulatory values and thresholds. The FCC regulatory threshold, parameters, and values would be incorporated into the SSS capability and into the SSS elements, providing such applicable FCC Rules exist and are in effect for the 3100-3650 MHz frequency band.

The SSS would have access to data repository or a database of known protection zones areas within the United States, or portions of the United States. The SSS would also have Global Positioning System (GPS) capability and would have position location data for certain elements such as CBSD units. The database would be periodically updated with the latest information available of the known protection zone(s) within a certain geographical area. These protection zones are variable in size and even in shape. The protection zones will also move as the radar signals move or change. The SSS would perform a comparison between allowed areas of operations and locations of CBSD SSS elements. In geographical areas where radar systems operate the SSS would create protection zones in which CBSD operation would not be allowed within the 3100-3650 MHz frequency band. By denying operation to CBSD devices, also the PA and GA devices could not be operational within the impacted spectrum. The most up to date information about protection zone(s) areas would be contained in the database. Such a database content could be available to the wireless carriers via either an internet capability, or via access to the database information by some other wired or wireless means.

These and other features of the present invention will become readily apparent upon further review of the following specification and drawings.

BRIEF DESCRIPTION OF THE DRAWINGS

FIG. 3. Depicts characteristics of a RF pulse, and a burst, or a sequence of radar pulses.

FIGS. 12 A-B. Depict a matrix with qualifying criteria for identification of a radar signal.

FIG. 13B. Depicts SSS architecture with spectrum sensor 1307 functionality and spectrum controller 1306 functionality integrated into a single unit such as CBSD 1305 /Ap/ or Hub.

FIG. 15. Depicts a flow diagram for the SSS system.

FIG. 16. Depicts a graphical representation of a geographic protection zone via a semicircle.

FIGS. 17A and 17B. Depict a flow chart for a method to calculate which wireless units can remain operational upon detection of radar signals.

FIG. 18. Depicts wireless devices at latitudinal and longitudinal locations and the distances of separation to spectrum sensors.

FIG. 19 depicts a geographic protection zone with a plurality of wireless devices within the zone.

Similar reference characters denote corresponding features consistently throughout the attached drawings.

DETAILED DESCRIPTION OF THE PREFERRED EMBODIMENTS

In order to facilitate data communications a Spectrum Sharing System (SSS) wireless network controls operations within the licensed 3100-3650 MHz frequency band, the SSS wireless network protects radar operation from interference that could originate from network mobile and fixed wireless devices. The SSS protects radar operations via spectrum sensing and by detecting radar signals within the SSS network domain and geographical coverage of its network domain. The SSS generates protection zones in which identified CBSD units will have to suspend their operations. The same SSS network ensures that its wireless users are segregated in two Levels, namely Level 1 and Level 2 wireless users. The Priority Access (Level 1) wireless users have a higher priority than General Access (Level 2) wireless users within 3100-3650 MHz frequency band. As such, Level 1 users are preferred wireless users, have a higher regulatory standing than Level 2 users, and have to be protected from any interference that Level 2 users may cause. Both Level 1 and Level 2 mobile and fixed SSS users have to protect radar systems from interference that either Level 1, or Level 2, users may cause to radar systems. Recognition methods of radar emissions are discussed at length throughout this patent. The mobile and fixed wireless devices, also referred to as Priority Access (Level 1) and General Access (Level 2) wireless devices, within the SSS network would receive control signals that would allow fixed and wireless devices to utilize 3550-3650 MHz frequency band for telecommunications and broadband purposes. The mobile and fixed wireless devices will be able to access spectrum in 3100-3650 MHz frequency band that under previous FCC regulatory framework, which existed prior to 2015 time frame, could not access nor use for mobile and fixed communication purposes. The mobile and fixed devices are communication devices for the end user in a 3100-3650 MHz frequency band that have not been used for this type of service previously. The mobile and fixed end user devices have ability to transmit and to receive data within 3100-3650 MHz frequency band, via multiple communication protocols listed. The mobile and fixed devices are able to request access and may be use channels of variable bandwidths such as, but not limited to: 1 MHz, 5 MHz, 10 MHz, 20 MHz, 40 MHz, and 80 MHz within the 3100-3650 MHz frequency band.

Figure 1:
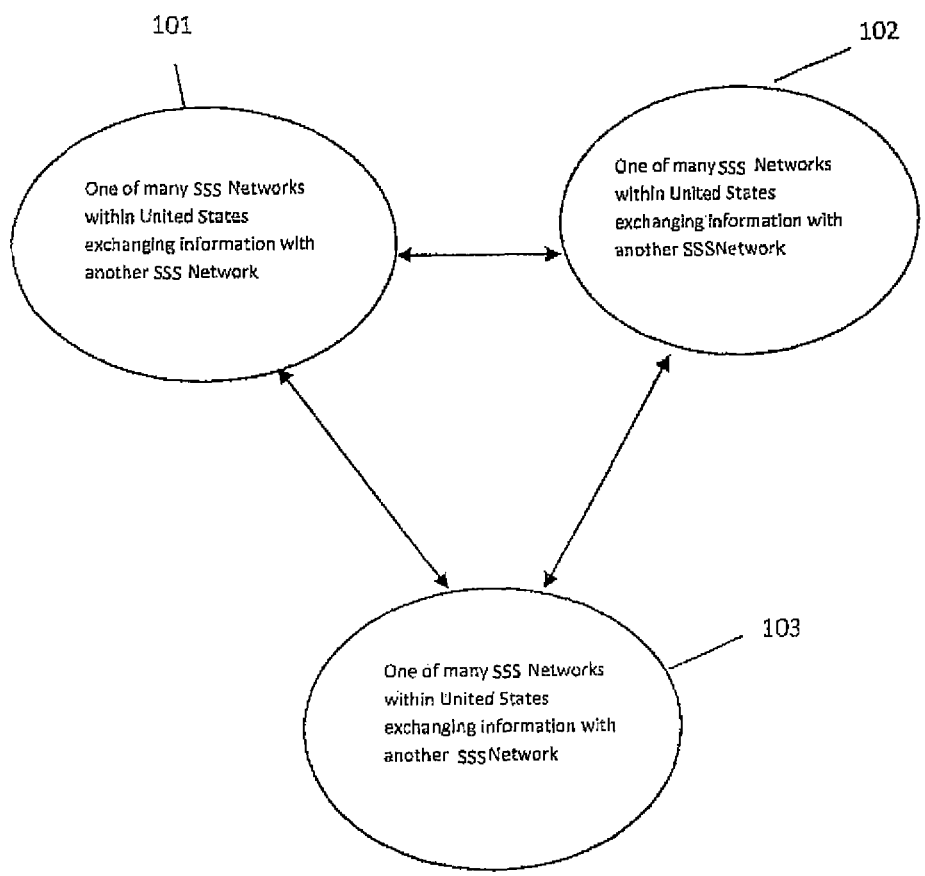
FIG. 1. Depicts different three different Spectrum Sharing Systems (SSS), and their ability to exchange data.
Figure 2:
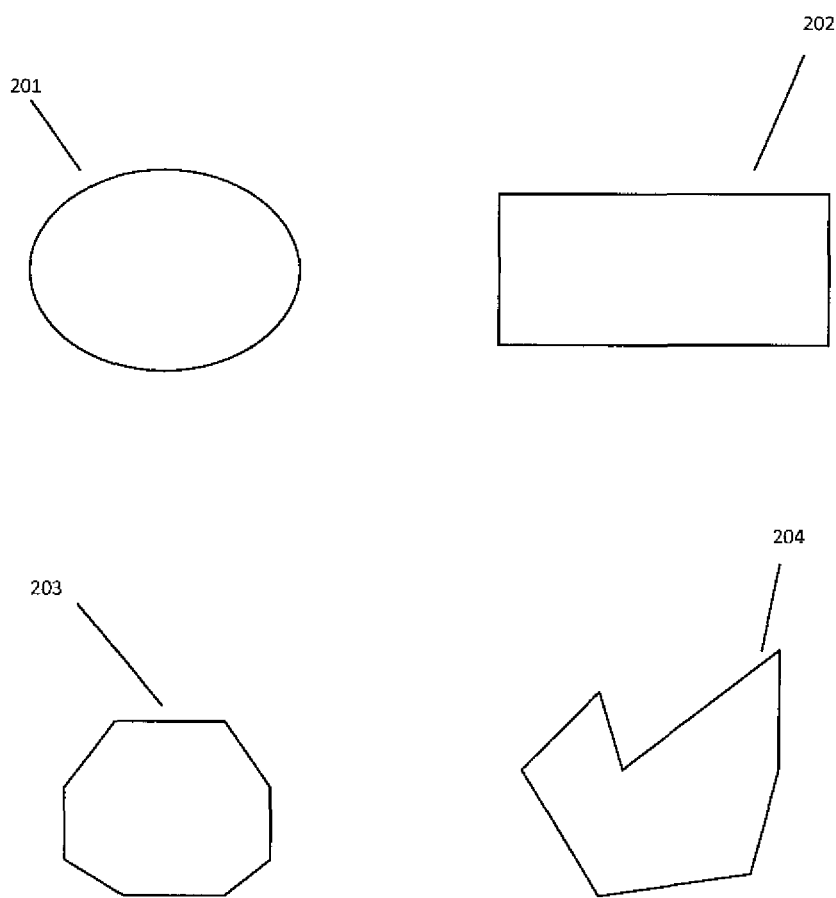
FIG. 2. Depicts possible geographical coverage of different SSS areas.

The augmented method for facilitating communication within the 3100-3650 MHz by SSS would be accomplished via a database approach. The information database within its content would have information of known protection zones within the United States. The radar data base with geo location information of operational protection zones presents a map of areas which are available, and which areas are not available to be used by the SSS. The radar protection zones can be very large in size and occupy many square kilometers. The radar protection zones in FIG. 2 are established by geo location markers may be represented by various geographical shapes such as circles 201, or rectangles 202, octagons 203, or other unorthodox shapes 204. The radar protection zones and their maps can also consist of areas which could potentially have jagged edges, and or unconventional geometric shapes. Trusted agents or wireless carriers who operate SSS are able to access and read the data base which contains radar protection zone information and perform necessary analysis of the information content of the radar protection zone database. The SSS would read, analyze, interpret the data from the radar database and construct its own map of where SSS is allowed to operate. The alternate spectrum sharing method by use of a database would be utilized as an augmentation method along with a spectrum sensor capability. The database may be available via internet or other communication means and the database would include known protection zone areas. The geographical areas in which radar systems operate, along with 3100-3650 MHz spectrum utilized by radar systems would not be available for the use by the SSS. The SSS could not operate in geographical areas where radar systems operate, or in 3100-3650 MHz frequency band within radar occupied areas.

In support of the spectrum sensing approach, the SSS network would perform an automated RF engineering analysis and calculations in order to determine how far its RF signals will propagate away from its CBSD, bases stations, eNoB, wireless hubs, and its access points which is discussed in latter sections of this embodiment. Additionally, SSS would be able to apply threshold of interference calculations to data extracted from its spectrum sensor in order to protect the incumbent spectrum users which are radar systems. The automated SSS RF engineering calculations would be based upon power transmitted, location (specified by lat/long) of a spectrum sensor, specific frequencies of operation, free space loss, specific geographical locations of its CBSD, path loss calculations, hubs, base stations, eNoB, wireless hubs and antenna gains. The RF analysis would generate a geographical operational area, or a foot print, for the specific SSS. Through analysis, by use of the GPS data and analytical results, SSS would ensure that SSS CBSD emissions do not interfere with radar systems operation. This method would ensure that SSS elements, along with wireless mobile and fixed devices do not cause interference to known radar systems, or radar systems that are moving across different geographical areas. As long as emissions from the SSS network and SSS emissions from its elements and users do not negatively impact operation for radar systems, the SSS would ensure that potential interference generated by the SSS elements does not cause interference, or negatively impact radar operations. Through use of GPS data, the SSS has geo location data about its own wireless devices and wireless elements and via access to the database geo-location content, the SSS is able to determine if wireless communications is allowed in certain area, or areas in which the SSS operates.

Over a period of last 20 years the spectrum regulators from the National Telecommunications and Information Agency (NTIA) have produced numerous public reports about radar systems, radar technology, and radar signal measurements which have been obtained during their course of study. Reports generated and published by NTIA provide many details about radar signals and their waveforms. These details include specific information about radar signals such as frequency bands, pulse emissions, modulations and other associated pulse characteristics. The radar characteristics have a range of values through which they operate and radar emitted signal waveforms manifest a pattern of repetitive events during different time periods. The NTIA publicly available information can be utilized to assist anyone who plans to take radar measurements or to build a device that could potentially detect RF emissions from various radar systems. Additionally, in a public domain there exist a number of text books which provide detailed information about radar systems and composite elements of their associated radar waveforms. The radar systems are used: for air traffic control, weather monitoring, marine operations, surface search type of radars, by private companies, individuals and by multiple Federal government agencies and military departments.

This patent also examines a variety of methods. One of those methods is used to identify radar signals and their associated waveform. The methodical approach in this embodiment is focused on a problem of trying to determine radar RF signals and their waveforms without exactly knowing radar signal's RF characteristics, or its associated waveform. Additional methods in this embodiment focus on: identification of CBSD units that could cause interference to incumbent radar systems, generation of protection zones and RF propagation calculations performed by SSS.

The method executed by SSS is focused on a fact that radar signals and their associated waveforms can be identified by analyzing of incoming RF signals in both time and frequency domains. SSS accomplishes certain aspects of the analysis by evaluating typical as well as known radar's RF characteristics. Additionally, SSS analyzes variability associated with a range of RF characteristics, and conducts an analytical, as well as, a comparison method with those of a detected RF signal. By known and typical RF characteristics we refer to radar information which is available in public domain and in radar text books.

Radar systems are built to detect objects without knowing the object's exact locations. This operational principle is applicable to radar system whether it is a ground based radar used to detect aerial or ground based targets, a marine radar used for surface or aerial search, or an aerial type radar. Hence, a radar must search large areas and volumes of space and emit a number of RF pulses in order to detect targets. These radar emissions, or bursts of radar pulses are quite repetitive, and have certain RF characteristics that can be detected and used for identification of radar systems.

An important point to note is that we should not think that only government and military personnel can operate the radar systems since radar systems can also be used and operated by the non-government and operators as well. In addition to radar use by military and government operators, one can envision a case where radar systems are utilized by a boat, or a ship to steer its way through a fog or at night.

In this embodiment the SSS identifies radar signals through an analytical process. The SSS is trying to identify radar signals, and waveforms without knowing exactly what are their characteristics. The radar waveforms can be identified by a virtue of analyzing and comparing a range of possible characteristics with those of a detected RF signal as represented in FIG. 3. In the RF domain a radar signal, or in this case a radar signal emission can be identified by RF characteristics such as the frequency, signal amplitude 302, signal modulation, pulse widths 301, Pulse repetition intervals (PRI) 304, or pulse repetition frequency (PRF) 303 of an incoming signal. When measured with a spectrum analyzer, or a RF power meter, a signal amplitude would be associated with a signal power and expressed in decibel units such as dB, or dBm. A SSS wireless network can detect an incoming RF radar signal through the identification of signal characteristics. Hence, the SSS network will employ a number of techniques to identify a radar signal. A radar burst of pulses 305 is depicted in FIG. 3. to illustrate a radar emission.

Different waveform markers as well as characteristics used to identify radar signals are: amplitude of a signal, power of a signal, pulse repetition frequency (PRF); pulse repetition intervals (PRI); pulse widths, modulation of a signal, and the spectral content of a signal. Those are the important weighing factors that radar identification analysis will be based upon and used by the SSS. Those are the important weighing factors that SSS/SMU implements an automated analysis and for the identification process of RF waveforms.

Differentiation between communication and radar signals would lead us to investigate key elements that could help us segregate between the types of RF signals. An important element for the analytical method is to investigate an amplitude 302 associated with a voltage level of a mobile wireless device and a also those of radar signal. The amplitude of a Radio Frequency (RF) signal could also be associated with power content of a signal. In regards to radar signals typical voltage associated with emitted RF signal amplitudes from antennas can be in a range of 100-3000 volts or even larger. The signal voltage, and its current generate power content of a RF signal. RF signal amplitudes of radar signals are of significantly larger value than RF amplitudes associated with those of mobile communication devices. Many radar text books utilize power when the radar analysis is performed, hence we provide a relationship between voltage levels, and power as calculated by impedance of free space. Also a few examples of radar signals are provided and their association with power of a radar signal.

The association between amplitude of a signal expressed as the voltage, current and power of the RF signals will be associated through the following formulas. The impedance (Z) of free space is expressed as 377 ohms.

$$Power = V*I \cos\Theta; \text{ additionally Power can also be calculated by}$$

$$Power = (Voltage**2)/Z \text{ (in Ohms)}$$

Since a radar system can generate power of a signal in range of 10,000-50,000 watts and higher in such a scenario RF signals with amplitudes of large magnitudes are likely to be detected. Peak radar emission over 20,000 watts are not unusual and are used by many different types of radar systems.

The typical power levels of communication signals associated with emissions from the handheld wireless devices usually range from a fraction of a watt to one watt. These power levels have to do with a regulatory domain and also with a fact that communication devices try to emit the lowest power possible in order to make the battery life last as long as practical. The amplitudes of such communication signals would be much smaller than those emitted by higher power radar systems.

The radar emissions could emit over 50,000 watts depending on the system users and radar applications. Both the power level and amplitude level comparison of mobile consumer wireless device with those of a radar signal identifies a huge difference in both amplitude and power between RF signals. There exists a significant difference between the radar signal and a communication signals. A power of a radar signal could easily be 1000, 5000 or perhaps even be 10,000-40,000 larger in magnitude than a typical signal coming from a RF mobile wireless device. This is a key point to note in which SSS examines ways to differentiate between a mobile wireless signal and a radar signal. It is very important to note that difference in signal power levels between the two types of systems is truly of a large and significant magnitude. It is also important to note that power of any RF signal will decay through free space loss as RF signal travels in space.

A RF detector within the Spectrum Sensor Unit SSU would search, and scan the spectrum by performing a sweep over an entire band of interest. In order to try to identify the radar signal emissions, the SSU would sweep the spectrum of interest, or parts of such spectrum in various increments or multiples of 1 kHz, 10 kHz, 50 kHz, 100 KHz, 1 MHz or larger bandwidths values. The SSU would detect radar waveform markers or characteristics that would be used in the identification of a radar signal.

The SSS evaluates the additional weighing factors that would determine if the incoming RF signal was generated and emitted by a radar system. We can certainly say that all radar systems are not created equal, however it is through repetitive radar signal emissions that radar systems perform their intended function. It is this fact of repetitiveness, repeatability along with amplitude as well as power level and spectral content detected that can be used by SSS to successfully identify a presence of radar emissions in the frequency band of interest.

Radar systems are used for many diverse purposes and are designed to operate over a wide range of spectrum and portions of the spectrum with different sets of variable characteristics. These radar RF characteristics include variable pulse widths, PRF, PRI and variable power levels. To illustrate a diverse range of radar applications we should consider the following scenarios. Certain radar systems are used by the military to locate small targets such as missile, while other radar systems may be used by the government and also by non-government operators to locate larger targets such as ships, vehicles, and aircraft platforms.

There exists a specific type of radar that is emitting RF energy all the time, and it is called Continues Wave (CW) type of radar system. Due to continuous emissions, those types of radar systems and their emissions should be relatively simple to detect since their RF emissions are repetitive and contiguous in time.

In order to describe operational differences between radar systems, two scenarios are presented. For instance in scenario 1, there is a ground based radar system is trying to detect large as well as medium size, fast aerial targets at distances of 20-70 km. And, such a radar has a capability to emit power levels of 10,000-40,000 watts or even higher, and could use a pulse repetition frequency PRF of 5000-10, 000, a signal pulse width of 1-20 microsecond. Additionally, the same radar could use a highly directional gain antenna to accomplish its task. The same radar during a course of its operation may and could change the emitted waveform characteristics such as PRF, PRI and pulse widths depending on fluctuations within its environment.

For example in scenario 2, there is a marine type radar system which could be aboard a pleasure boat, a yacht, or a ship. This marine type radar system is most likely, or may be searching for other ships, large rock formations, or a coast line. The marine type radar has a totally different purpose than a radar in example 1, and the marine radar was probably designed with a significantly slower response time and a capability which has a shorter detection range of only 1-10 kilometers. The marine type radar may only emit a RF waveform capable of 1-2 microsecond pulse widths, and is capable of a PRF of 1000-2000, and power signal level of 200-1000 watts. Additionally, the marine radar may use an antenna gain of a lower value, but adequate for its intended purpose.

In example 1 and an example 2, both the ground based radar system and the marine radar systems are radars. Both systems emit radar signals which have different RF characteristics, most likely have different response times, are searching for different objects, and have been designed for different purposes. Yet, they are both radar systems which do emit RF signal burst sequences which would be repetitive and are also repeatable. Both of the radar systems have a capability to emit a thousand or more signal pulses every second. Both radar systems emit power levels that are significantly higher than what a mobile wireless device, or a fixed wireless device would emit. Comparing power levels of both systems leads us to conclude that the power level emissions from the ground based radar are much different than the ones coming from the marine type radar. Never the less, depending on a scenario, the peak power levels of either of the radar systems described may be a couple of hundred times if not a thousand times higher then what a mobile phone, or a mobile wireless device would emit. These two examples illustrate different kinds of radar systems and their capability. It should be noted that many other examples of radar systems are possible and likely to be encountered.

Examination of radar operations and associated radar signals in general, yields information that the magnitude of a signal, a number of occurrences, repetitiveness, and repeatability of an incoming signal would assist SSS in identification of a RF signal as a radar signal. A reader should not forget that the radar signal's intended purpose is to detect targets. This is an important fact, and it is important to note that communication RF signals utilize waveforms with much different characteristics than those of radar signals. The future FCC Rules may include interference threshold criteria for the incumbent RF systems. The current FCC Report and Order rules specify a 60 second time period during which the SSS network elements must terminate transmissions and operations on impacted frequencies within 3100-3650 MHz. Providing that in a future such an interference threshold criteria is specified by the FCC rules, it potentially could range from −60 dBm to values that are even 10 to 40 dB lower than −60 dBm, and such regulatory criteria would be used by the SSS to identify interference to radar signals. The elements of the SSS network would incorporate a capability to ensure that the FCC threshold for interference to the incumbent systems within 3100-3650 MHz is not exceeded.

This patent incorporates references to potential and future FCC thresholds for interference, to the currently established time period by which SSS transmissions need to stop within 3100-3650 MHz, and additional regulatory parameters as well. Additionally, the SSS network which includes mobile and fixed wireless devices would terminate their transmissions, within a N*60 second time period expressed in seconds as, specified by the FCC regulations. This patent incorporates the time frame for the SSS fixed and mobile devices to terminate their transmissions as specified by the FCC rules as well. The SSS will ensure that through its sensing capability and its ability to control element transmissions that its elements which includes mobile and fixed wireless devices will not cause interference to incumbent systems as mandated by the FCC Rules published in the Report and Order.

Each of the targets will produce its own electromagnetic signature when illuminated by the RF signal emitted by a radar system. Hence, radar systems are designed for a purpose which is to locate targets that conform to a set of known criteria such as target size, target speed and perhaps a few others. One characteristic that radar systems have in common is that the RF radar signal emissions are repeated many times every second as a part of their function. Depending on a purpose of a radar system being operated, the radar emissions could be repeated from a few hundred times, to over a thousand times, or even to many thousands of times every second.

Radar systems scan vast regions and 3 directional "volumes" of space in order to collect information about the surrounding geographical environment and also to locate and to track targets. Radar systems emit bursts of pulses in order to detect if there are any large objects, terrain such as the coast line, mountains, man-made obstacles in their vicinity. Radar systems emit bursts of pulses in order to locate and to track targets of various sizes, or even very small targets that are many kilometers away from a radar system.

Since a priori information about location of a target is not known by the radar system, the typical radar search implements signal emissions which consist of a large number of bursts of pulses that may be emitted in many various directions, at many different angles and their associated bearings and possibly at many different elevations in order to collect information about environment and in order to locate targets. These bursts of radar emitted pulses will be very repetitive and will take place many times a second. Typically a radar system emits from a few hundred to thousands of pulses every second. One of the most important takeaways is that that radar signals and their associated waveforms are repetitive and repeatable and are taking place many times a second. Hence, if a dedicated apparatus for detection of RF radar signals is put into place such an apparatus would not have to search for a long time in order to intersect or to receive these RF radar signals within its operational area.

Figure 4:
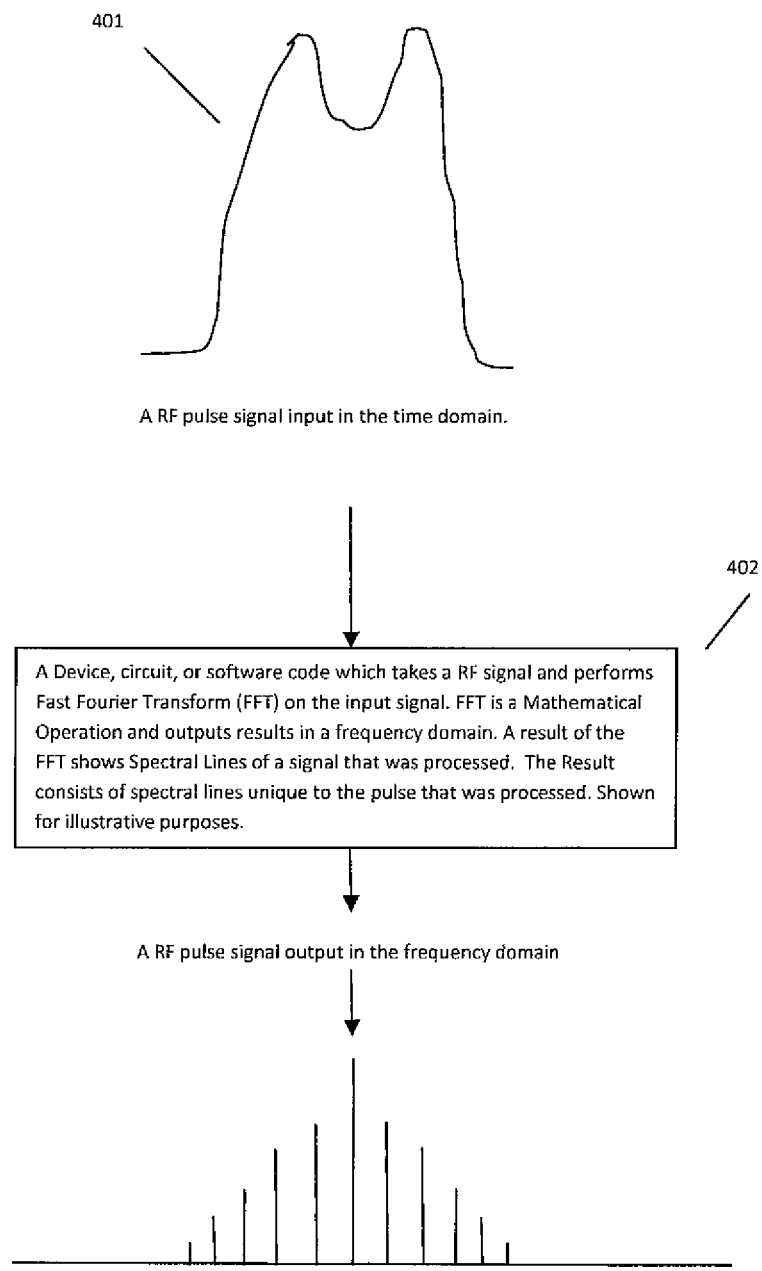
FIG. 4. Depicts a signal in time domain and a signal in frequency domain.

FIG. 4 represents a RF signal in time domain and also a representation of the signal in frequency domain. The SSS and its elements make use of the FFT method and utility described within this paragraph. A RF signal 401 can be monitored in a time domain, but through a mathematical operation a signal can also be transformed to a frequency domain 403. Taking a signal from a time domain to a frequency domain can be achieved via a mathematical operation (operation implemented through a circuit, or a software code) called the Fast Fourier Transform (FFT) 402. The advantage of examining a RF signal in the frequency domain will provide us with the spectral line content of the analyzed signal. The spectral line content 403 within a frequency domain can be used for a more precise signal and waveform identification. The FFT analysis is very useful and efficient identification tool when multiple RF signals are present in the environment at the same time. A RF receiver within the SSS network may be intercepting different RF signals which overlap and are creating a resultant made up of superimposed RF signals. While a comparison of multiple and superimposed signals and waveforms can be difficult in the time domain. The comparison of the same signals and their associated waveforms becomes much easier in the frequency domain, because each RF signal will have their waveform "signature" broken down into its spectral lines, or spectral components. The Fast Fourier Transformation within the SSS network can be facilitated via a hardware circuit, or via software code within a computer, or by a microprocessor controlled system, or by the combination of these processes.

Any RF signal can be captured and monitored in a time domain, but it can also be transformed to a frequency domain. Taking a signal from a time domain to a frequency domain can be achieved via a mathematical operation called the Fast Fourier Transform (FFT). The SSS is designed to detect incoming signals and also to calculate FFT of the incoming signals, which is one method of identifying different types of signals received by the SSS. The SSS will make use of FFT to calculate the RF signal and its spectral line content in order to make the identification for different type of RF signals. Each RF signal in the frequency (spectral) domain will have a number of spectral lines and lines spreading values associated with it. Additionally, each detected RF signal has amplitudes of the spectral lines associated with spreading of spectral lines in frequency domain, and that information calculated by SSS provides identifying clues about the type of signal it is. The advantage of examining a RF signal in the frequency domain provides SSS with the spectral line content of the analyzed signal. The spectral line content within a frequency domain as calculated by the SSS can be used for a more precise signal and waveform identification. The FFT analysis can be very useful and efficient identification tool by SSS when RF signals from multiple sources are present in the environment at the same time. A RF receiver within SSS may be intercepting different RF signals which overlap and are creating a resultant made up of superimposed RF signals. While a comparison of multiple and superimposed signals and waveforms can be difficult and confusing in the time domain, the comparison of the same signals and their associated waveforms becomes much easier in the frequency domain, because each RF signal will have their waveform "signature" broken down into its spectral lines, or spectral components. The Fast Fourier Transformation can be facilitated via a hardware circuit, or via software code within a computer, or processor controlled system.

Figure 5:
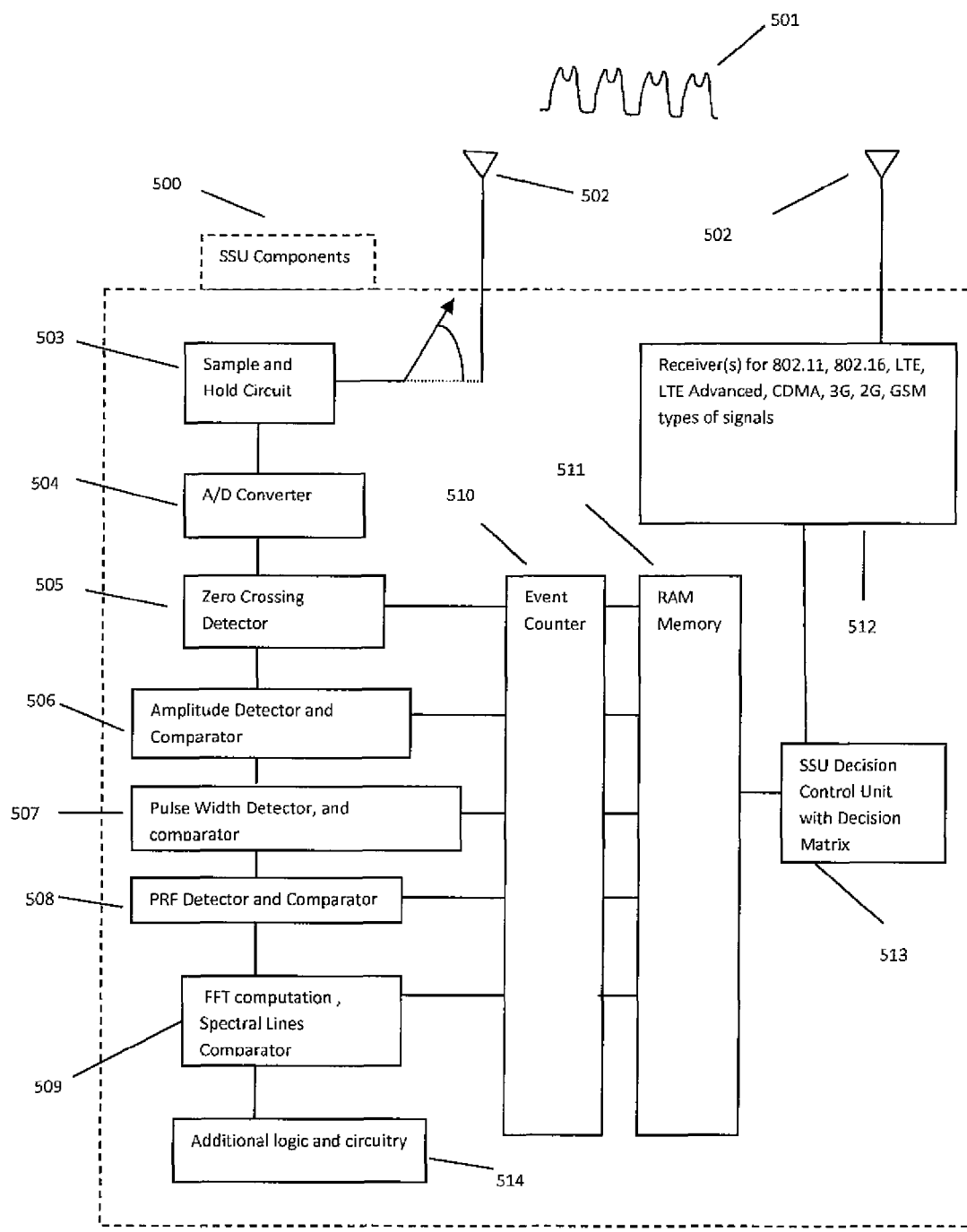
FIG. 5. Depicts internal components of the spectrum sensor unit.

FIG. 5 depicts a spectrum sensor, or spectrum environmental unit and its major functions and components. A spectrum sensor unit (SSU) 500 is a vital component of the SSS. The SSU's function is to detect radar emissions 501 and inform SMU, CBSD, AP, base stations, eNoB, wireless hubs that radar emissions have been detected. The SSU has antenna 502 sample and hold circuitry 503, a capability of tuning, and sweeping for RF signals 501 through the 3100-3650 MHz frequency band as well as through other frequency bands, and also through a portion of a frequency bands of interest. The SSU also consists of a RF receiver 512 which is able to receive, recognize and classify different communication signals such as: 802.11, 802.16, LTE, LTE Advanced, CDMA, GSM, 3G, 2G and other types of signals. The Spectrum Sensing Unit RF receiver differentiates between 3G and 4G LTE modulation characteristics and classifies signals it detects. The additional functions within the SSU consist of A/D Converter 504, Zero crossing detector 505, Amplitude Detector and comparator 506, Pulse width detector and comparator 507, PRF detector 508. Additionally the SSU and SMU have the ability to perform FFT computation in order to generate and compare spectral lines 509 of received signals. The FFT calculation converts a RF signal from the time domain to the frequency domain. The SSU Decision control unit 513 makes a comparison between RF signals of unknown origin and known communication signals that use protocols such as LTE, LTE Advanced, CDMA, 802.11, 802.16, 2G, GSM. If a detected signal is not a recognized communication signal, and if the RF signal displays characteristics of a radar signal, the SSU Decision Control Signal flags such a signal as a potential radar signal. As the sensor is sweeping through the spectrum of interest it would detect RF signals emissions 501 within the portion of the swept spectrum, or within the portion of the frequency band of interest. The RF detector circuitry would sample and hold the RF signals being detected. The RF signal sampled would be stored in the temporary memory RAM 511 devices. The event counter 510 within a spectrum sensor unit would be initiated to provide the number of occurrences of a repetitive RF signal which were captured. The FIG. 5 may also contain additional logic and hardware circuitry 514 which may be implemented. A logic statement would have to be answered by the SSS, such as: Is the signal, or a pulse that was detected a part of the sequence of pulses, or is this a single occurrence?. If there are additional occurrence of signal pulses being detected, then the counter would increment to indicate that more pulses are being detected.

Spectrum Sensing Unit (SSU) 500 consists of necessary circuitry, hardware, firmware, software and capability to receive, to identify, and via SSU Decision Control Unit 513 to differentiate between RF signals that utilize following protocols and standards: 802.11, 802.16, LTE, LTE Advanced, 3G, 2G, CDMA. The SSU has hardware, software and a decision process, as well as, a decision logic that would evaluate the RF signal markers at multiple levels of the analysis process. The SSU will apply and evaluate a threshold for detection of radar signals that may be mandated by the future FCC Rules and associated regulatory statute, providing such rules are in existence. Additionally, the SSU will apply and evaluate a threshold for interference to radar systems as could be mandated by the FCC Rules and regulations for 3100-3650 MHz frequency band, providing such rules are in existence. Such a threshold for interference could be expressed as Interference to Noise value of impacted system equals to −6 dB, or another value. If SSU determines that an incoming RF signal has been identified as a radar signal, the SSS will take action to cease the SSS network operations on impacted frequencies within a number of 60 seconds, time period, that was specified by the FCC Rules and regulations for Part 96 devices. The final version of this SSS utility patent would incorporate the time period for halting transmissions within 3100-3650 MHz frequency band as would be specified by the FCC future rules.

The Spectrum Sensing Unit (SSU) has RF capability to detect, recognize, receive, identify, distinguish between, and classify 802.11, 802.16, LTE, LTE Advanced, 3G, 2G, CDMA type of RF signals. Additionally, the SSU has a capability to identify and analyze RF signal markers via signal acquisition and processing of RF signal characteristics in order to detect and identify radar signals. The FIG. 5 may not specify all the steps and functions that could be executed by the matrix. Hence, FIG. 5 should not only be limited by steps and functions presented, since other steps and functions are also possible and may be performed.

Process used by the SSU to identify RF radar signals via recognition of identifying markers and their associated methods such as: Signal Amplitude, PRF, Bandwidth, Signal Power, Periodic burst of radar pulses, Comparison of incoming RF signals with Communication Waveforms Method. Additional markers and methods may also be possible and could be implemented.

Figure 6:
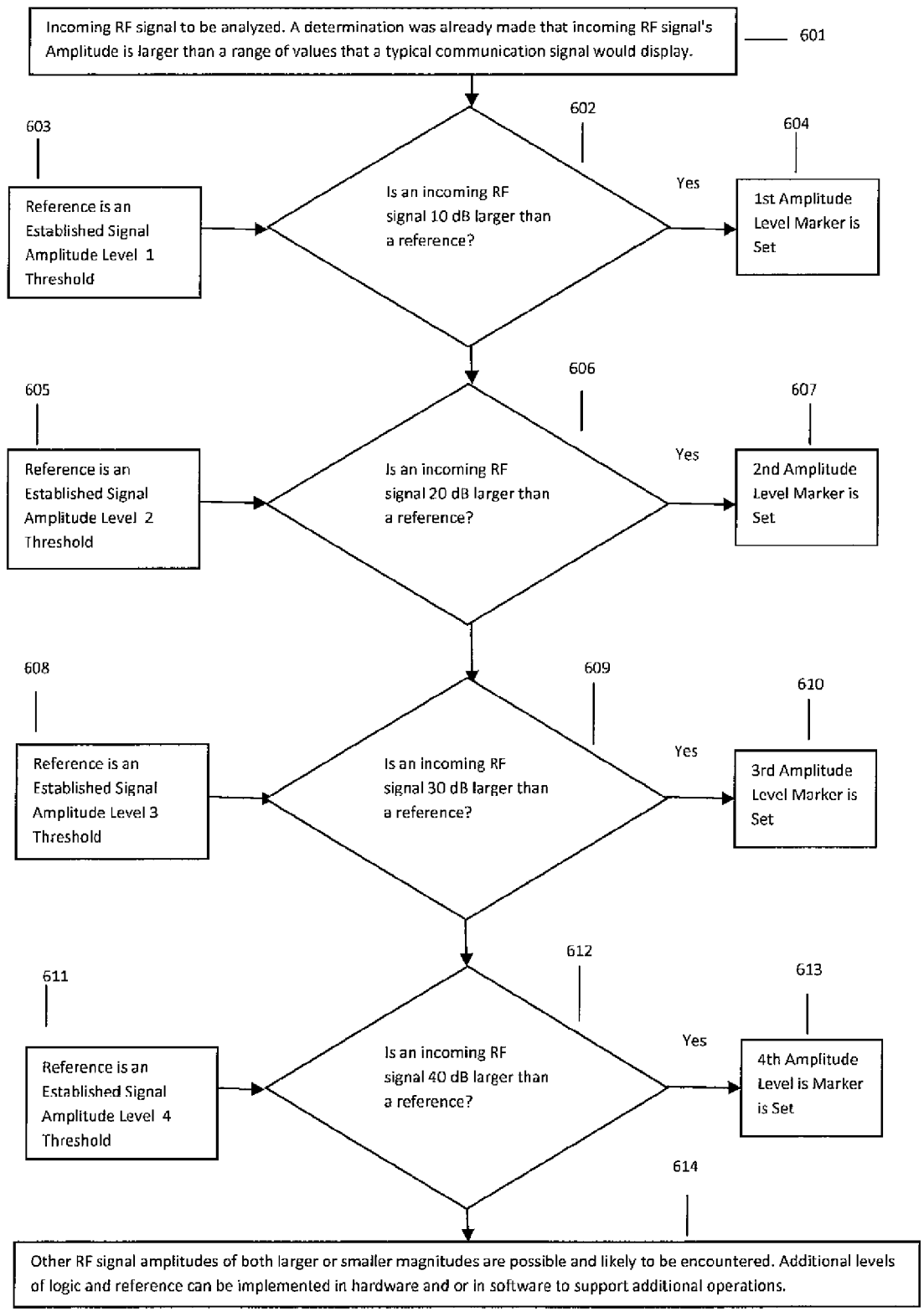
FIG. 6. Depicts a flow diagram for amplitude identification of a radar signal.

FIG. 6 depicts a flow diagram for amplitude comparison and identification method that would be executed by the SSS. This process of RF signal amplitude comparison is carried out by the SSU 500 and its associated components. The subcomponent of SSU which carries out the specific function would be performed by Amplitude Detector and Comparator 506. The detection of the incoming signal by SSS would be accomplished by measuring and evaluating amplitude of the incoming RF signal and analyzing it against known reference amplitude values as depicted in FIG. 6. The first level of signal amplitude measuring and examination will be accomplished by feeding the RF signal under analysis 601 into a logic operator 602 which determines if the input signal is larger than the Amplitude Reference Level Threshold 1 603. If amplitude of the RF signal under consideration is 10 dB greater than the Reference Level 603, then the 1st Amplitude Level Marker 604 will be set.

The second level of signal amplitude examination will be accomplished by feeding the RF signal being analyzed into a logic operator 606 which determines if the input signal is greater than the Amplitude Reference Level Threshold 2 605. If amplitude of the RF signal under consideration is 20 dB greater than the Reference Level 605, then the 2nd Amplitude Level Marker 607 will be set.

The third level of signal amplitude examination will be accomplished by feeding the RF signal being analyzed into a logic operator 609 which determines if the input signal is greater than the Amplitude Reference Level Threshold 3 608. If amplitude of the RF signal under consideration is 30 dB greater than the Reference Level 608, then the 3rd Amplitude Level Marker 610 will be set.

The fourth level of signal amplitude examination will be accomplished by feeding the RF signal being analyzed into a logic operator 612 which determines if the input signal is greater than the Amplitude Reference Level 4 611. If amplitude of the RF signal under consideration is 40 dB greater than the Reference Level 611, then the 4th Amplitude Level Marker 613 will be set. It needs to be noted that RF signals of different amplitudes of both larger or smaller amplitudes are possible and likely to be encountered. Additional levels of logic can be implemented either in software or the hardware to support additional operations 614.

It needs to be emphasized that the level markers from the first to the fourth levels do not have to be in the range of 10 to 40 dB, and that those should not be the limiting factors. Power levels of other values can be set for amplitude level markers. Additionally, either less or more than four level markers can be used in order to perform the comparison, and those should not be the limiting factors either.

Figure 7:
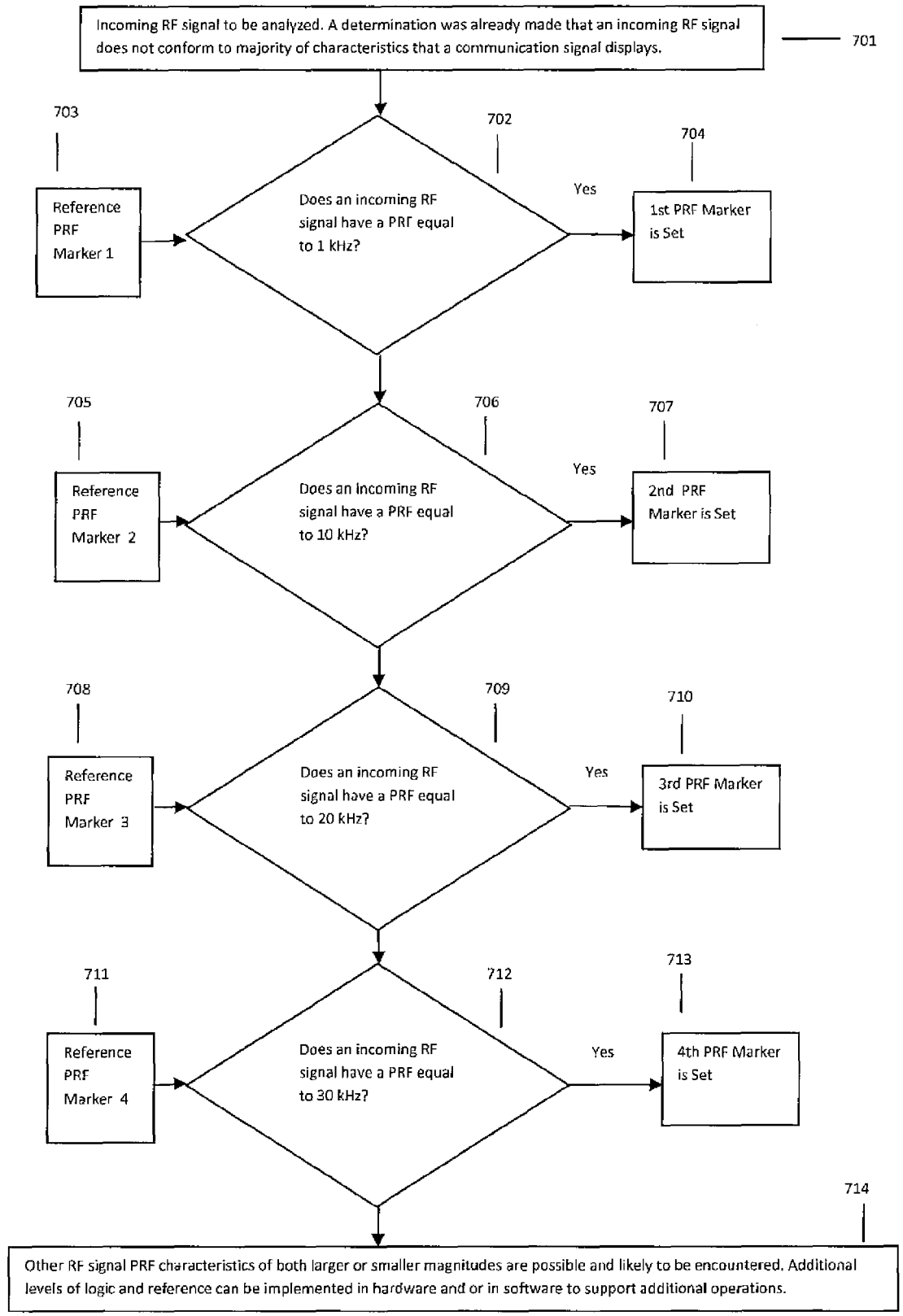
FIG. 7. Depicts a flow diagram for PRF identification of a radar signal.

FIG. 7 depicts a flow diagram for PRF comparison and identification method that would be executed by the SSS. This process is carried out by the SSU 500 and its associated components. The subcomponent which carries out the specific function would be performed by PRF Detector and Comparator 508. The detection of the incoming signal by SSS would be accomplished by evaluating and analyzing PRF of the incoming RF signal to various PRF reference values. The first level of signal PRF examination will be accomplished by feeding the incoming signal 701 into a logic operator 702 which determines if the PRF Reference Level 1 703 is equal to the PRF of the RF signal being analyzed. If the PRF Reference Level 1 is equal than the PRF of the signal being analyzed then the 1st PRF marker 704 will be set.

The second level of signal PRF examination will be accomplished by feeding the signal being analyzed into a logic operator 706 which determines if the PRF Reference Level 2 705 is equal to the PRF of signal being analyzed. If the second PRF Reference Level 705 is equal to the PRF of the signal being analyzed then 2nd PRF Marker 707 will be set.

The third level of signal PRF examination will be accomplished by feeding the signal being analyzed into a logic operator 709 which determines if the PRF Reference Level 3 708 is equal to the PRF of a signal being analyzed. If the third PRF Reference Level 708 is equal to PRF of a signal being analyzed then the 3rd PRF Marker 710 will be set.

The fourth level of signal PRF examination will be accomplished by feeding the signal being analyzed into a logic operator 712 which determines if the PRF Reference Level 4 711 is equal to the PRF of a signal being analyzed. If the fourth PRF Reference Level 711 is equal to PRF of a signal being analyzed then the 4th PRF Marker 713 will be set.

It needs to be emphasized that the PRF Markers from the first to the fourth levels do not have to be in the range of 1000-30000 Hz, and that those should not be the limiting factors. PRF levels of other either higher or lower values can be set for PRF level markers. Additionally, either less or more than four level of markers can be used in order to perform the comparison, and those should not be the limiting factors either.

Figure 8:
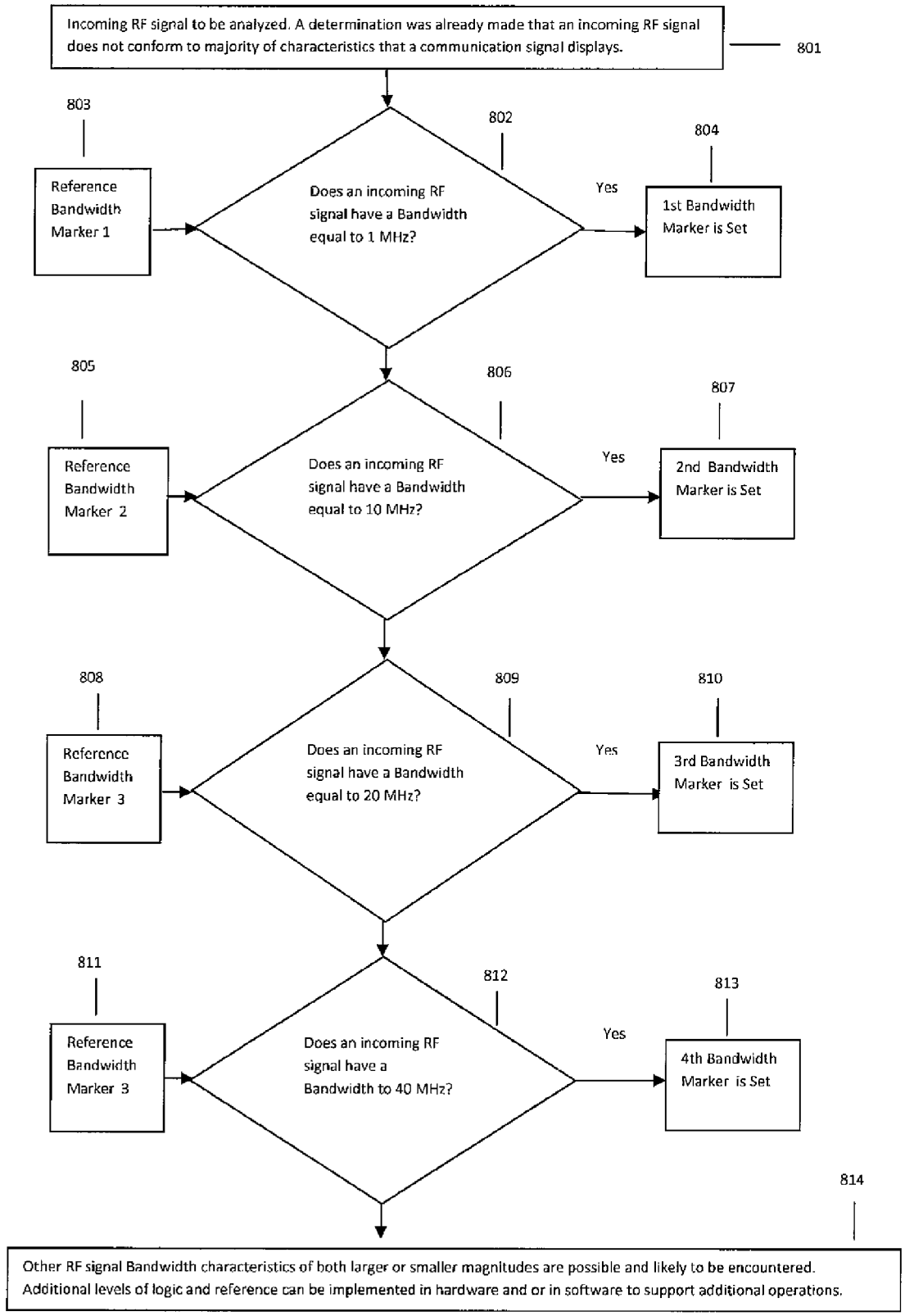
FIG. 8. Depicts a flow diagram for bandwidth identification of a radar signal.

FIG. 8 depicts a flow diagram for bandwidth comparison and identification method that would be executed by the SSS. The detection of the incoming signal would be accomplished by analyzing and evaluating Bandwidth of the incoming RF signal to bandwidths of a known reference values. The first level of signal bandwidth examination will be accomplished by feeding the incoming signal 801 into a logic operator 802 which determines if the Reference Bandwidth Marker 1 803 is equal to the bandwidth of a RF signal being analyzed. If the Reference Bandwidth Marker 1 803 is equal to the Bandwidth of the signal being analyzed, then the 1st Bandwidth Marker 804 will be set.

The second level of signal Bandwidth examination will be accomplished by feeding the signal being analyzed into a logic operator 806 which determines if the Reference Bandwidth Marker 2 805 is equal to the Bandwidth of a signal being analyzed. If the Reference Bandwidth Marker 2 is equal to the Bandwidth of the signal being analyzed, then 2nd Bandwidth Marker 807 will be set.

The third level of signal Bandwidth examination will be accomplished by feeding the signal being analyzed into a logic operator 809 which determines if the Reference Bandwidth Marker 808 is equal to the Bandwidth of a signal being analyzed. If the Reference Bandwidth Marker 3 is equal to Bandwidth of a signal being analyzed, then the 3rd Bandwidth Marker 810 will be set.

The fourth level of signal Bandwidth examination will be accomplished by feeding the signal being analyzed into a logic operator 812 which determines if the Reference Bandwidth Marker 811 is equal to the Bandwidth of a signal being analyzed. If the Reference Bandwidth Marker 4 is equal to Bandwidth of a signal being analyzed, then the 4th Bandwidth Marker 813 will be set.

It needs to be emphasized that the bandwidth level markers used by SSS from the first to the fourth levels do not have to be in the range of 1-40 MHz, and that those should not be the limiting factors. Bandwidth levels of other values can be set for bandwidth level markers. Additionally, either less or more than four level markers can be used in order to perform the comparison, and those should not be the limiting factors either.

Figure 9:
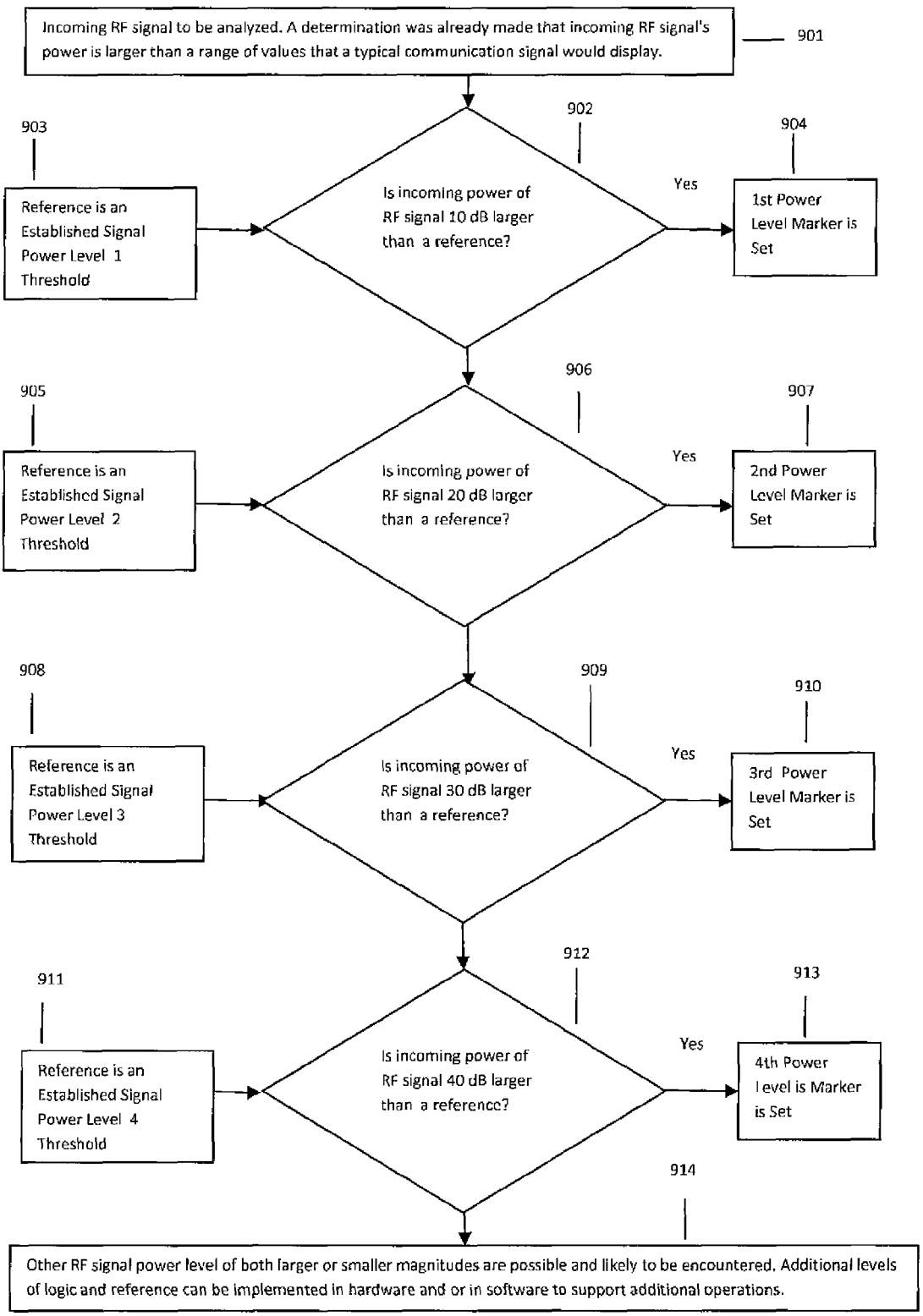
FIG. 9. Depicts a flow diagram for identification of a radar signal via power content of the RF signal.

FIG. 9 depicts a flow diagram for power of a signal comparison and identification method that would be executed by the SSS. The detection of the incoming signal by SSS would be accomplished by evaluating power content of the incoming RF signal by analyzing and comparing various power levels to known reference values. The first level of signal power examination will be accomplished by feeding the RF signal under analysis 901 into a logic operator 902 which determines if an incoming power of RF signal is 10 db greater than Power Level 1 Threshold 903. If the incoming signal power is 10 dB greater then Power Level 1 Threshold, then the 1st Power Level Marker 904 will be set. Currently the FCC Rules do not specify a signal detection threshold (in watts, or dBm) for radar signal(s) detected within 3550-3650 MHz frequency band. It is possible and potentially be very likely that future FCC rules will mandate that such RF radar signal threshold be observed and implemented for spectrum sensing of radar signals within the 3550-3650 MHz frequency band. The future FCC Rules may identify that the signal threshold for a radar signal detection could be within a range from −95 dBm to −35 dBm. If the first power reference threshold meets the FCC threshold for identification of a radar signal, then this information will be sent to SMU as an identification marker.

The second level of signal power examination will be accomplished by feeding the RF signal under analysis 901 into a logic operator 906 which determines if the an incoming power of RF signal is 10 db greater than Power Level 2 Threshold 905. If the incoming signal power is 20 dB greater than Power Level 2 Threshold, then the 2nd Power Level Marker 907 will be set. If the second power reference threshold meets or exceeds the FCC threshold for identification of a radar signal, then this information will be sent to SMU as an identification marker.

The third level of signal power examination will be accomplished by feeding the RF signal under analysis 901 into a logic operator 909 which determines if the an incoming power of RF signal is 30 db greater than Power Level 3 Threshold 908. If the incoming signal power is 30 dB greater than Power Level 3 Threshold, then the 3rd Power Level Marker 910 will be set. If the third power reference threshold meets or exceeds the FCC threshold for identification of a radar signal, then this information will be sent to SMU as an identification marker.

The fourth level of signal power examination will be accomplished by feeding the RF signal under analysis 901 into a logic operator 912 which determines if the an incoming power of RF signal is 40 db greater than Power Level 4 Threshold 911. If the incoming signal power is 40 dB greater than Power Level 4 Threshold, then the 4th Power Level Marker 913 will be set. If the fourth power reference threshold meets or exceeds the FCC threshold for identification of a radar signal, then this information will be sent to SMU as an identification marker. Additionally, either less or more than four level markers can be used in order to perform the comparison, and those should not be the limiting factors.

Spectral characteristics of the known waveforms such as 802.11, 802.16, LTE, LTE Advanced, CDMA and GSM are stored in the permanent memory such as ROM or on magnetic media within the SSS. Spectral characteristics of 802.11, 802.16, LTE, LTE Advanced, CDMA, and GSM characteristics such as amplitudes of spectral lines and spacing between spectral lines would be assigned variables and stored in permanent memory of the SSS.

The SSS would perform a FFT mathematical operation on the incoming RF signal under analysis and a result of the FFT analysis and its spectral content would be stored in temporary memory (RAM). The incoming signal would be compared to spectral content of known signals such as 802.11, 802.16, LTE, LTE Advanced, CDMA, and GSM. If the spectral content of the stored communication signals such as 802.11, 802.16, LTE, LTE Advanced, CDMA does not match the spectral content of the RF signal that is being analyzed, that would provide an additional marker for identification and classification of an incoming signal as a potential radar signal.

Figure 10:
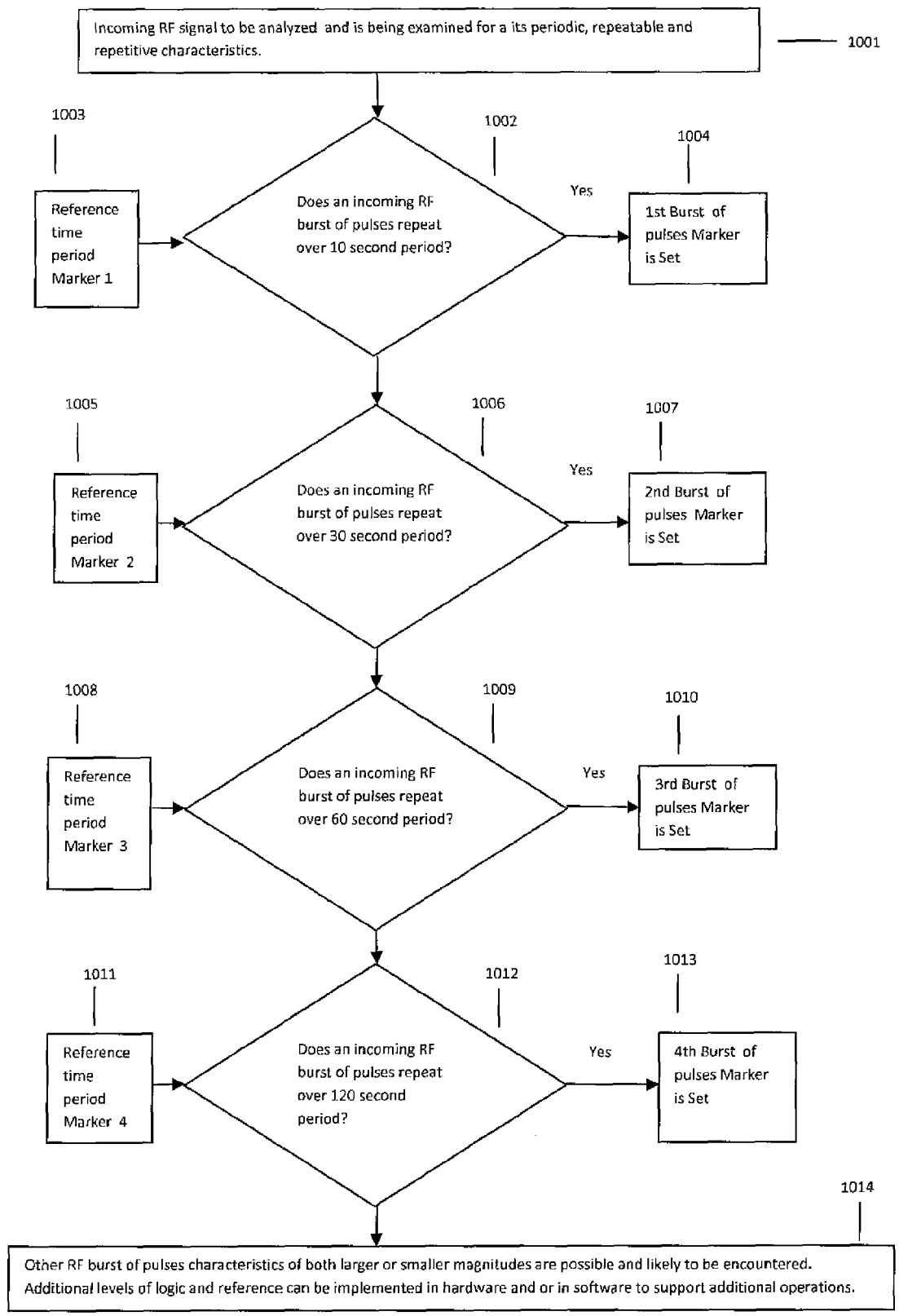
FIG. 10. Depicts a flow diagram for identification of a radar signal via period of repeatability of the RF signal.

FIG. 10 depicts a flow diagram for a periodic burst of pulses technique used for comparison and identification method that would be executed by the SSS. The detection of RF radar signal by SSS would be accomplished by monitoring and by evaluating a periodic nature for a burst of pulses of the incoming RF signal during a predetermined time period. The first level of signal examination will be accomplished by feeding the RF signal under analysis 1001 into a logic operator 1002 which determines if the RF signal burst, or a sequence would repeat itself over a period of time established by Timeframe Marker 1 1003. If it has been determined that the input RF signal sequence repeats itself over a time period established by Timeframe Marker 1, then the 1st Burst of pulses Marker 1004 will be set.

The second level of signal examination will be accomplished by feeding the RF signal under analysis into a logic operator 1006 which determines if the RF signal burst, or a sequence would repeat itself over a period of time established by Timeframe Marker 2 1005. If it has been determined that the input RF signal sequence repeats itself over a time period established by Timeframe Marker 2, then the 2nd Burst of pulses Marker 1007 will be set.

The third level of signal examination will be accomplished by feeding the RF signal under analysis into a logic operator 1009 which determines if the RF signal burst, or a sequence would repeat itself over a period of time established by Timeframe Marker 3 1008. If it has been determined that the input RF signal sequence repeats itself over a time period established by Timeframe Marker 3, then the 3rd Burst of Pulses Marker 1010 will be set.

The fourth level of signal examination will be accomplished by feeding the RF signal under analysis into a logic operator 1012 which determines if the RF signal burst, or a sequence would repeat itself over a period of time established by Timeframe Marker 4 1011. If it has been determined that the input RF signal sequence repeats itself over a time period established by Timeframe Marker 4, then the 4th Burst of pulses Marker 1013 will be set. Additionally, either less or more than four level markers can be used in order to perform the comparison, values associated with time frame markers can be variable, and those should not be the limiting factors.

Figure 11:
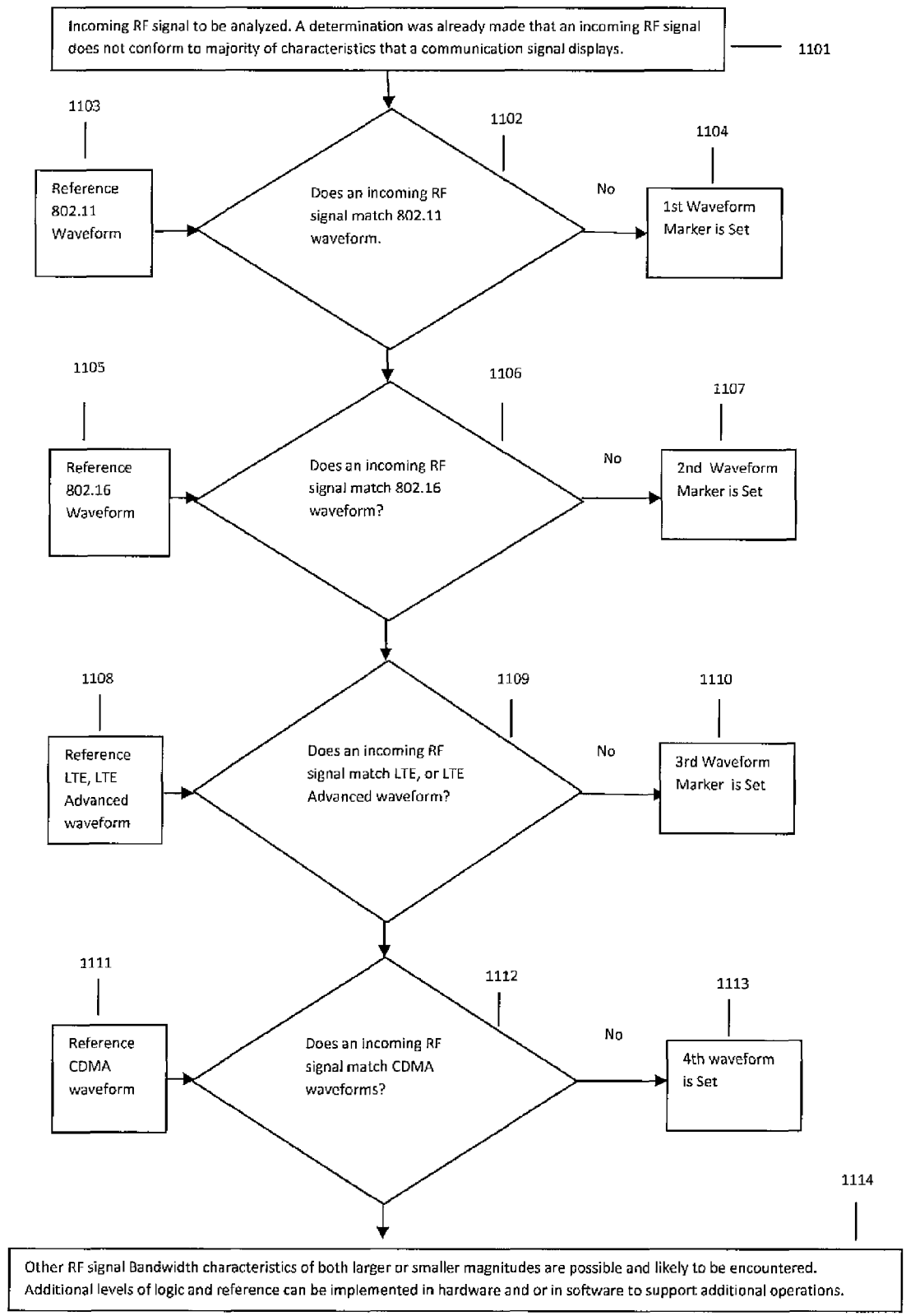
FIG. 11. Depicts a flow diagram for identification of a radar signal via comparison of waveform characteristics.

FIG. 11 depicts a flow diagram for a waveform comparison and identification method that would be executed by the SSS. The detection of the incoming signal by SSS would be accomplished by examining characteristics of the incoming RF signal and comparing these characteristics to characteristics of known communication waveforms. The first level of signal waveform examination will be accomplished by feeding the incoming signal 1101 into a logic operator 1102 which determines if the reference 802.11 waveform 1103 is equal to the RF signal being analyzed, or if it does not match the 802.11 waveform. If the reference 802.11 waveform matches the waveform of the signal being analyzed then the 1st Waveform marker 1104 will be set.

The second level of signal waveform examination will be accomplished by feeding the incoming signal 1101 into a logic operator 1106 which determines if the reference 802.16 waveform 1105 is equal to the RF signal being analyzed, or if it does not match the 802.16 waveform. If the reference 802.16 waveform matches the waveform of the signal being analyzed than the 2nd waveform marker 1107 will be set.

The third level of signal waveform examination will be accomplished by feeding the incoming signal 1101 into a logic operator 1109 which determines if the reference LTE, or LTE Advanced waveform(s) 1108 is equal to the RF signal being analyzed, or if it does not match the LTE, LTE Advanced waveform(s). If the reference waveform 1108 matches the waveform of the signal being analyzed then the 3rd Waveform Marker 1110 will be set.

The fourth level of signal waveform examination will be accomplished by feeding the incoming signal 1101 into a logic operator 1112 which determines if the reference CDMA waveform 1111 is equal to the RF signal being analyzed, or if it does not match the CDMA waveform. If the reference CDMA waveform matches the waveform of the signal being analyzed than the 4th Waveform Marker 1113 will be set. Additionally, either less or more than four level markers can be used in order to perform the comparison, and those should not be the limiting factors In FIG. 11, Not all steps need to be executed, nor done sequentially. Order of steps can be altered, and order of Steps can be interchanged.

A minimum time for radar signal observation once a signal has been detected should be set to one second, but a time period can be extended. A time period for identification for a radar signal by the SSS must conform to the FCC regulations which should be applicable in calendar year 2015 and beyond.

The Spectrum Management Unit (SMU) and Spectrum Sensing Unit (SSU) have transceivers that can support communication with following protocols and standards: 802.11, 802.16, LTE, LTE Advanced, 3G, 2G, CDMA. The SMU has hardware, software and a decision process, as well as, a decision logic that would evaluate all of the signal markers at each level of the process individually. The SMU has RF detection capability to recognize, identify, and classify 802.11, 802.16, LTE, LTE Advanced, 3G, 2G, CDMA type of signals and to facilitate communications channels with those protocols.

FIGS. 12 A and 12B provide a graphic representation of the SSS process that is implemented via a decision matrix 1214 and associated factors which are used by the SSS to determine whether the incoming RF signal is a radar signal. Once the spectrum is scanned 1201 for incoming signals, and signals of interest are captured 1202 by SSS then the examination by SSS process is initiated. The first decision point 1203 will evaluate whether the RF signal is of significantly higher power than the communication signals detected? If the answer is "yes", the power flag will be set to "1". The second decision 1204 point will evaluate whether the RF signal has repetitive waveform characteristics typically associated with radar emissions. If the answer is "yes', the repetitive waveform flag will be set to "1". The third decision 1205 point will evaluate whether the RF signal has a waveform consistent with relatively short bursts of pulses typically associated with radar emissions. If the answer is "yes", the short burst of pulses waveform flag will be set to "1". The fourth decision point 1206 will evaluate whether the RF signal waveform characteristics match those of 802.11 waveform. If the answer is "no", the 802.11 waveform flag will be set to "0". The fifth decision point 1207 will evaluate whether the RF signal waveform characteristics match those of 802.16 waveform. If the answer is "no", the 802.16 waveform flag will be set to "O". The sixth decision point 1208 will evaluate whether the RF signal waveform characteristics match those of LTE, or LTE Advanced waveform. If the answer is "no", the LTE, or LTE Advanced waveform flag will be set to "0". The seventh decision point 1209 will evaluate whether the RF signal waveform characteristics match bandwidth of a typical radar signals. If the answer is "yes", the bandwidth flag will be set to "1". The eighth decision point 1210 will evaluate whether the RF signal waveform characteristics match those of CDMA, WCDMA waveforms. If the answer is "no", the CDMA, WCDMA waveform flag will be set to "0". The ninth decision point 1211 evaluate whether the RF signal waveform characteristics represent a single event, or a spurious emission event. If the answer is "no", the single event, or spurious emission flag will be set to "0". The tenth decision point 1212 will evaluate whether the FFT operation is being requested. If a request is made for the FFT operation 1213 for a signal under consideration, the SSS will execute. If the answer is "yes", the FFT operation flag will be set to "1".

FIGS. 12A and 12B are exemplary and one of ordinary skill in the art recognizes that not all steps need to be executed, nor done sequentially. Order of steps in FIGS. 12 A and B are not mandatory or mutually exclusive; they can be altered or can be interchanged; nor do the figures represent all the steps and functions that could be executed by the matrix. Hence, FIGS. 12A and B should not only be limited by steps and functions presented, since other steps and functions may also be possible and may be performed.

Integration of all of the weighing factors into a decision matrix 1214 should be used to correctly identify a radar signal with a high probability of detection. Hence, if the SSS RF detector received a 1-10 microsecond pulse of relatively high power 1203 when compared to the power level of communication signal, if such a signal was not identified as a communication signal 1206, and if a received signal displayed a repeatable pattern over a 1-10-30 second period, a probability that a radar signal has been detected by the SSS is extremely high.

Continuing to monitor a periodic RF signal with characteristics associated with a radar signal over an extended period of time would provide even a higher degree of assurance and probability of assurance that a detected signal was emitted by a radar system. That type of information could be used by the SSS wireless communication network within 3100-3650 MHz and other frequency bands to take appropriate action and to begin to disconnect and discontinue service to its active mobile and fixed wireless users.

As part of the analysis the decision process, the SSU investigates various combination of the parameters that have been detected, in which order they would be evaluated, examined and ranked. Groupings of two or more markers from different parameters becomes an important part of the process. A decision process within the SSU develops a ranking matrix order based on the parameter markers, their priority, and combinations of markers from different groups of parameters examined.

The PRF Marker, Amplitude marker, and characteristic of repetitive waveform marker must be set to a logical condition equal to TRUE. Another way of saying is Logical condition set to TRUE is equal to 1.

A criteria of three sets of different markers combined together through a logic (AND) operation would be needed to conclude that a detection of a radar signal has taken place. Such a minimum set of markers would consist of Amplitude, PRF and Time of Observation markers. Both the PRF and the characteristic of repetitive waveform marker would have to be TRUE for characteristics of a radar signal as represented in FIG. 12, and markers would have to be combined through the logic (AND) operation which would yield a valid logic result of 1, and produce a logical result of TRUE. Those three sets of combined signal markers would be the: Amplitude, PRF and the characteristic of repetitive waveform markers. Of course the additional signal markers could be combined via a logic (AND) operation with the power marker and PRF marker in order to produce an identification result with a greater probability of certitude.

Once the SSS has determined that the incoming signal does not conform to characteristics of communication protocols, then SSU would proceed to use the signal amplitude, power, PRF and bandwidth information in order to identify a signal. The SSS would contain a lookup table of RF values that could be specified by the regulators. The signal threshold value of a radar signal at which SSS must execute a shut down procedure would be an integral value that would be stored in the SSS computer volatile and non volatile memory. Additional RF values that the SSS would store in volatile and, or non volatile memory would include PRF, pulse widths, and Bandwidths of radar signals that FCC could require SSS to use in order to identify the radar signal. By integrating characteristics of the power level marker, along with PRF and bandwidth marker will provide a high degree of confidence for SSS when trying to identify the incoming the radar signal. The future FCC Part 96 Rules may specify a minimum signal power (or, amplitude) threshold value for detection of a radar signal. The future Part 96 rules may specify additional radar signal characteristics such as: pulse width, PRI, PRF that would contribute enormously in the radar signal identification process by the SSU. That is providing that future FCC Rules would specify these characteristics and they are in effect and applicable for the 3100-3650 MHz frequency band. The SSS would integrate such FCC regulatory thresholds and characteristics into the SSS functionality and use them in its analytical process for the identification of radar signals. The SSU identification process associates a level of amplitude identifier that has been detected, with the a level of PRF identifier that has been detected, with the a level of power that has been detected, and with the level bandwidth identifier that has been detected in order to make a determination about the incoming RF signal. Depending on the signal characteristic, it is possible to associate any one of the four signal power markers with any four PRF markers along with any four bandwidth markers.

The SSS utilizes the fusion, integration, additive effect of different markers and comparison of various markers and their associated analysis which will ultimately result in the SSS decision whether the incoming signal is a radar signal. There is a great deal of variability in the markers which will help define the probability whether the detected signal is a radar signal or not. Future FCC Rules may specify a signal threshold for detection of a radar signal such as the threshold must be stringently observed and enforced in the radar signal identification process by the SSS networking elements. The highest degree of probability will be defined by having all the markers identified as positive and belonging to the incoming RF signal. Those markers are: Power content of a signal, Pulse widths, PRF, PRI, bandwidth, repeatability of the incoming signal. Also, a check of the known communications waveforms such as LTE, LTE Advanced, 802.11, 802,16, CDMA, and GSM would confirm that an incoming signal does not belong to these categories. Additionally, a FFT can be performed on a signal to extract information about a signal in the frequency domain and the associated spectral lines which belong to the incoming RF signal. Fusion and analysis of all these elements together by SSS would provide a resultant with an extremely high degree of accuracy.

Due to numerous possible combinations of radar RF characteristics, there is no one radar characteristic that will be used by a wireless commercial system to identify radar signals. The fact that radar signals consist of variable range of RF characteristics discussed in previous sections of this patent, and that radar emissions are very repetitive will lead to a needed result. Also the RF characteristics within a range of possibilities will be used to identify an incoming RF signal. The aggregate effect of all of these characteristics (such as power level, PRF, PRI, pulse width, spectral components) and a repetitive feature of an incoming RF signal will be used to identify a radar signal by the wireless network, or a commercial wireless network. That is how a determination and identification of radar signals will be made. By examining received pulse widths, spectral components, and through signal repeatability, repetitiveness, via a dedicated listening and receiver device which scans the band of interest.

A spectrum sensor is bound by: the electromagnetic environment in which it operates, cost of implementation, level of available technology and the ability to perform its tasks. The electromagnetic environment in which the spectrum sensor has to do its job must be considered and evaluated. The spectrum sensor must be able to differentiate a radar signal from a communication signal in a crowded RF environment where many, perhaps thousands of CBSD devices and PA and GA devices are operating simultaneously. In a busy electromagnetic environment the RF noise level is usually at high levels. The reliability, affordability and performance leads us to define limitations of such a device.

This embodiment suggest that the lowest value at which radar signals could be detected by a (SSS) spectrum sensor in a crowded electromagnetic environment with a reasonable degree of accuracy is at −95 dBm level. In a crowded electromagnetic environment, Detection of radar signals below −95 dBm value would produce unreliable results with false readings. Hence a reliable performance of a spectrum sensor below this value is not possible.

At the upper range of a scale the ability of a spectrum sensor and its front end to handle RF incoming signals at various signal power levels must be examined. It is important to note that the spectrum sensor must be able to handle multiple RF signals at various signal power levels, and to successfully identify radar signal as its front end is close to the saturation region. This embodiment suggests that the ability of a spectrum sensor to successfully identify different RF signals as a spectrum sensor is approaching the saturation could be compromised at the signal level of −35 dBm. At levels higher than −35 dBm, a reliable detection of a radar signal in a busy electromagnetic environment by a spectrum sensor when its front end is approaching saturation is not possible.

Those two values have a specific meaning for the spectrum sensor and provide a dynamic range for its ability to successfully identify a radar signal. We define that the typical (ESC), or a spectrum sensor (or CBSD with spectrum sensing capability) would have the upper bound of −35 dBm and a lower bound of −95 dBm.

Therefore, based on those two numbers, this patent incorporates a range of values for the FCC threshold that would be utilized for detection of an incumbent radar signal. This patent states that a range of threshold values for detection of a radar signal by the spectrum sensor, or by the CBSD device which has spectrum sensing and radar detection capability are between −95 dBm and −35 dBm. Due to crowding in the electromagnetic environment, the consistent as well as accurate radar detection results should not be expected at levels of −95 dBm and −35 dBm. Since this range of values is huge, and most likely would not yield useful results on the consistent basis, this embodiment suggest a method to narrow down this range of values to a smaller and more meaningful range. We conclude that the optimum threshold range for detection of a radar signal is a halfway point between the two values of −95 dBm and −35 dBm with a deviation of plus or minus 3 dB. The 3 dB factor, or 50% power deviation factor would ensure that different designs could be accommodated and still produce desirable detection results. The previous work conducted on a national level by NTIA and FCC approximately a decade ago suggested and proposed that a level of −62 dBm is a satisfactory threshold for detection of radar signals by Part 15 devices. This level was adapted by the spectrum regulators as a metric to be used in detection of radar signals for Part 15 unlicensed devices. The threshold of −62 dBm for radar detection was suggested by National Regulators for a unlicensed UNII wireless devices which are Part 15 devices. In this patent I propose to use the −62 dBm level as a starting point in order to generate an improved range for radar signal detection that would be implemented in licensed type of service. Additionally, in this patent it is proposed that the distance for a propagation of a radar signal can be increased by a factor of two which would yield a radar signal reduction of −6 dB. Doubling of a distance a RF signal propagates decreases the RF signal power by 6 dB. A decrease in threshold range for a detection of a radar signal, which is represented by 6 dB reduction of power for radar sensing, discussed in this patent is adequate and could be successfully implemented and carried out by a spectrum sensor methods described in this patent. Due to signal propagation characteristics associated with the frequency bands discussed in this patent, some which are significantly lower in frequency than the band(s) utilized by Part 15 (UNII) devices, it is my opinion that the threshold level and threshold range for detection of radar signals can be reduced by as much as 6 dB. Hence for radar detection by the spectrum sensor described in this patent; I propose to make −62 dBm an upper threshold of a radar detection range and to decrease the upper threshold by 6 dB which would yield a lower threshold of −68 dB. If one or more methods described in this patent are used for detection of radar signals, the radar signals can successfully be detected by the spectrum sensor presented in this patent and within the threshold range suggested in this patent. This radar signal detection range would start at −62 dBm and would span 6 dB lower to reach −68 dBm level.

This reasoning yields a much narrower range of numbers from a higher end of threshold of −62 dBm to lower end of a threshold of −68 dBm. In the narrower range of −62 dbm to −68 dbm, we can expect spectrum sensor device to have a reliable and consistent probability of detect for incoming radar signals. In the narrower range, the arithmetic mean of the two values which are the higher end of threshold (−62 dBm) and lower end of a threshold (−68 dBm) would yield the optimum value for the radar threshold detection.

Additional radar frequency bands that could be restructured and reallocated in the future by the FCC in order to support spectrum sharing between mobile as well as fixed wireless devices and radar systems. Hence, if in the future FCC were to issue Rules for spectrum sharing with radar systems, such future FCC rules could be utilized by the SSS network described in this patent to facilitate wireless network data communications for mobile and fixed users in various frequency bands. Spectrum sharing would be made available to mobile and fixed wireless devices via SSS mechanism for sharing under controlled means and under favorable circumstances wireless devices would be allowed to access the radar spectrum. The spectrum use would take place only if the SSS via spectrum sensing system and, or via use of database determined that access is granted to the commercial wireless devices.

The Spectrum Sharing System (SSS) FIG. 13 is a Radio Frequency network which is comprised of a number of key elements. These key elements are: Spectrum Master and Interface Unit (SMU) 1309, Spectrum Sensing and Monitoring units (SSM) Unit(s) 1307, Spectrum Control Units (SCUs) 1306 and CBSD, which function as Access Points (APs), or eNoB, Base Stations, or wireless hubs 1305. The SSS key elements when operating under certain conditions would allow mobile and fixed wireless users access to 3100-3650 MHz frequency band. The future FCC Rules Part 96 could specify additional characteristics by which radar signals could be identified by the SSS. The minimum power threshold for recognition of an incoming radar signal could be dictated by the future FCC Rules and regulations. In case a signal power threshold value and other RF characteristics such as PRF, PRI, pulse width for detection of radar signals have been identified by the new FCC Regulatory statute, then such RF waveform characteristics would be employed, integrated, stored, and utilized for identification of a radar signal by the SSS network. When RF emissions coming from the primary spectrum user(s) which are radar systems are not detected, these SSS network elements would allow for network wireless communication in 3100-3650 MHz the spectrum. When RF radar emissions 1315 radiating from the primary radar user(s), which are radar systems 1308, are detected the SSS network elements interact with each other in order to cease network wireless communication within the said network in the 3100-3650 MHz spectrum. The halting, and stopping of the SSS network data communication functions on certain impacted frequencies would include the mobile as well as fixed users and must be carried out within a N*60 seconds as period specified by the FCC Rules that would be applicable for 3100-3650 MHz frequency band. The time frame to stop transmissions within the SSS network will be identified and utilized in the SSS utility patent for this invention. In effect network data traffic and throughput for mobile and fixed wireless users would stop within a N* 60 second time period as specified by the FCC rules for 3100-3650 MHz frequency band. When the radio communication service is no longer available to mobile 1301 1304 and fixed 1302 1303 wireless devices, the SSS network could provide a capability for these devices to potentially migrate RF communications to the alternate spectrum if such a capability is supportable by the mobile 1301 1304 and fixed 1302 1303 wireless devices. The mobile and fixed wireless devices are in the SSS network identified as the end user devices. Per FCC Rules, the end wireless users will cease their operations within a 10 second period once they receive a termination command from CBSD (Hub, Access Point, or a base station). The SSS 101 has capability to exchange data with other SSS networks 1314 either through wired or via wireless means 1312, and the SSS has an access to the internet 1311, the world wide web and to radar database 1310.

Spectrum sensing and monitoring (SSM) devices 1307 would be used to detect radar signal(s) emissions transmitted by radar systems 1308. The spectrum sensing and monitoring devices 1307 are elements of the SSS and would be implemented in a network configuration and placed in different geographical locations in order to optimize the SSS network coverage and for an improved detection of radar signal emissions. The spectrum sensor and monitoring 1307 would communicate with the spectrum controller units 1306 either through wired or wireless means.

Figure 13A:
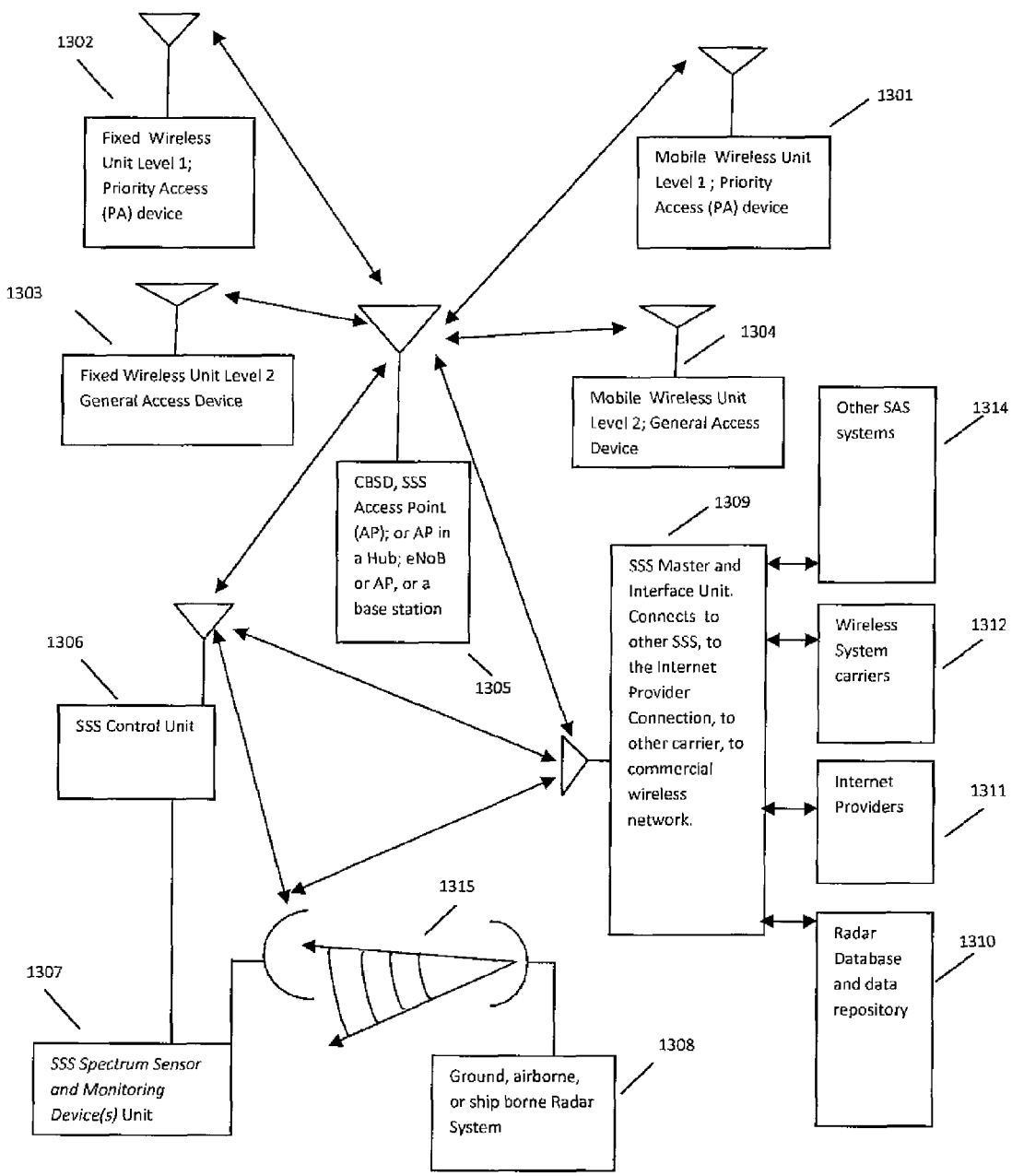
FIG. 13A. Depicts a SSS system with its vital elements including a spectrum sensor.

It must be emphasized that in an alternate SSS architecture depicted in FIG. 13A), the SSS integrates CBSD 1305 device, SCU 1306, and SSM 1307 into a single environmental/spectrum sensor system and into a single enclosure. In this architecture CBSD units perform the function of a spectrum senor since the ESC capability is embedded and integrated into a CBSD device. The functionality of the SSS 101 is able to differentiate between radar signals and between 802.11, 802.16, LTE, advanced LTE and 3GPP signals.

The Spectrum Sensor Unit uses an analytical process in order to detect radar signal emission. Radar signals and their waveforms have recognizable characteristics such as: different power level than communication device emissions, different pulse characteristics such as pulse repetition frequency (PRF), pulse repetition interval (PRI), could have different modulation types than communication systems, and could have different pulse widths than the wireless communication systems. The radar signal emissions are sent as a repetitive sequence, or a burst of pulses during the search and track modes of radar operation. Typically a burst of radar pulses would be made up of approximately half a dozen to twenty pulses. Certainly such a burst of radar pulses could be shorter or longer. Due to their unique characteristics, radar waveforms can be differentiated from communication device waveforms, and radar waveforms can be detected and noted as such. Many different sets of radar waveform combinations are possible and proper analytical and sorting techniques would yield a detection of a radar signature.

Additionally, RF sensor designed to differentiate between a radar signal and a possible communication signal transmissions, such a RF sensor device or a system may, or may not be designed to intercept or capture beacon signals, control, or command signals associated with the RF signal transmissions. That of course would be based on a methodology by which RF sensor's architecture was designed.

By evaluating specific RF waveform criteria carried out by either or both SSU 1307 and SMU 1309, an examination of an incoming signal would be made which leads to a determination whether such a signal has originated from a radar system, or from a communication system. Methodology of how a radar RF signals waveform criteria can be differentiated from communication systems is presented in the following description.

Different waveform markers as well as characteristics used to identify radar signals are: signal power level detected; PRF; PRI; and Pulse widths. Those are the important weighing factors that SSS will use in its analysis.

Differentiation between communication and radar signals lead us to investigate key elements that could help us segregate between the different types of RF signals. One of the most important elements that SSS investigates and compares by its internal functionality is a signal (amplitude, or power) level of a mobile wireless device and a also that of radar signal. As demonstrated previously an amplitude of a signal can be associated with power content of the signal. Typical signal power levels of communication signals associated with handheld wireless devices usually range from a fraction of a watt to one watt. These maximum power levels for communication systems are limited by a regulatory domain and also with a fact that communication devices try to emit the lowest power possible in order to make the battery life last as long as practical. When the SSS compares signal power of a mobile consumer wireless device with power level of a radar signal which typically is in a range of 10,000-40,000 watts, the SSS would immediately detect a huge difference in the power level of RF signals. If SSS were to compare these two types of signals with a RF detector, or with a capability similar to that of a spectrum analyzer, SSS could easily detect a difference between the radar signal and a communication signals. While scenario dependent, a radar signal could easily be 1000, or perhaps even 10,000-30,000 larger in magnitude than a typical signal coming from a RF mobile wireless device. This is a key point to note is the method that the SSS would examine ways to differentiate between a mobile wireless signal and a radar signal. It is very important to note that difference in signal power levels between the two types of systems is truly of a large and significant magnitude.

Perform a radar scan: A SSU 1307 would search, and scan the spectrum by performing a sweep over an entire band of interest. In order to try to locate the radar signal emissions, the SSU would sweep the spectrum of interest, or parts of such spectrum in various increments of 50 kHz, 100 kHz, 100 kHz-1 MHz smaller or larger bandwidths. The SSU would evaluate radar waveform markers or characteristics of the incoming signals that would identify radar signals.

Next, SSS would evaluate weighing factors that would help us determine if the RF signal under observation is the signal generated by a radar. We can certainly say that all radar systems are not created equal, however it is through repetitive radar signal emissions that radar systems perform their intended function. It is this fact of repetitiveness and repeatability along with amplitude of a signal and power level detected that can be used to successfully identify a presence of radar emissions in the frequency band of interest.

Radar systems scan vast regions and "3 dimensional volumes" of space in order to collect information about the surrounding geographical environment and also to locate targets. Radar systems emit bursts of pulses in order to detect if there are any large objects, terrain such as the coast line, mountains, man-made obstacles in their vicinity. Radar systems also emit bursts of pulses in order to locate targets of various sizes, or even very small targets that are many kilometers away from a radar system.

Since a location of a target is not known by the radar system, the radar signal emissions consist of a number of bursts of pulses which may be emitted in many various directions, at many different bearings and at many different elevations in order to collect information about environment and in order to locate targets. In many radar systems the bursts of pulses emitted by radar will be very repetitive and will take place many times a second. In such a scenario it is expected that many thousands of pulses will be emitted every second. An important takeaways is that that radar signals and their associated waveforms are repetitive and repeatable and are taking place many times a second. Hence, if an apparatus for detection of RF radar signals is put in place such an apparatus would not have to search for a long time in order to intersect or to receive the RF radar signals within its operational area.

An important point to note is that we should not think that only government and military personnel can operate the radar systems since radar systems can also be used and operated by the private and non-government and operators as well. One can envision a case where radar systems are utilized by a boat, or a ship to steer its way through a fog or at night.

Due to numerous possible combinations of radar RF characteristics, there is no one radar characteristics that will be used by SSS system to identify radar signals. The fact that radar signals consist of variable range of RF characteristics discussed in previous sections of this patent, and that radar emissions are very repetitive and would create an identification pattern for radar signals. Also the RF characteristics within a range of possibilities will be used to identify an incoming RF signal. The aggregate effect of all of these characteristics (such as power level, PRF, PRI, pulse width) and a repetitive feature of an incoming RF signal will be used to identify a radar signal by the wireless network, or a commercial wireless network. The identification of radar signals by SSS will be made, by examining: power content of a signal, received pulse widths, and through signal repeatability, repetitiveness, via a dedicated listening and receiver device which scans the band of interest, and through use of spectral analysis.

Detecting and evaluating RF parameters such as signal Amplitude level, PRF, PRI, a frequency of operations, and pulse widths by SSS will provide a method for detection of radar signals. A pulse width of a radar signal is also an important element worthy of consideration and evaluation. Radar must illuminate a target with energy for a certain period of time in order to collect enough information about its target. Pulse width of a signal is directly proportional to the Bandwidth of a RF signal. Hence, a rule is that a pulse width ~1/Bandwidth. One microsecond pulse would be approximately equal to Bandwidth of 1 MHz. Looking at pulses with bandwidth of 1 MHz and greater is usually a good measure of estimating pulse widths used by different type of radar systems.

Typically, radar systems emit RF signals at a much higher power level than RF communication devices. Many Federal government radar systems emit power and generate EIRP at levels over 10 kW, and even at levels of over 50,000 watts or more. Hence radar RF signals in the environment may and in many instances can be detected by SSS at a much higher power level than RF signals coming from the communication systems and networks.

The radar signal power level received at a spectrum sensor unit (SSU) 1307 would be dependent on power of radar signal emitted and on a distance separation between radar system and the SSS network. SSU 1307 performing comparison between radar signals and communication signals would have a number of variables to evaluate and based on those variables the SSU 1307 is able to differentiate between a communication signal versus a radar signal. Based on radar signal and associated RF waveform variables such as: power of a signal received, pulse widths, modulation of a RF signal, length of a sequence of pulses received, PRI, PRF, and a repetitive nature of a waveform the spectrum sensor would be able to make a determination whether radar signal has, or radar emissions have been detected. Based on criteria described within this paragraph and on a flow diagram a spectrum sensing and monitoring devices would be used to detect radar signal emissions coming from a radar system.

The SSS 101 is capable of spectrum sensing and monitoring in a variable geographical area. The variable geographical region could cover a fraction of a one city block, one or more city blocks, or even a larger area of multiple city or town blocks. The SSS 101 is capable of being networked with other SSS 102 in order to establish a larger, town, city, state, or even a country real time foot print. The SSS 101 would be used for control and spectrum access of small cells and microcells wireless configurations within the frequency band. One of the SSS elements is a spectrum controller unit which allows access of mobile wireless devices to spectrum within the 3100-3650 MHz frequency band when radar emissions are not detected within the said spectrum. The same SSS methodology and utility could also be applicable to other or alternate frequency bands.

The SSS spectrum sensor unit would inform the spectrum control unit of a radar presence within its geographical area. The radar emissions could be coming from a ground radar, radar located aboard a vessel or a ship, or radar aboard an aerial platform.

If radar emissions are not detected within the 3100-3650 MHz Frequency band, the SSS spectrum sensing and monitoring unit would convey that specific information to the spectrum control units and to the spectrum master unit. Spectrum control units would be informed that the said spectrum is clear for use, that spectrum is not occupied by radar systems and can be made available to the wireless devices. Via a wireless command, the spectrum control units would transmit and inform the CBSD, wireless hubs, access points, eNoB, and/or base station that spectrum is available and that it can be used by the mobile and fixed wireless devices. The mobile and fixed wireless devices are also recognized as Level 1 and Level 2 wireless devices. At that point in time, end user equipment, the mobile and fixed wireless devices could use the said spectrum for data communications purposes. In this embodiment, an alternate SSS architecture depicted in FIG. 13A), it is possible to have the spectrum sensing unit 1307, the spectrum control unit 1306 unit and CBSD device 1305 integrated into a single unit such that multiple functionalities are provided by a single CBSD 1305 device system unit and housed in one enclosure. In FIG. 13A, the CBSD device is capable of spectrum sensing function and spectrum control function in addition to other wireless networking capabilities.

During a predetermined periodic intervals the SSS sensing and monitoring devices would send refresh messages to the spectrum control units. These refresh messages would tell spectrum control units if the spectrum is clear for use.

The spectrum master and interface unit 1309 would have data connectivity to other SAS 1314, with wireless system carriers 1312, Internet Providers 1311, and access to database repository 1310. If the radar signal emissions have been detected by the spectrum sensor and monitoring unit 1307, and when the spectrum is determined by SSS to be occupied by radar operations, the spectrum controller units 1306 via "cease operations" control signal would inform the CBSD, access points, wireless hubs 1305, and/or base stations 1305 that spectrum is no longer available and that wireless communications devices 1301, 1302, 1303, 1304 must cease and terminate their operations and transmissions within a N*60 second period (where N is a value 1 to 10; N can be a decimal, fractional value or an integer). In this patent, "cease operations" control signals also means and refers to "cease SSS network operations". The "cease operations" control signal can also be described as a SSS network command. As long as SSS network deems that a radar system is present within the SSS geographical area of operations, the SSS will continue to issue a denial of service message to the mobile and fixed wireless devices.

The "cease operations" control signal or control signals are transmitted by the SMU 1309, or by SCUs 1306, which informs CBSD, APs, base stations, eNoB, and wireless hubs that spectrum within SSS network in the 3100-3650 MHz frequency band is no longer available for communication purposes. The "cease operations" control signal can consist of a single pulse, or multiple pulses, or a series of pulses. The emitted "cease operations" control signals can consist of a single event, or multiple trans missions. The "cease operations" control signal may consist of variable pulse widths, different amplitudes levels, with different phase shifts, and different modulation types. The "cease operations" control pulses may be transmitted via various communication protocols, or can be implemented via other means and protocols. The "cease operations" control signal could also be implemented via a networking layer or the network transport layer. The "cease operations" command is ultimately directed towards the mobile and fixed wireless users within the SSS network. The "cease operations" control signal will instruct CBSD, AP, bases stations, eNoB, and wireless modems to stop network data traffic and will deny mobile and fixed wireless devices access to 3100-3650 MHz frequency band. The "cease operations" control signal would be executed on the SSS network wide level and after detection of a radar emission. Within a number of seconds (60-600) after the radar signal was detected by SSS, the SSS network traffic would come to a halt on impacted frequencies, as specified by the FCC Regulatory framework and the FCC rules for the 3100-3650 MHz frequency band. Impacted frequencies are frequencies within 3100-3650 MHz frequency band on which radar emissions have been detected by the SSS spectrum and environmental sensor. Once the "cease operations" control signal was transmitted to the appropriate SSS elements, the SSS network would deactivate communication channels to the mobile and fixed wireless devices so that mobile and fixed wireless devices could no longer be able to transmit or to receive on impacted frequencies within the 3100-3650 MHz frequency band.

In a controlled method the CBSD, AP(s), Base Stations, eNoB, wireless hubs, and SMU would orderly terminate wireless connection with the end users as soon as practical, within a number of seconds and during a time frame as, it is expected to be, specified by the future FCC regulations. The end user devices will cease operations in 3100-3650 MHz frequency band within 10 seconds of the command issued by the CBSD which are base stations or access points. If end user devices are capable of supporting communication within alternate frequency bands outside the impacted spectrum, the SCU would instruct the AP(s), Base stations, eNoB, to initiate a changeover and to switch the communication channels to the alternate frequency bands. The architecture represented in FIGS. 13A and 13B essentially performs the same function, with an exception that CBSD devices contain spectrum sensing 1307 and spectrum controller 1306 functionality and capability integrated into CBSD 1305 device as shown in dashed lines. This collection of spectrum sensing 1307 and spectrum control 1306 elements is also referred to as ESC capability in this embodiment and is integrated into a CBSD 1305 device as depicted by dashed lines. In FIGS. 13A and B a separate spectrum sensing and sensor control unit(s) would not be applicable.

Upon the receipt of "cease operations" control signal, the network elements such as Access Points, wireless hubs, base stations 1305 would not allow the end user devices 1301, 1302, 1303, 1304 to access the wireless network. The SSS network end user wireless 1301, 1302, 1303, 1304 units would at that point in time cease operations and transmission within a 10 seconds predetermined period of time that could be specified by the future FCC regulatory requirements for 3100-3650 MHz frequency band and carried out by the SSS elements. Data communications within 3100-3650 MHz would not be possible since spectrum is no longer available. At that time, the end user mobile and fixed wireless units would have a choice of moving to an available channel within the alternate spectrum within 3100-3650 MHz or to other spectrum in other frequency bands, providing such a channel within alternate spectrum is available. Alternatively, yet another choice would be for the mobile and fixed devices to stay silent, not to switch to the alternate spectrum, and for these devices not to transmit, nor receive within 3100-3650 MHz spectrum.

Two levels of wireless devices are employed within 3100-3650 MHz: Priority Access Level 1 preferred devices, and General Access Level 2 common devices. In this environment both Level 1 wireless devices and Level 2 wireless devices must protect radar operations by ceasing their transmission and remaining silent, or moving to the alternate spectrum. Level 2 common wireless devices would have to protect Level 1 wireless devices from Level 2 wireless device interference.

CBSD, Access Points (APs), base stations, eNoB, wireless hubs provide communication channels of variable bandwidths to the mobile and fixed wireless devices within the 3100-3650 MHz spectrum. The SSS communication channels can be but not limited to 1 MHz, 5 MHz, 10 MHz, 20 MHz, 40 MHz, 80 MHz, or other bandwidth values. The APs would support multiple wireless protocols, standards, and waveforms. As long as the Spectrum Control Unit (SCU) 1306 allows dataflow within the network, the CBSD, APs, eNoB, base stations, would continue to serve the wireless end users. Once the SCU informs CBSD, AP unit(s), eNoB, base stations that spectrum is no longer available, and after "cease operation" control signal was enforced through the network there would be a follow on SSS network command which would be broadcasted within the network. At that time CBSD, AP unit(s), eNoB, bases stations would broadcast a "denial of service" message to the wireless end users. As long as a "denial of service" message is being broadcasted within the SSS, the AP(s), Base Stations, eNoB, SMU, wireless hubs would no longer accept any new communication requests from the end users. The "denial of service" message would continue to be broadcast as long as SSS would have indications and knowledge that radar systems were present in the SSS geographical area of operations.

In a typical mode of operation, the wireless network (SSS) would scan 3100-3650 MHz spectrum for incoming radar emissions. If radar emissions are not detected the network would assign available channels, from its directory of available channels, to mobile and fixed wireless devices. The SSS network via various communication protocols, utilizes channels of variable bandwidths such as: 1 MHz, 5 MHz, 10 MHz, 20 MHz, 40 MHz, 80 MHz, or other bandwidth values that SSS could use to assign communication channels to the mobile and fixed end users. In one embodiment channels of variable bandwidth could be assigned to both Level 1 1301, 1302 wireless devices and Level 2 1303, 1304 wireless devices.

If supported by the communications protocol such as but not limited to 3G, LTE, or LTE Advanced, the network could assign aggregated channels of variable bandwidth to wireless devices which have capability to request aggregated channel communications and to capability support such functionality. As the next step, the SSS wireless network would establish and maintain appropriate communication protocols in order to support communication channels for wireless devices. As long as radar signal emissions are not detected by SSS, the network communication operation would continue. By exchanging requests with CBSD, APs, base stations, eNoB, wireless hubs, the wireless devices would be allowed to attach and to detach themselves to the network, and new wireless device requests for communications would be processed. This network operational state would continue to support data flow until the wireless communication network detects radar signal emissions.

If and when radar signal emissions are detected by the SSS network, the spectrum sensor unit and the wireless network would inform the CBSD, APs, base stations, eNoB, wireless hubs that radar signals have been detected. The detected radar signal emissions may have to meet the characteristics for radar signal detection as may be mandated by the FCC regulatory framework. The "cease operations" control signal would be broadcast within the SSS network. Subsequently, a network would initiate a network deactivation, to the mobile and fixed end users. The "cease operations" control signal would result in the network terminating service to the mobile and fixed wireless devices on impacted frequencies during a (N*60 seconds) period specified by the FCC regulatory framework for the 3100-3650 MHz frequency band. The mobile and fixed wireless users would have to abandon RF channels within the impacted radar spectrum of 3100-3650 MHz frequency band. By the end of a time period specified by the FFC regulation for the 3100-3650 MHz frequency band, the SSS wireless network would cease to provide communications service to the mobile and fixed wireless devices to include all Level 1 and Level 2 devices. If wireless devices have a capability to switch to other frequency bands, and an access to other spectrum, the mobile and fixed wireless devices would switch their operations to the alternate spectrum. If mobile and fixed devices have no access to the alternate spectrum, then a network would go into a wait period until radar signal emissions are no longer detected. During a waiting period no communications channels on impacted frequencies would be provided to the mobile and fixed wireless devices. During the waiting period the network would continue to scan the spectrum for radar signal emissions. Only after radar signal emissions have not been detected for a predefined period of time, as may be specified by the future FCC rules and regulations and providing such FCC rules are applicable, would the SSS wireless network begin to realign its resources for continued operations within the 3100-3650 MHz spectrum.

Spectrum Sensor Units (SSU) scans the 3100-3650 MHz spectrum for detection of radar signals. The SSU employs techniques outlined in radar detection section to identify and detect radar emissions. If radar signals are not detected the SSU informs SCU and SMU that spectrum is free of radar emissions and that the SSS can provide wireless service to CBSD, APs and to the mobile and fixed wireless devices. Alternatively, the SSS could detect RF emissions that possess characteristics presented in this patent which meet the radar signal detection criteria. Such signal detection criteria could include: RF signals that do not conform to protocols or standards of communication systems, RF signals of much higher power level than those in communication systems, emissions which have repetitive burst of pulses with typical PRI and PRF associated with radar emissions. The SSS would continue to monitor the spectrum and would store information in the memory of radar detection occurrences. Should new 3100-3650 MHz FCC rules specify a time period for retention of radar detected data, the SSS, and the database will be designed to comply with such FCC rules. If such criteria is detected only once, that would not be conclusive amount of data to determine a presence of radar systems since there is a possibility of spurious emissions. However, if occurrences of such criteria is detected on multiple occasions over a period of time, the SCU would conclude that radar emissions have been detected.

Figure 14:
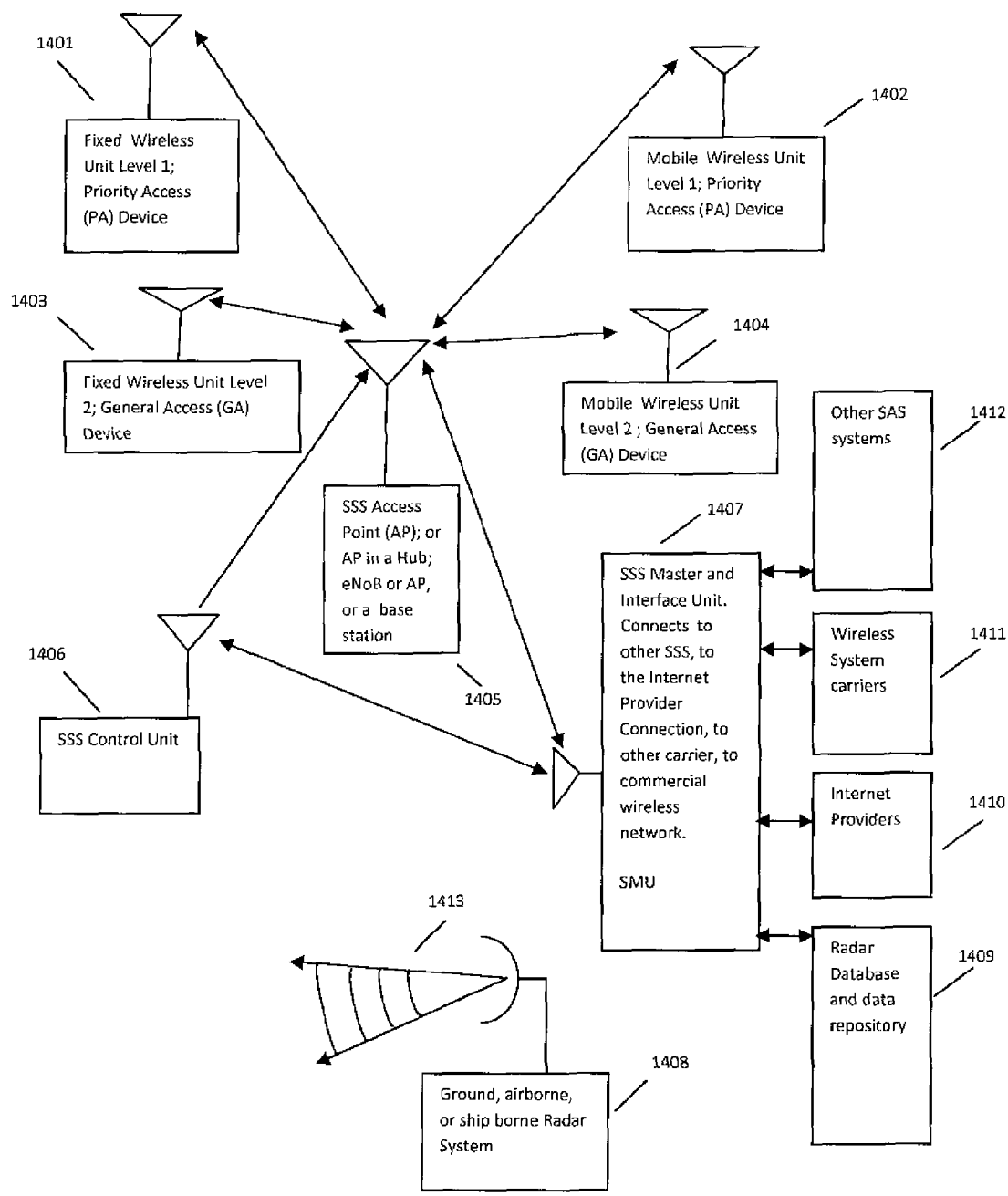
FIG. 14. Depicts a SSS system with its vital elements, but without a spectrum sensor.

FIG. 14 depicts the SSS network that will be referred to as SSS with a name of ABC. It should be noted that the SSS named ABC operates without the spectrum sensing capability. The spectrum sensor could be disabled, temporarily unavailable, or not present in the SSS configuration named ABC. While SSS named ABC is not currently in a possession of the spectrum sensing capability, there exist other SSS networks which have the functional spectrum sensing capability. The other SSS networks with spectrum sensing capability are capable of exchanging data with SSS named ABC through the internet or other communication means. Additionally SSS named ABC has a database access which would be able to provide SSS named ABC with even more information so that SSS named ABC could make a determination about spectrum access to the 3100-3650 MHz frequency band in a desired geographical area of operations. When the spectrum sensor data and capability are not present, the alternate method for determining availability of communication within the 3100-3650 MHz would be via a database approach and, or through exchange of data with other SSS networks. This approach would generate an alternate method which would be utilized as an augmentation method by the SSS named ABC in the absence of spectrum sensor capability.

The database would be available via internet or other communication means and the database would include known locations of known radar systems stored in its contents. The database could also include information about necessary distance separations between area of coverage for the SSS named ABC and the operational areas of known radar systems. The distance separation between radar operational areas and the SSS named ABC area of operation would ensure that any potential emissions generated by the SSS named ABC elements do not negatively impact radar operations. In order to mitigate potential interference, the operational area for the SSS named ABC should not overlap operational areas for radar systems. The SSS named ABC has GPS (geo location) data about location of its elements and with access to the database content, the SSS named ABC has ability to determine if wireless communications is allowed in the SSS named ABC geographic area of coverage. The time duration for storage of radar information by the database, or by the SSS networks in general may be specified by the future FCC regulatory framework for the 3100-3650 MHz frequency band. Such time duration for storage of radar data would be integrated into the general SSS functionality and incorporated into the final version of utility patent for this SSS invention. If future FCC rules for 3100-3650 MHz specify a time duration for data storage of radar information, that time frame specified by the FCC would also be incorporated in the final version of this patent.

The Spectrum Sharing System (SSS) named ABC FIG. 14 is a Radio Frequency network which is comprised of a number of key elements. These key elements are: Spectrum Master and Interface Unit (SMU) 1407, Spectrum Control Units (SCUs) 1406 and CBSD, Access Points (APs), or eNoB, Base Stations, or wireless hubs 1405. This version of the SSS network in FIG. 14. does not have the spectrum search capability and does not have SSU. The database operations and functionality would conform to the future FCC regulatory framework created for 3100-3650 MHz frequency band. The SMU 1407 would perform a check of a database to determine if conditions are favorable within its area of operation for the 3100-3650 MHz frequency band. The SMU checks if spectrum within SSS number 101's geographical area is available for use. The database check would either confirm that the 3100-3650 MHz frequency band within the SSS named ABC's geographical area is either available for use, or not available. If less than favorable conditions are confirmed via database means, the SMU would interact with SCU and CBSD, AP, base stations, eNoB, wireless hubs and instruct them via "cease operations" control signal that communication channels must be terminated and shut down within 3100-3650 MHz frequency band. The termination of operations within 3100-3650 MHz frequency band would be carried out in a timeframe as specified by the future FCC rules for the 3100-3650 MHz frequency band. Subsequently, a "denial of service" message would be broadcasted within the SSS named ABC, and new requests for communication channels within the 3100-3650 MHz will not be processed. When the radio communication service is no longer available to mobile 1402 1404 and fixed 1401 1403 wireless devices, the SSS number 101 network could provide a capability for these devices to potentially migrate RF communications to the alternate spectrum if such a capability is desired and supportable by the mobile 1402, 1404 and fixed 1401, 1403 wireless devices. The mobile and fixed wireless device(s) are represented by a network as being the end user device(s). The SSS named ABC has capability to exchange data with other SSS networks 1412 either through wired or via wireless means 1411, and the SSS named ABC has an access to the internet 1410, the world wide web and to radar database 1409.

Wireless operations within 3100-3650 MHz frequency band will support Level 1 and Level 2 wireless devices. Level 2 wireless devices must not cause interference to Level 1 wireless devices within the said spectrum.

The APs and, or base stations within the wireless network outlined in FIG. 13 will maintain a log which contains Quality of Service (QoS) variables for Level 1 and Level 2 mobile and fixed wireless devices. As Level 1 wireless devices begin to report degradation in data rate throughput, increase in bit error rate, denial of network access, the base station, and Access Points will perform a network check function. The base stations, APs, eNoB, and Master Spectrum Unit will ensure that no radar signals have been detected and or reported within the entire network lay down, or within the geographical area where the QoS has been degraded. If the radar signals have not been detected, and or reported, either with the entire network lay down or within the geographical area where the QoS for Level 1 devices has been degraded the base station would perform additional analytical tasks.

The base station, CBSD, and or Spectrum Master Unit would examine the network loading, number of Level 1 and a number of Level 2 wireless devices within an impacted geographical areas, proximity of each wireless user to the AP, or the base station, the S/N of each wireless users within the impacted area. The Level 2 wireless device(s) which are identified of having caused interference to Level 1 wireless devices will be tagged by the base station and, or by the Master Spectrum Unit. Either the base station by itself, or in conjunction with the Master Spectrum Unit, control signals will be sent by the base station, or Access Point to Level 2 wireless devices identified as interferers to lower their S/N levels, or cease operations. In order to mitigate interference Level 2 wireless devices will lower their S/N levels as directed, or perhaps cease their transmissions. The QoS monitoring by the base stations will continue. If Level 1 wireless devices no longer report interference to their operations, no further action will be taken by the base stations, access points and the master control unit. If the interference to Level1 wireless devices continues to manifest itself, the base stations would instruct APs to lower their S/N again. If after multiple attempts to lower Level 2 devices S/N ration does not resolve the interference problem to Level 1 wireless users, the base stations and AP will have a choice of denying Level 2 devices access to the network and to temporarily discontinue wireless service to Level 2 devices until the interference problem has been resolved. How quickly to execute the denial of service and the period of time that Level 2 devices would remain out of the network may be determined by the FCC regulatory statute.

FIG. 15 depicts a flow diagram of the SSS network operation. The SSS network spectrum sensor scans 1501 the 3100-3650 MHz spectrum, or other frequency bands allocated for radar signals. The incoming RF signals are evaluated by the SSS to determine if an incoming signal is a radar signal 1502 and whether the incoming signal meets the FCC Regulatory criteria for identification of radar signals. If no radar signals are detected by the SSS, the SSS reviews and checks channel directory 1503 for available channels. As new mobile and fixed devices request channels access, the SSS allocates available channels 1504 to the wireless devices which requested channels and network access. If channels wider than 1 MHz of bandwidth are requested by the mobile and fixed devices, the SSS will have a capability to aggregate 1505 multiple channels together providing enough wireless channels are available. These actions will be carried out via protocols used for communication. Subsequently the SSS provides and established communication 1506 for mobile and fixed wireless devices for Level 1 and Level 2 wireless devices. The SSS updates its directory 1507 of available wireless channels as mobile and fixed devices enter and exit the network and network domain. The SSS continues to facilitate wireless network operations 1508 to mobile and fixed devices until radar emissions are detected. Once radar emissions are detected by the SSS network, the SCU checks to determine if CBSD, AP 1509, base stations, eNoB, wireless hubs are being utilized for data communications and to determine if channels are active. If CBSD, AP, base stations, eNoB, wireless hubs are not being used 1515, the SSS process checks to determine if CBSD, APs have requested entrance to the spectrum, the SSS returns to scanning the spectrum and waits to detect that spectrum is clear of radar emissions. However, if CBSD, AP, base stations, eNoB, and wireless hubs are being used, the SSS notifies 1510 CBSD, AP, eNoB, base stations, wireless hubs that radar emissions have been detected. Subsequently the SSS initiates a network shutdown sequence 1511 for impacted frequencies which must be executed within a N*60 second time frame specified by the FCC Rules and the regulatory framework for 3100-3650 MHz frequency band. At this point in time, the SCU deactivates access 1512 and ceases operation with mobile and fixed wireless devices. The end user devices will cease operations in 3100-3650 MHz frequency band within 10 seconds of the command issued by the CBSD which are base stations or access points. A logic statement will be executed next. If mobile and fixed wireless devices are requesting access to alternate spectrum 1513, the SSS provides a switchover to alternate spectrum, or to alternate frequency bands 1514. If an alternate band access is not requested by the mobile and fixed wireless devices, the SSS will wait until spectrum is free of radar transmissions and for a predetermined period 1516 as may be specified by the future FCC rules, providing such FCC rules are in effect. Subsequently, the SSS will check to determine if mobile and fixed devices have requested access to the 3100-3650 MHz spectrum, 1515 and if such a request has been made, the SCU will continue and will rescan the spectrum.

The mobile and fixed wireless devices are able to access spectrum in 3100-3650 MHz frequency band that previously could not access nor use for communication purposes. The mobile and fixed devices are communication devices for the end user in a frequency band that have not been used for this type of service previously. The mobile and fixed end user devices have ability to transmit and to receive data within 3100-3650 MHz frequency band, via various communication protocols. The mobile and fixed devices are able to request access and to use channels of variable bandwidths such as: 1 MHz, 5 MHz, 10 MHz, 20 MHz, 40 MHz, and 80 MHz within the 3100-3650 MHz frequency band. The same SSS methodology could also be applicable to alternate frequency bands. The end user mobile and fixed devices accept control signals from CBSD, AP, base stations, eNoB, wireless hubs which direct mobile and fixed wireless devices to initiate, maintain, and terminate data communications with CBSD, AP, eNoB, base stations, wireless hubs devices within the said spectrum. Additionally, the mobile and fixed wireless end user devices have ability to migrate to the alternate frequency bands.

All CBSD devices within geographic protection zones will be identified by SSS as potential interferers to the radar system. The SSS/SMU via ESC sensing capability determines whether the FCC regulatory criteria used to protect radar system is exceeded. Currently, the regulatory FCC specific power level threshold level has not been identified, but in this patent, we propose a range of power values that will capture this regulatory criteria when it is finalized by the FCC and this range has been defined as "the predetermined or threshold frequency band". One value, or one "predetermined" number within a range of power values suggested in this patent for a radar signal detection will trigger the ESC sensor and when that happens, the SSS would order/inform CBSD devices to go into a shutdown procedure within N*60 seconds time frame. The FCC has already proposed that CBSD devices must shut down within 60 seconds once a radar signal is detected by ESC. However, certain wireless industry players have petitioned the FCC to extend the CBSD shut down procedure to 10 minutes. Most likely the shut-down period will be extended to a few minutes, but as of January 2016 the precise time frame is still open for negotiations. The range of power values for a trigger condition being proposed herein is from −95 dBm to −35 dBm. However, a narrower range of −68 dBm to −62 dBm is also suggested. The optimum value for detection is an arithmetic mean of these two values.

In this patent a reference to CBSD units also includes AP, Wireless Hubs, base stations, and eNoB devices. CBSD unit would behave like a wireless hub and would have these characteristics.

Upon detection of a radar signal by the ESC, radar signal information such as power level and potentially other RF characteristics are relayed to the SSS/SMU. The SSS/Spectrum Master Unit (SMU) perform the FCC regulatory compliance check. It must emphasized that in this patent we propose that it is also possible for CBSD and ESC units to complete the regulatory compliance check as well. Hence, it suffices to say that the SSS performs a compliance check without making a specific reference to SMU. The compliance check by SSS/SMU is carried out via a comparison process of the FCC regulatory values in order to determine which CBSD would be allowed to operate. This computerized SSS process ensures that a detected radar signal is in compliance with the established FCC Regulatory Criteria. If the SSS determines that the FCC regulatory criteria is satisfied, then the specific CBSD units within the SSS domain which meet the FCC criteria are allowed to operate and to provide wireless service to the end users which are PA and GA wireless units. If SSS determines that radar signal at CBSD (lat/long) location does not comply with the allowed FCC criteria, that specific CBSD is instructed by SSS Spectrum Master Unit to terminate its operations within a prescribed timeframe (N*60 seconds). N can be a value of 1-5; or even a value such as 1.7, 2.3, 4.5.

There are a plurality of functional configurations of the SSS elements and their processing capabilities possible in order to determine and establish various geographic protection zones. In this embodiment a reference to a spectrum sensor is equivalent to and synonymous with the Environmental Sensor Unit (ESC).

The SSS Functional configuration (1) Spectrum sensing and calculations are utilized. In this embodiment we define ESC as equivalent of spectrum sensor presented in the provisional patent. SSS uses Spectrum Sensing, or the Environmental Sensing Unit (ESC) to detect a radar signal and to measure radar signal power. In this functional configuration SSS has a capability to sense the spectrum and to employ calculations to determine which CBSD unit(s) need to be deactivated. In this functional configuration only ESC units have a spectrum sensing capability and CBSD devices do not have a spectrum sensing capability. Many ESC units can be employed and implemented by the SSS network, and ESC units can exchange information with each other. Upon detection of a radar signal, the ESC relays radar detection information to SSS/SMU. In this configuration SSS/SMU via a RF propagation model, or via free space loss model, may calculate which CBSD, or CBSD units will be impacted by power threshold of a detected radar signal. SSS/SMU then compares radar signal power at each CBSD location to the FCC regulatory power threshold, or the FCC criteria. Depending on a power threshold calculated at CBSD location, and possibly on other radar RF characteristics such as PRF, PRI, pulse width, will provide a result which will either allow the specific CBSD to operate, or would require the specific CBSD to go into a shut-down procedure. FIG. 13 would represent this functional configuration.

The SSS functional configuration (2) Spectrum sensing only, without calculations, uses Environmental Sensing Unit (ESC) to detect a radar signal and to measure radar signal power. Many ESC units can be utilized and implemented by a single SSS network, and ESC units can exchange information with each other. In this functional configuration only ESC devices have a spectrum sensing capability built in, and CBSD devices do not have a spectrum sensing capability. In this configuration propagation calculations are not carried out by the SSS/SMU, and only the ESC units perform spectrum sensing. In this SSS specific architecture many/multiple CBSD units are associated with a specific ESC unit. FIG. 13 would also represent this functional configuration.

The SSS/SMU has a real time information to identify which CBSD units are associated with a specific ESC unit. Upon detection of a radar signal, one or multiple ESC units relays radar detection information to SSS/SMU. In this method all CBSD units which are associated with a specific ESC at which radar signal power level does not conform to the FCC regulatory criteria are turned off. SSS/SMU determines via a comparison method which ESC will be impacted by power threshold of a detected radar signal. SSS/SMU then compares radar signal power at ESC with the FCC regulatory power threshold. Depending on comparison of a FCC power threshold, or the FCC criteria, by SSS/SMU, will result in either allowing the CBSDs associated with a specific ESC to operate, or would require the CBSDs associated with a specific ESC to go into a shut-down procedure. The signal for CBSD devices to terminate operations may be issued either by ESC, or by SSS/SMU.

The SSS functional configurations (3) and (3A) use CBSD devices which have spectrum sensing capability built into CBSD devices to detect and measure radar signals. The configurations 3 and 3A) do not have separate ESC units present in their networks since separate ESC spectrum sensing units are not needed. FIG. 13A with dashed lines would represent both functional configurations 3 and 3A.

The functional configurations 3) and 3A) would not utilize ESC device as a standalone unit since spectrum sensing is being done by the CBSD device.

Additionally, only the functional configuration 3) may have a capability to perform RF propagation calculations, or free space loss calculations, via SSS/SMU if such capability was needed, implemented, or desired.

Many CBSD units would be deployed by each SSS and CBSD units are able to communicate with each other. In functional configurations 3 and 3A), either each individual CBSD devices would determine if a CBSD device should be shut down, or SSS/SMU on a network level would determine which of CBSD devices should be shut down upon radar signal detection. Whether the shut-down procedure is done on an individual case, or via SSS on a network case, these decisions would be carried out via a comparison process described later in this patent. The comparison process would compare radar signal power and perhaps other RF radar signal characteristics at each CBSD location to the FCC regulatory power threshold, or with a set of the FCC regulatory criteria. If comparison process indicates that compared values are not in conformance with the FCC criteria, the CBSD devices would be shut down within N*60 seconds period.

The functional configuration 3A) would not perform RF propagation calculations. Many CBSD units would be deployed by each SSS and CBSD units are able to communicate with each other. FIG. 13A would also represent 3A) functional configuration and it can be observed that spectrum sensor and CBSD units are enclosed by dashed lines. Functional configurations 3A) would not utilize ESC device as a standalone unit. The decision which CBSD would be turned off would either be carried out via individual CBSD units, or via SSS/SMU. In case in which individual CBSD units make a decision, that function would be carried out by each CBSD unit via a comparison process.

Once a radar signal is detected by a CBSD, In design implementation where SSS makes a decision which CBSD units would be turned off, it is envisioned that each specific CBSD unit would relay detection information to SSS/SMU. SSS/SMU then compares radar signal power at each CBSD location to the FCC regulatory power threshold, or FCC set of regulatory criteria. Depending on a comparison of a power threshold calculated by SSS/SMU, the result will either allow a specific CBSD to operate, or would require the specific CBSD to go into a shut-down procedure. In this functional configuration, the SSS/SMU would not perform RF propagation calculations.

The SSS functional configuration (4) uses a hybrid approach which utilizes both ESC and CBSD devices to detect radar signals and to measure the detected radar signal power. In a hybrid functional configuration (4), the SSS may utilize multiple ESC units and multiple CBSD devices to perform detection of radar signals. The hybrid functional configuration 4) could consist of various combinations of four (1, 2, 3 and 3A) functional configurations previously described.

The geographical area also known as geographic protection zone is bound by a geometric shape which has specific marker points that are identified by a set of latitudes and longitudes abbreviated in this patent by the lat/long designator. The geometric shape could be a circle centered at a specific lat/long and this circle has a radius associated with a center point lat/long. In order to prevent interference to a radar system, the establishment of multiple geographic zones within the SSS geographic domain is possible and creation of multiple geographic protection zones could take place.

Also, these geographical areas known as geographic protection zones are bounded/enclosed by polygons, rectangles, whose nodes, or corner points are identified by specific lat/long points. Nodes of polygons are points at which two sides, or legs of a polygon or another geometrical shape join together. The geographic area also known as geographic zones could also be identified by other geometric shapes as long as geographic area can be accurately specified and marked by a number of identification points where each identification point is represented by a lat/long designator. Geographic protection zones could also be implemented via circles that have a center point specified by a lat/long and also a radius of a circle which describes the size of a circle and can be used to calculate the area of a circle. The geographic protection zones with their boundaries and corner points identified, could be overlaid on am electronic map.

The SSS geographic protection zones will be established in geographical areas every time an ESC device or a CBSD unit with ESC capability, or a RF gear equipped with the environmental sensing capability (ESC) detects radar emissions. Terms ESC and ESS are used interchangeably within this invention/patent. The geographic protection zone enclose, or fence off, a number of CBSD units within a geographical area, such that these enclosed CBSD units could not operate and could not provide service to their respective end users which are PA and GA. Depending on a characteristics of a detected radar signal such as power, and distance from ESC units, and placement of a radar system within the environment, the geographic protection zones are geographical areas that will be, or may be, unique for each case when radar emissions are detected by the ESC. The geographic protection zones will be of a temporary nature that only prevent CBSD from servicing end users while radar emissions are being detected and during a time period as determined by the FCC regulatory framework which mandates under which circumstances CBSD(s) cannot be operated.

The purpose of geographic protection zones is to protect radar operations from being interfered by CBSD and end user emissions within the geographic area where detection of radar signals has taken place by the ESC, or by CBSD with ESC spectrum sensing capability. The geographic protection zones will be geographic in nature and will occupy a certain city area, or geographic areas. The geographic protection zones within city area, or areas, can be represented as a polygon(s), or circle(s) or via other geographic shape(s). The geographic protection zone within a city area would be identified by one or by multiple Lat/Long data points. If a geographic protection zone is represented by a circle, a circle center point would be specified by a Lat/Long and it would have an appropriate radius associated with this center point. If a geographic protection zone is represented by a polygon, then multiple Lat/Long points would be used to represent this geographic protection zone. Each corner point of a polygon which represents the geographic protection zone would be represented by its lat/long point.

In one embodiment of Spectrum Sensors or Environmental Sensor Unit (ESS)/(ESC) units having a capability to detect radar signals is a dedicated spectrum sensor version of the SSS. Upon detection of a radar signal by the ESC, radar signal information such as power level and potentially additional RF characteristics are relayed to the SSS/Spectrum Master Unit (SMU). If the radar signal power does not meet the FCC regulatory criteria, or if it is in violation of the allowed FCC thresholds, or other FCC established criteria, the SSS/SMU will instruct all CBSD devices to shut down.

In this configuration, only ESC units have the spectrum sensing capability to detect radar emission. Typically ESC unit(s) would be located on a higher elevation than CBSD units and as such have a longer view of the terrain and the geographical coverage of their surrounding area. ESC devices can located on higher above ground elevations within a city area in order to provide ESC device with an improved line of sight over surrounding terrain. ESC devices could be located on towers, hills, or on top of the buildings, among many other possibilities, hence ESC devices or units may have, or would have an increased Line of Sight (LOS) coverage and as such ESC can detect incoming radar signals at longer distances. In comparison to ESC units, typically CBSD units could be located inside buildings, malls, various locations on city streets to include on telephone poles, or on power line poles amongst other possibilities.

In a SSS Functional configuration (2), which is a variant of a primary configuration, a number of CBSD units are associated with a specific ESC device. In this functional configuration, only ESC devices have a spectrum sensing capability. Upon radar signal detection, the ESC unit will compare a detected radar signal power at the ESC lat/long location with the FCC regulatory criteria. If the radar signal power does not meet the FCC regulatory criteria, or if it is in violation of the allowed FCC thresholds, the specific ESC, or SSS/SMU will instruct all CBSD devices associated with the specific ESC to discontinue operation within N*60 second time period.

In a SSS Functional configurations (3) and 3A), as depicted in FIG. 13A), the CBSD/AP/Hubs/ENoB/ devices have a capability to detect radar signals in addition to servicing Priority Access (PA) and General Access (GA) wireless users. Separate ESC devices would not be used in these 3, and 3A functional configurations.

In configurations 3) and 3A), the CBSD (or access points, wireless hubs) units have the spectrum sensing, or ESC capability built into them and are able to detect radar signals. CBSD units will detect the radar signal and obtain a measurement of a radar signal power at the CBSD location. In this version of the architecture, the CBSD units have radar sensing capability and a separate ESC unit is not present or used in this configuration.

In configuration 3) the SSS/SMU may be required to perform RF signal loss calculations for detected radar signals. In functional configuration 3A), the SSS does not perform RF signal propagation calculations, or RF signal loss calculations.

In the FIG. 13A configuration the AP/eNoB/Hub/CBSD 1305 unit would be grouped with the Spectrum Control Unit 1306 and Spectrum Sensor and Monitor Unit 1307 with DASHED lines to show that all these elements are integrated into a single unit in the alternate SSS architecture.

In the Hybrid SSS Functional configuration (4), or a DUAL COMBINED DETECTION SYSTEM configuration ESC AND CBSD BOTH DETECT RADAR signals; In this version of the system the CBSD units would also have an ESC sensory functionality built in and are able to detect radar signals.

Additional details about the process and method for SSS operation may include:
A) Detection of a radar Signal by the dedicated Environmental Spectrum Sensing Unit (ESS) unit which has a radar sensing capability. The power value or a threshold of a detected radar signal is measured by ESS/ESC and such information is relayed to the SSS/SMU.
In the functional configurations (3) and (3A) the CBSD units would sense and measure power level of a detected radar signal. In these configurations, depending on a specific configuration, the SSS/SMU may, or may not be required to perform the RF signal loss propagation calculations since the CBSD units would have the ability to obtain a power measurement of the radar signal.
In the functional configurations (3), or hybrid configuration (4), the CBSD units would have the radar sensing capability to sense the presence of a radar signal. Essentially, the environmental radar sensing (ESC) capability and functionality would be integrated or embedded in the CBSD units.
B) ESC dedicated units and, or ESC equipped devices such as CBSD provide information to the SSS/SMU about a detected radar signal which includes signal power level of a detected radar signal. Additionally ESC and or ESC equipped devices such as CBSD may also have a capability to detect other radar signal RF characteristics such as PRI, PRF and pulse width and to report them to SSS/SMU.

In the functional configurations (3), (3A) and (4), CBSD units with spectrum sensing, or the ESC embedded capability also provide detected radar information to the elements of SSS. Devices with spectrum sensory, or (ESC) capability periodically keep updating elements of the SSS with the radar signal information. These updates from ESC/spectrum sensing capable devices inform SSS whether the radar signal or S/N ration has increased in power, if the radar signal or S/N ration has decreased in power, or if the radar signal is no longer detectable. After a predetermined time period that may be specified by FCC rules, once the radar signal is no longer detectable by the ESC sensor equipped devices, the SSS would be able to restart/reengage operation of the CBSD units with end users.

C) In all functional configurations (1-4), SSS/SMU has a list, in a digital format stored in memory, of each CBSD unit's lat/long location and their geographical area of operations. This list is periodically updated to reflect a real time placement of ESC and CBSD units within the geographical environment.

D) In all functional configurations (1-4), CBSD and ESC units have GPS capability built into them, and periodically update SSS/SMU of their lat/long/elevation location. Hence, SSS/SMU possesses lat/log information of each ESC and CBSD unit within its domain. SSS has geo-location knowledge of each ESC and CBSD lat/long/elevation location in its geographical area; ESC and CBSD units periodically report to SSS/SMU by transmitting their information location such as lat/long to SSS/SMU.

E) In any SSS functional configurations that implement calculations, via the computerized RF signal propagation model, the SSS/SMU calculates radar RF signal level at each CBSD lat/long within its geographic domain/area of operations. The starting point for propagation calculation(s) of a radar signal will be at the ESC lat/long location. This will be a geographical point where a radar signal is detected by the ESS/ESC. Since ESC/ESS unit is also equipped with the GPS capability, the SSS will have the Lat/Long of where the radar signal was detected. When the ESC/ESS detects the radar signal, the ESC unit also measures a magnitude of the detected radar signal.

In any SSS functional configuration that implements calculations, SSS/SMU uses a predefined RF signal propagation model agreed and endorsed to by the spectrum regulators. The propagation model and applicable algorithms are stored in the SSS memory. The SSS unit would possess the appropriate processor, arithmetic logic unit (ALU) and memory needed to carry out computational models. The SSS/SMU at the minimum would use a "Free Space loss" model to calculate radar signal power level at each CBSD unit within its geographic domain, or geographic area of operations. The "Free Space Loss" model within SSS/SMU calculates a RF radar signal loss by using a frequency of the radar RF signal, and the distance which radar RF signal will travel, or propagate. The antenna gains at ESC and CBSD units are predefined values mandated by the FCC Rules. Since the power of a radar signal is measured by ESC/ESS, and ESC/ESS also identifies a frequency of a radar signal, the SSS/SMU has all necessary parameters to calculate a radar signal level within the SSS geographic domain.

Free Space Loss Model Calculation Algorithm implemented by SSS/SMU for configuration that utilizes calculations is referenced in this patent, but other RF propagation models could be used as well. The SSS/SMU determines if a detected radar signal power impacts CBSD units. If SSS/SMU calculates that radar power of a detected radar signal is below the regulatory threshold the CBSD unit is allowed to operate.

In another embodiment the determination of protection zones CBSD/AP/Hub units in functional configurations without the use of calculations. For example, in the functional configuration (3) and 3A), CBSD/AP/Hub units would have (ESC) spectrum sensing capability built in and as such CBSD would detect radar signals. In this architecture SSS would not utilize separate ESC units. Upon detection of a radar signal, the CBSD units transmit detection of a radar signal to the SSS/SMU. In addition CBSD units would also measure the radar signal strength. Once CBSD units obtain power of a radar signal, the CBSD units would also transmit this value, or this information to SSS/SMU. In this architecture the SSS/SMU has information which CBSD devices have detected radar signal, and also SSS/SMU would also have knowledge about power level of the detected radar signal at a (lat/long) location of each CBSD unit. In this configuration, the CBSD unit, or the SSS/SMU compares the power threshold value of a radar signal at each CBSD (lat/long) location with the FCC regulatory threshold value or criteria which either allows or disallows CBSD operation. The CBSD units which are found to conform to the FCC power threshold value, or FCC set of criteria, for radar signals are allowed to operate. The SSS/SMU has enough information to determine which CBSD units are NOT allowed to operate without having to perform propagation calculations.

Through a comparison process described previously, and from a list of CBSD units which are not allowed to operate, the SSS/SMU develops geographic protection zones by another method. For example, All functional configurations 1-4 listed in this patent would apply the following radar signal comparison process and, or an additional RF comparison process to determine if a specific CBSD unit would be allowed to operate. Depending on which configuration is used each of SSS elements such as SMU, ESC, and CBSD could have the ability to apply and to conduct the following comparison process:

Radar Signal Power is one of the criteria to be evaluated and Power of a Radar Signal is a variable within a program code. The FCC criteria for deactivating CBSD units is expected to be a static value, or perhaps multiple values. In addition to radar power of a detected signal, the FCC criteria may also include PRF, PRI and Pulse Width of a radar signal. Hence the FCC criteria may be a set of multi variables. These values would be stored within a computer memory. The SSS/SMU/ESC/CBSD utilizes computer code and or hardware to execute comparison between different variables.

Radar Signal Power Comparison Process by SSS/SMU/ESC/CBSD (XX and YY Represent Numerical Values)

Comparison Case A); Through a software comparison process SSS/SMU/ESC/CBSD determines whether the Radar Signal Power Level YY (expressed in dBm, or dBm/MHz) which is detected at ESC No. (XX) (lat/long) or CBSD No. (XX) (lat/long location) is equal to the FCC Power Level allowed? If the answer is Yes; Then, allow CBSD to operate.

Comparison Case B); Through a software comparison process SSS/SMU/ESC/CBSD determines whether the Radar Signal Power Level YY (in dBm, or dBm/MHz) which is detected at (ESC) No. (XX) (lat/long) or CBSD No. (XX) (lat/long location) is greater than, or exceeds the FCC Power level allowed? If the answer is Yes; Then, do not allow CBSD to operate.

Comparison Case C); Through a software comparison process SSS/SMU/ESC/CBSD determines whether the Radar Signal Power Level YY (in dBm, or dBm/MHz) which is detected at ESC No. (XX) (at/long) or CBSD No, (XX) (lat/long location) is less than the FCC Power allowed? If the answer is Yes; Then, allow CBSD to operate.

Additional Radar Signal RF Characteristics Comparison Process used By SSS/SMU/ESC/CBSD creates another embodiment. For example, the SSS/SMU/ESC/CBSD may apply an additional set of criteria which checks for to see if these values are within an acceptable range of regulatory criteria. In its future Rules, FCC may decide to impose the additional set of radar criteria for detection of a radar signal. The FCC additional criteria may also include PRF, PRI, Pulse Width of a radar signal to be detected.

Comparison Case D) Through a software comparison SSS determines whether the Radar signal detected characteristics (such as power level, PRI, PRF, Bandwidth, pulse widths) at ESC No. (XX) lat/long, or CBSD No. (XX) (lat/long location) are within the allowed set of FCC criteria? If the answer is Yes; Then, allow CBSD to operate.

Comparison Case E) Through a software comparison SSS determines whether the Radar Signal detected characteristics (such as power level, PRI, PRF, Bandwidth, pulse widths) at ESC No. (XX) lat/long, or CBSD No. (XX) (at/long location) are not within the allowed set of FCC criteria? If the answer is Yes; Then, do not allow CBSD to operate. SSS/SMU compiles two lists of CBSD units for the SSS area of operations. A list of CBSD units which are allowed to operate, and a list of CBSD units which are not allowed to operate. The list of CBSD units which are not allowed to operate would be called a forbidden list.

Comparison Case F) From a "Forbidden, or not allowed to operate" CBSD digital list, the SSS/SMU generates the geographic protection zones. The geographic protection zone(s) enclose the CBSD units which are not allowed to operate within a geographical area. Geographic protection zones are represented by Polygons or circles and are defined by the lat/long points which are enclosed by polygons or circles.

Comparison Case G) For the CBSD units which are on a "forbidden, or not allowed to operate" list the SSS/SMU orchestrates migration to other frequencies, or other frequency bands for PA and GA end users. Move to other frequencies, or other frequency band(s) must be executed within the N*60 seconds timeframe. During this time period, the PA end user units are grouped and transferred first. GA end users are grouped and transferred on a secondary basis. The PA and GA that could not be transferred during the N*60 seconds period result in dropped calls, or terminated links. (N can be a value of 1-10).

8.0 The time frame to deactivate impacted CBSD is N*60 seconds time frame. The SSS keeps a list of deactivated CBSD units.

FIG. 16 is a graphical representation of a geographic Protection Zone via a semicircle. Each cross depicts a unique Lat/Long for each CBSD and ESC 1601 devices. The SSS/SMU establishes CBSD Protection zone(s) within a semi-circle, alternately the CBSD protection zone can be represented by dashed lines as a rectangle. In the FIG. 16, the SSS through free space calculations methodology determines that CBSD 12 1605, CBSD 13 1606, CBSD 14 1607, CBSD 21 1602, CBSD 22 1603, CBSD 23 1604 would interfere with operation of an incumbent radar signal. Hence, the emissions of the listed CBSD 12, CBSD 13, CBSD 14, CBSD 21, CBSD 22, CBSD 23 units would have to be turned off, and their operations transferred to another frequency band within the allocated time frame (n*60 seconds).

The question that has to be answered by SSS: Which CBSD units can remain operational and will not be turned off? In certain functional configurations of this patent, the SSS/SMU calculates which units are sufficiently far away, or are blocked by the terrain or man-made obstacles so that at their locations incoming radar emissions would exceed the allowed threshold? The SSS configuration which employs calculation capability utilize following factor values to form a decision whether CBSD would be shut down: 1) Use radar signal power detected 2) Use antenna gain of CBSD, spectrum sensor, or ESC, 3) Use a specific RF Propagation model, or Free Space Loss model to calculate signal loss, 4) Calculate terrain path loss; if data is available, 5) Calculate clutter; if data is available. In order to optimize resources of the SSS network and to serve an optimum number of CBSD, wireless PA and GA users various shapes are possible for protection zones such as circles, squares, rectangles, hexagons, octagons and even triangles.

Calculation for each CBSD, plus an aggregate calculation to include all active CBSD in the geographical area under study and analysis. It should be noted that many protection zones are or may be possible for a certain geographical area in which a radar signal was detected.

Figure 20:
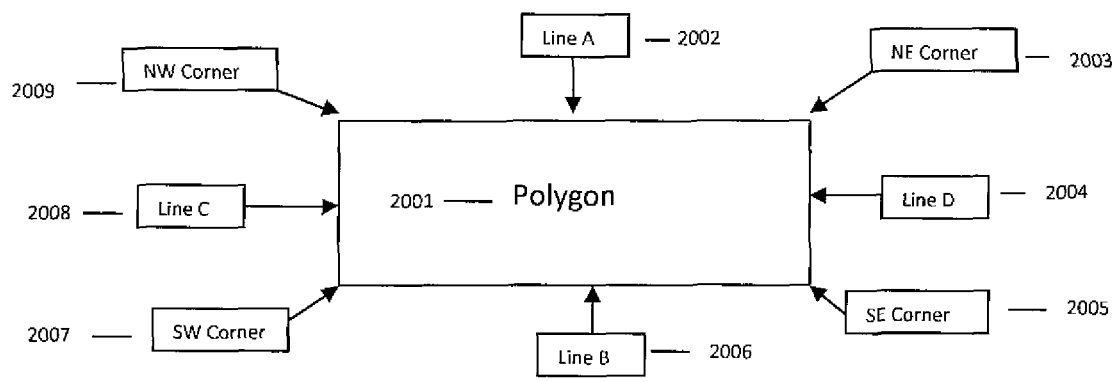
FIG. 20. Depicts a graphical representation of a geographic protection zone via a rectangle.

As shown in FIG. 16 as an exemplary exampole, the SSS utilizes measurements obtained via CBSD devices at CBSD geographical locations. Propagation or free space loss calculations provide radar signal power level at specific locations. If SSS/SMU determines via sensing, or via sensing and calculations, that a radar signal power at a specific CBSD No. (XXX) geographical location is within the regulatory FCC criteria or the FCC predetermined or threshold level, then the CBSD is allowed to operate. If SSS/SMU determines that a radar signal at a specific CBSD geographical location is not within the regulatory FCC conformance for power threshold or predetermined level or criteria, then that specific CBSD No. (XXX) is not allowed to operate. The SSS/SMU will generate protection zones by grouping CBSD units which are not allowed to operate into a protection area. A protection zone can be shaped as a polygon, as depicted in FIG. 20 or a circle or semi-circle as shown in FIG. 16.

SSS/SMU may also have a functional ability to calculate how much signal attenuation propagation loss needs to be induced into each CBSD signal in order to make it conform to the exceeded threshold. SSS/SMU utilizes RF propagation model and terrain data information to calculate free space loss or a path loss for a signal from a CBSD unit to the ESC sensor location.

SSS/SMU utilizes RF propagation model which accounts for free space loss of a RF signal to calculate radar signal loss from CBSD location (at/long) in the area of interest to the ESC sensor location.

SSS/SMU may utilize clutter loss information if it is available to calculate signal attenuation from a boundary generated by ESC sensors.

Additional Distance Separation Needed between CBSD units and an ESC sensor is calculated to be by SSS/SMU=Terrain Loss+Free Space Loss+Clutter Loss.

SSS/SMU establish boundaries for protection zones by generating/drawing polygons, hexagons, octagons, circles, or another geometric shape around CBSDs, or groups of CBSDs that are not allowed to operate and produces/plots results onto a digital map. Polygon Boundaries are identified by specific Lat/Long points which capture and enclose all CBSD units that are not allowed to transmit past N*60 second period into protection zones. Store this information into a digital memory/digital library.

The SSS/SMU transfers information of CBSD units which are not allowed to operate onto a digital area map for the impacted geographical area that is serviced by the specific SSS/SMU, which services impacted CBSD units.

The SSS/SMU utilizes a pre-established propagation model which have been agreed and accepted by the spectrum regulators and industry representatives to calculate radar signal power level at the specific CBSD xx. The SSS compares the calculated radar signal characteristics which includes the power level of a radar signal at CBSD with the allowed FCC regulatory criteria.

Figure 17B:
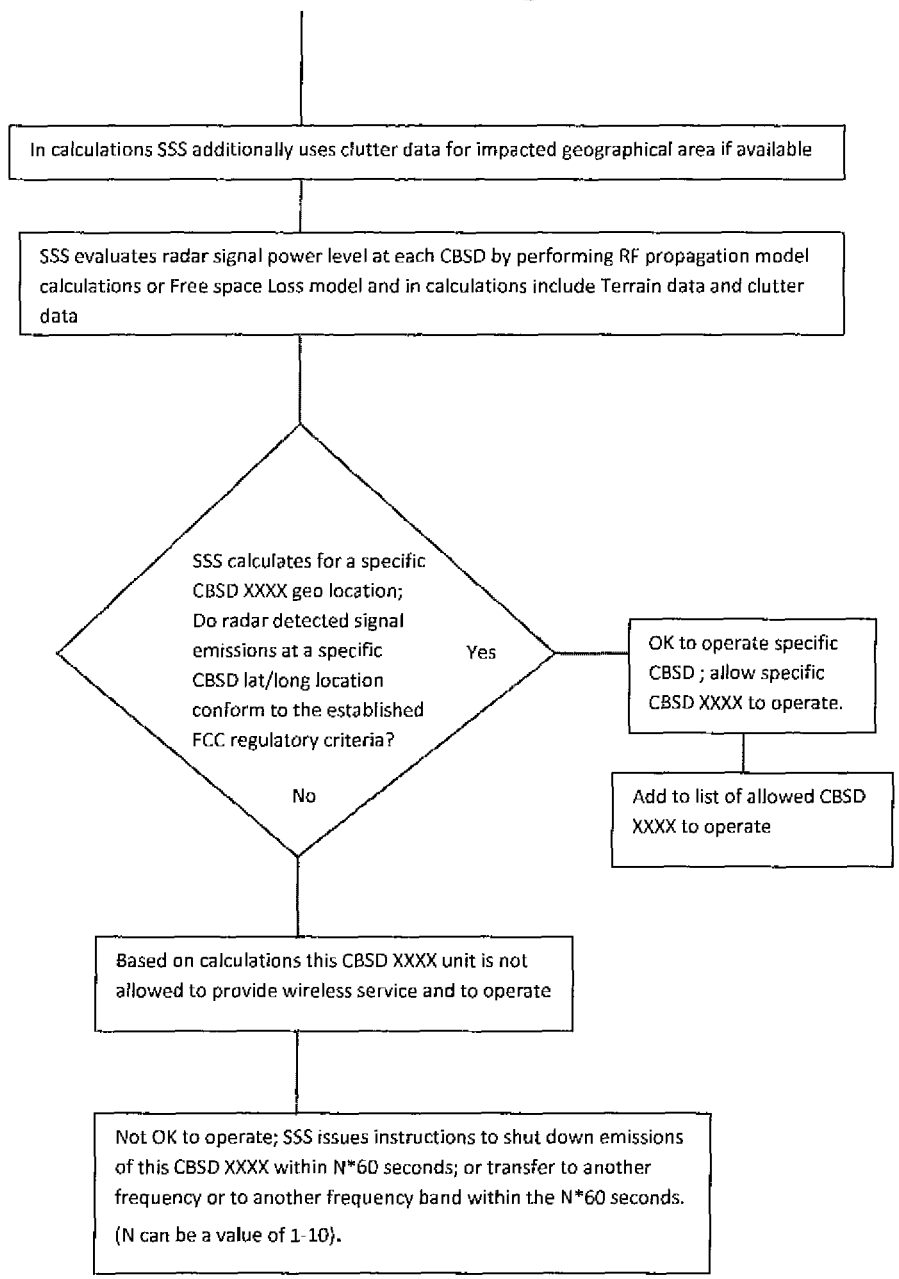

FIGS. 17A and 17B depict a flow chart for an exemplary method to calculating which wireless devices or CBSD units can remain operational upon detection of a radar signal.

FIG. 18 depicts how SSS/SMU determines which impacted CBSD should be placed within protection zones. An example of analytical process to determine which CBSD units remain operational for three CBSD Units using a RF propagation model or a "free space loss" model. Other than "free space" propagation models can also be used in the analysis.

SSS/SMU calculates distances: R1 1806 by subtracting CBSD (11) lat/long 1801 from ESC lat/long 1804. SSS/SMU calculates distances: R2 1808, by subtracting CBSD (12) lat/long 1802 from ESC lat/long 1804. SSS/SMU calculates distances: R3 1807 by subtracting CBSD (13) lat/long 1803 from ESC lat/long 1804.

Since a distance between ESC and a specific CBSD (XX), as well as, the Frequency of operation are known, the SSS is able to calculate a signal loss between ESC and a CBSD (XX) unit. Signal loss would be expressed in dBm, dBw, or watts, or fraction of a watt.

How Distance Calculations are performed by SSS/SMU;
In this example R1 1806=ESC (lat/long) 1804−CBSD 11 (lat/long) 1801; Where Lat/long=degrees; minutes; seconds; R1 1806=ESC (degrees, minutes, seconds) 1804−CBSD 11 (degrees; minutes; seconds) 1801; R1 distance is converted to a single value. R2=ESC (degrees; minutes; seconds)−CBSD 12 (degrees; minutes; seconds); R2 is converted to a single distance value.

How Free Space Loss Calculations are performed by SSS/SMU for Architectures that utilize calculations.

The SSS/SMU implements "Free Space" algorithm to calculate signal loss between ESC and CBSD 11, CBSD 12. Other RF signal propagation models exist, may possibly be used, and can be applied with variable results. (A specific or a certain propagation model not identified in this patent could be required or suggested by the FCC regulators, or could be agreed upon by industry and government).

EXAMPLE

SSS/SMU Calculates Radar Signal Power at CBSD 11=Detected and measured Radar Power at ESC−(20 Log R1 (in kilometers)−20 Log XXXX (Frequency in MHz)+ 32.44 (Constant))+Antenna gain of a CBSD unit in dBi
In this specific example XXXX is a number from 3550 to 3650 MHz.
SSS Calculated Radar Signal Power at CBSD 12=Detected and measured Radar Power at ESC−(20 Log R2 (in kilometers)−20 Log 3XXX (Frequency in MHz)+32.44 (Constant))+Antenna Gain of CBSD unit in dBi−Terrain Loss due to an obstacle; Obstacle can be terrain or manmade.
The XXXX number for Frequency in MHz can be a number from 3550-3650. In essence a number is 3550-3650 MHz. If a received radar signal power at CBSD XX is within the allowed regulatory FCC criteria or a threshold, the specific CBSD unit is allowed to operate. If a received radar signal power at CBSD XX is outside the regulatory FCC criteria or a threshold, then the specific CBSD unit is NOT allowed to operate.

FIG. 19 depicts a geographic protection zone with two wireless devices or CBSD units inside the zone. Grouping CBSD units within a geographical area in which CBSD units are not allowed to operate, the SSS creates protection zones. The protection zones would be identified by boundary points which occur at intersection of lines which make up the polygon. Each node point of a polygon would be identified by a specific lat/long. In this case a node is a corner point. Each CBSD unit is designated by its own lat/long position within the protection zone. While this example uses a four sided polygon which is a rectangle, other polygonal configurations are possible.

FIG. 19 shows the NW lat/long point 1910 and NE lat/long point 1911 establish a northern boundary of a protection zone 1914. The SW lat/long point 1913 and SE lat/long point 1912 establish a southern border of a protection zone 1914. The NW lat/long point 1910 and SW lat/long point 1913 establish a western boundary of a protection zone 1914. The NE lat/long point and SE lat/long point establish an eastern boundary of a protection zone 1914. The ESC lat/long 1904 location is R3 1909 distance from CBSD13 lat/long 1905, and R1 1908 from CBSD 11 lat/long 1903, and is R2 1907 distance from CBSD 12 lat/long 1902.

In this example, it is determined by SSS/SMU that at CBSD 13 lat/long 1905 the regulatory criteria for radar signal power threshold level, and possibly other regulatory statute, is NOT exceeded. The SSS/SMU also determines that at CBSD 11 1903 lat/long location and CBSD 12 1902 lat/long location the FCC regulatory criteria is exceeded. One or more SSS elements contain in their memory the FCC regulatory criteria for a detected radar signal which specifies acceptable RF characteristics that allow CBSD to operate. If a detected radar signal falls outside the acceptable FCC regulatory limits at the CBSD location, that specific CBSD xx will not be allowed to operate within 3550-3650 MHz spectrum. Grouping of two CBSD units CBSD 11 1903 and CBSD 12 1902 which do not meet the FCC criteria are grouped into a protection zone.

FIG. 20 depicts another embodiment of how SSS/SMU establishes reference points for protection zones and boundaries for protection zones. Specifically in FIG. 20, a rectangle 2001 with four sides are identified and corners are identified by lat/long points. SSS utilizes points of reference to perform distance calculations. The SSS determines either via sensing or via calculations, or via sensing and calculations that detected radar signals will not exceed FCC regulatory limits beyond the borders of a polygon. In this example, polygon has four sides which include northern border/side, southern border/side, western border/side and eastern border/side.

While this patent utilizes equator and Greenwich meridian as reference points, it is possible to implement polygons as geographic protection zones utilizing other geographical locations as reference points. The Equator will be used as a reference point for latitude; Greenwich will be used as a reference point for longitude.

The following is an example of the creation of a list for each CBSD protection zone. Protection Zone has the following points associated with it. North West corner which is a node; North East corner which is a node; South West corner which is a node; South East corner which is a node; Following Designators.

NW Lat/Long node; NE Lat/Long node; SW Lat/Long node; SE Lat/Long node;

From previous analysis and in FIG. 19, the SSS determines that CBSD 11 Lat/Long and CBSD 12 Lat/Long will be enclosed in the protection zone.

Important: SSS establishes the following convention for establishing of Protection Zones NW Lat node point; and NE Lat node point; will be at the Higher Latitude than CBSD 11 Lat and CBSD Lat 12; As shown in a previous example FIG. 19.

SW Lat node point; and SE Lat node point; will be at the Lower Latitude than CBSD 11 Lat and CBSD Lat 12; As shown in a previous example FIG. 19.

NW Long node point; and SW Long node point; will be at the Lower Value of Longitude than CBSD 11 Lat and CBSD Leat 12; As shown in a previous example FIG. 19.

NE Long node point; and SE Long node point; will be at the Higher Value of Longitude than CBSD 11 Lat and CBSD Lat 12; As shown in a previous example FIG. 19.

Polygon has four corner node points which define the four corners, and these are NW, NE, SW and SE.

The SSS establishes Line (A) 2002 also called the upper (northern) boundary which is generated and defined by the CBSD which is on the forbidden list and has the latitude located furthest from the equator. Line (A) runs parallel to equator which is zero degree latitude line. The SSS establishes Line (B) 2006 also called the lower (southern) boundary which is generated and defined by CBSD which is on the forbidden list and has the latitude located closest to the equator. Line (B) runs parallel to the equator which is zero degree latitude line. The SSS established Line (C) 2008 also called the western boundary which is generated and defined by CBSD which is on the forbidden list and has the longitude located furthest from Greenwich meridian. Line (C) runs parallel to Greenwich meridian which is zero degree longitude line.

The SSS establishes Line (D) 2004 also called the eastern boundary which is generated and defined by CBSD which is on the forbidden list and has the longitude located closest to Greenwich meridian. Line (D) runs parallel to Greenwich meridian which is zero degree longitude line.

Once SSS determines that a CBSD unit does not conform to the FCC criteria, the CBSD unit needs to be placed inside of a specific and a geographic protection zone. One or many geographic protection zones may be possible in a geographic area and in cities, towns, or large metropolitan areas. In order for CBSD to be placed inside a protection zone, SSS/SMU compares lat/long of each CBSD location from its electronic list with following conditions represented in FIG. 20:

With Latitude of upper (northern) boundary of a polygon which is Line A 2002

With Latitude of lower (southern) boundary of a polygon which is Line B 2006

With Longitude of west boundary of a polygon which is line C 2008

With Longitude of east boundary of a polygon which is line D 2004

The SSS/SMU generates a geographic protection zone based on factors evaluated and described in this patent. Providing that the CBSD device is not allowed to operate, and that all four lat/long conditions listed below for the specific CBSD unit are met and applicable, the SSS/SMU will add the specific CBSD unit to the inside area of a geographic protection zone:

Condition 1) If latitude of a CBSD unit being evaluated is less than latitude of an upper/northern boundary of a polygon which creates the geographic protection zone

&

Condition 2) If latitude of a CBSD unit being evaluated is greater than latitude of a lower/southern boundary of a polygon which creates the geographic protection zone

&

Condition 3) If longitude of a CBSD unit being evaluated is less than longitude of a west boundary of a polygon which creates the geographic protection zone

&

Condition 4) If longitude of a CBSD unit being evaluated is greater than longitude of an east boundary of a polygon which creates the geographic protection zone If a CBSD device is not allowed to operate and has met ALL four lat/long conditions stated above are applicable, that CBSD device will be identified as a CBSD device that belongs inside of a geographic protection zone. The SSS/SMU generates a list of CBSD devices which violate FCC criteria for the power threshold level and meet the above four (latitude/longitude) conditions. CBSD devices within a polygon are on a list by which SSS does not allow CBSD devices to operate. The SSS has determined that all CBSD units enclosed within a polygon are potential interferers to the radar system and need to be deactivated within the N*60 seconds time frame.

It is further contemplated that upon radar detection the SSS can perform a method to transfer PA and GA devices or end users to other frequency bands. The method can also include means for PA and GA users to be grouped, structured, ranked, and prepared to be transferred by SSS/SMU to other frequency bands.

One exemplary example would have the SSS/SMU keep an electronic log of the occupied RF channels in the current frequency band of operations within its geographical coverage. Additionally, the SSS/SMU also keeps a log of alternate frequency bands which are available for migration within its geographical coverage. The SSS may interact and check channel availability within providers of other wireless networks which service alternate frequency bands and which also service the same geographical area of coverage.

The SSS/SMU and CBSD can transfer operations to the alternate frequency bands used by SSS' own network or by other telecom wireless providers. Additionally, the SSS/SMU may possess an up to date listing of geographical locations of Access Points, Hubs, eNoB, and Base Stations which operate in the alternate frequency bands. When migration from current spectrum is necessary due to a detection of radar signal, the SSS/SMU performs the following functions and associated steps:

Level 1 End Users are also referred to as PA (Priority Access) users and Level 2 End Users are also referred to as GA (General Access) users. CBSD (Citizen Broad Band Radio Device) units are also referred to as Hubs, Access Points (AP), eNoB as previously depicted in FIG. 13, and FIG. 13A.

As PA and GA devices attach to the CBSD unit, the CBSD queries them and obtains information about PA and GA (end user) devices ability to access and to operate in other frequency bands. Hence, each CBSD within SSS network has at its disposal a real time knowledge which PA and which GA wireless user can access and functionally operate in the alternate frequency bands.

SSS/SMU, CBSD has information about PA's and GA's capability to access different frequency bands such as but not limited to: 800-900 MHz band; 1710-1750 MHz, 1850-1990

MHz; 5400-5700 MHz frequency bands to name a few, and other bands in which PA and GA users can function and operate. SSS/SMU, as well as CBSD, generates, updates and maintains a real time list of PA and GA wireless users it is servicing. For each PA or GA wireless user device the CBSD specifies which other frequency bands PA and GA devices can access and operate. The CBSD relays information to SSS/SMU about PA and GA user's ability to function in other frequency bands and other parts of the spectrum.

1) Upon a detection of a Radar Signal by the spectrum sensor within the SSS network domain.

2) SSS/SMU identifies through spectrum sensing and, or through propagation analysis which CBSD units must be deactivated and to stop operation within N*60 seconds in order to mitigate interference to the incumbent that is the primary spectrum user which in this case is radar system. The SSS will make a determination which CBSD are to be deactivated based on the detected radar signal levels and the established FCC regulatory thresholds and the FCC criteria for the detected radar signals. If conditions require, the SSS will deactivate CBSD operation within a timeframe of N*60 seconds, where N is a number 1-10 and N can be an integer, a decimal number, or a fraction.

3) SSS/SMU and impacted CBSD execute a process to switch PA and GA users to other frequencies within 3550-3650 MHz frequency band which have not been impacted by radar signals. There are cases where SSS/SMU determines that available frequencies within the current frequency band cannot satisfy a relocation of impacted CBSD devices in order to accommodate all end users which are occupying the spectrum that is being used, and in this case it is the 3550-3650 MHz frequency band. In those cases, in which SSS/SMU and CBSD devices determine that a certain number of PA and GA wireless users could not be reassigned, or switched to the alternate channels, or alternate frequencies within 3550-3650 MHz, then the SSS/SMU and CBSD(s) execute a switch of GA and PA users to the alternate frequency bands.

4) Through a comparison process of available frequency bands that could support CBSD function, SSS/SMU identifies Alternate Frequency bands that are supportable by PA and GA End User devices.

5) SSS/SMU Identifies groups of PA and GA wireless users associated and supported with each CBSD within the SSS domain. These PA and GA end users are located within a supportable distance away from a CBSD, or a base station, or a wireless hub that supports services for PA and GA end users. In this case CBSD supports PA and GA wireless users if they are associated with a particular CBSD unit, and CBSD unit is providing a wireless service to the PA and GA wireless devices.

5) SSS/SMU Generate a list in a digital format of CBSD PA end user groups to be transferred to the alternate spectrum, and SSS Generates a list in a digital format of CBSD GA user groups to be transferred to the alternate spectrum 6) In its area of operations, the SSS/SMU checks to determine if sufficient amount of bandwidth, or spectrum exists to satisfy the channel transfer in the alternate frequency band(s) and on other wireless networks. Through request and acknowledgment process with other wireless networks, the SSS/SMU identifies vacant channels, channel bandwidths, and their channel center frequencies in the alternate frequency band(s) and within its area of operations on wireless networks that service the same geographical area.

Upon a SSS/SMU determination that switch to other frequency bands needs to be carried out, the following steps take place:

A) The SSS/SMU and or CBSD queries spectrum controllers from alternate frequency bands which could belong to alternate service providers, that are located within 0-3000 meter range of CBSD which is seeking transfer, to find out whether these wireless networks have free and available RF channels that can accommodate and accept PA and GA wireless users. The CBSD ensures that the signal quality such as Signal to Noise (S/N) ratio, of "alternate" spectrum controllers, is of sufficient quality in order to engage with them. The "alternate" spectrum controllers that support broadband communications and operations in alternate frequency bands may belong to other wireless network providers, or even to the same network provider as the SSS. The "alternate" network spectrum controllers reply back to SSS and or to CBSD units with information about their channel availability. The "alternate" spectrum controllers via a reply indicate to CBSD and to SSS whether they can provide available channels for PA and GA wireless users and also which alternate frequency band can accept PA or GA wireless users.

B) SSS/SMU Identifies Available and Unoccupied Channels and spectral resources in the Alternate Spectrum. The SSS sends a request to a controller responsible for use of RF channels in alternate bands. As a reply, the controller for another frequency band sends an acceptance to SSS informing and allowing SSS of a number of channels available to accept transfer from 3550-3650 MHz frequency band.

C) SSS/SMU and CBSD engage in the transfers of groups of PA end users first to the alternate frequency band(s). The SSS/SMU and CBSD engage in transfer of GA Groups of users on the secondary basis to the alternate frequency band(s).

The CBSD execute transfer of PA and GA users to the alternate spectrum, and during that time, SSS/SMU keeps a count how many of PA and GA end users and which PA end users and which GA users have been transferred to the alternate frequency bands.

D) SSS/SMU Keeps a Real Time Log and count for each PA and GA end user groups being transferred and log of geographical base stations, AP and Hubs which accepted the transfer of users from 3550-3650 MHz band. Multiple PA and GA counters are made available by SSS/SMU for this purpose. For each PA cluster group, SSS/SMU loads a counter with PA users to be transferred to alternate frequency band(s), or alternate spectrum. For each GA cluster group, SSS loads a separate counter with GA users that need to be transferred to alternate frequency band(s), or alternate spectrum. As each PA user is transferred to other bands the real time PA counter within SSS/SMU is decremented by 1. Only after PA users have been transferred, SSS/SMU initiates transfer of GA users. As each GA user is transferred to other bands the real time GA counter within SSS/SMU is decremented by 1;

Once Transferred to alternate spectrum, or alternate frequency band(s), the PA and GA end users are deleted from the system log/list D) SSS/SMU tries to complete Transfer of all PA and GA end user groups to the alternate frequency bands supportable by the end user devices within the N*60 second period such that end users operations not transferred to another frequency band during allocated period N*60 seconds will be terminated.

E) CBSD Cease Operations within the impacted frequency band within N*60 seconds timeframe. For this application and in this case, N is a real number, a decimal, integer or a fraction from 1-10.

Process of how PA and GA end users are grouped for purpose of transfer to another frequency band Transfer of operations from 3550-3650 MHz frequency band to an alternate band in predetermined geographical areas The SSS/SMU generates and keeps a real time list of CBSD operations and active PA and GA users with the following format.

(CBSD Unit # Lat, Long) in the operations (Area #) has (PA units associated) with; has (GA units associated) with that specific CBSD A Record Structure kept by SSS/SMU, where XXXX designates a number assigned to a specific wireless device.

Priority Access (PA) user is assigned, or given a value by SSS/SMU which ranks this user at a higher level than a General (GA) User.

CBSD Number (XXXX); [CBSD specific Location=Latitude, Longitude] [Frequency band 3100-3650 MHz] has PA and GA users attached and is servicing them in real time. A record of each CBSD spectrum PA or GA user has a following description. CBSD transmits this PA and GA information to the SSS in real time. The SSS/SMU generates and maintains a map of all CBSD units and associated PA as well as GA units that are utilizing spectrum within the geographical domain that belongs to the specific SSS network.

Process of how PA and GA User Elements are Structured/Formatted, Ranked and Transferred by SSS to Other Frequency Bands Associated with a wireless network in another frequency band.

SSS/SMU utilizes the following format and associated variables for PA and GA wireless users. The PA users from group 1 are clustered together. The GA users from group 2 are clustered together.

SSS/SMU Facilitates the Following List Format for PA and GA Groups (PA Group 1) [Type of a user/Priority Access User] [Unit/User Number, Channel Number; Channel Center frequency; Modulation Type; Data throughput; Channel Bandwidth being used, or occupied; Emission Power;]

(GA Group 2) [Type of a user/General Access User] [Unit/User Number; Channel Number, Chanel Center frequency; Modulation Type; Data throughput; Channel Bandwidth being used, or occupied; Emission Power;]

An example of the record list and record grouping generated and maintained by CBSD and transmitted-relayed to the SSS.

CBSD Unit (X101) Latitude Longitude operating in 3550-3650 MHz Frequency band has following PA and GA users associated.

GROUP 1 PA (Priority Access) FORMAT

Example of Class/Group 1 (PA) List/Log with 3 Users (Group 1) [Type of a user/Priority Access] [Unit/user 01; Channel 01; 3560 MHz; 32 QAM; 1 Mbps; 10 MHz; 10 dBm]

(Group 1) [Type of a user/Priority Access] [Unit/user 02; Channel 02; 3580 MHz; 32 QAM; 1 Mbps; 10 MHz 10 dBm]

(Group 1) [Type of a user/Priority Access] [Unit/user 03; Channel 03; 3600 MHz; 32 QAM; 1 Mbps; 10 MHz; 10 dBm]

GROUP 2 GA (General Access) FORMAT

Example of Class/Group 2 (GA) List/Log with 2 Users (Group 2) [Type of a user/General Access] [Unit/user 01; Channel 04; 3640 MHz; 16 QAM; 1/2 Mbps; 5 MHz; 05 dBm]

(Group 2) [Type of a user/General Access] [Unit/user 02; Channel 04; 3620 MHz; 16 QAM; 1/2 Mbps; 5 MHz; 05 dBm]

Upon radar detection, the SSS handles transfers of hundreds to thousands of CBSD users from 3550-3650 MHz frequency band to another frequency band which provides wireless communication for PA and GA users.

How a Transfer Group of PA and GA Wireless Users is Structured, Prioritized, Ranked and Rearranged or Regrouped During Execution by SSS/SMU SSS/SMU may have a listing of multiple CBSD units and their associated PA and GA wireless users within 3550-3650 MHz frequency band. SSS/SMU creates groups of CBSD units within a predetermined geographical area, and associates Groups of PA and GA wireless users within the same geographical area. Where XX can be represented by any one or two digits.

| Example of a list by CBSD #XX101 by CBSD #XX101 | CBSD #XX101 | PA unit # associated with and serviced<br>GA unit # associated with and serviced |
|---|---|---|
| SSS Grouping of CBSD by CBSD #XX102 units in a by CBSD #XX102 | CBSD #XX102 | PA unit # associated with and serviced<br>GA unit # associated with and serviced |
| Geographical area by CBSD #XX103 by CBSD #XX103 | CBSD #XX103 | PA unit # associated with and serviced<br>GA unit # associated with and serviced |

A SSS end user list is refined and segregated into a ranking order which includes PA users into PRIMARY and GA users into a SECONDARY user group. All PA users are packaged and combined onto List 1. All GA users are packaged and combined onto List 2. Recombination, packaging, and prioritization of PA and GA users takes place by SSS. In a process of transferring to an alternate frequency band, modulation, channel bandwidth and data throughput could be changed for the PA or GA wireless user as the transfer to an alternate frequency bands occurs. After reconfiguration and recombination process a new listing format for PA and GA wireless users according to ranking methodology can be generated.

An SSS end user list is refined and segregated into a ranking order which includes PA users into PRIMARY and GA users into a SECONDARY user group. All PA users are packaged and combined onto List 1. All GA users are packaged and combined onto List 2. Recombination, packaging, and prioritization of PA and GA users takes place by SSS. In a process of transferring to an alternate frequency band, modulation, channel bandwidth and data throughput could be changed for the PA or GA wireless user as the transfer to an alternate frequency bands occurs. After reconfiguration and recombination process a new listing format for PA and GA wireless users according to ranking methodology is provided. The SSS Status processor keeps a track of how many PA users and GA users have been transferred and how many more users need to be transferred.

It is to be understood that the present invention is not limited to the embodiments described above, but encompasses any and all embodiments within the scope of the following claims.

I claim:

1. A method for creating a spectrum sharing system (SSS) to control spectrum access and spectrum sharing of first networked wireless devices by identifying the presence of radar signals in a predetermined frequency band within a defined geographic area, the method comprising:
   a) establishing a spectrum service, the spectrum service being a licensed spectrum service using licensed devices;
   b) selecting a spectrum service;
   c) establishing at least a first and second level of service for the first networked wireless devices, wherein the first level corresponds to priority access and the second level corresponds to general access;
   d) providing a spectrum sensor by itself and/or in conjunction with another SSS wireless network component, wherein the spectrum sensor operates in the selected spectrum service and controls spectrum access for the first networked wireless devices, the spectrum sensor by itself and/or in conjunction with another SSS wireless network component further: i) detects radar signals, ii) identifies the characteristics of the radar signals, iii) establishes at least one radar signal in the predetermined frequency band and determines and identifies radar signals that are in compliance with or not in compliance with the predetermined frequency band, iv) identifies first network wireless devices that cause interference with the at least one radar signal predetermined frequency band, v) establishes geographical longitudinal and latitudinal boundaries around each of the identified first networked wireless devices wherein such boundaries operate as protection zones wherein all identified enclosed wireless devices will not operate within the at least one radar signal predetermined frequency band, vi) exchanges, transmits, or receives data regarding protection zones for second networked wireless devices, vii) allows or denies spectrum access to first networked devices upon presence or lack of presence of radar signals in the predetermined frequency band, and viii) terminates the protection zones upon radar signals no longer being detected or a time period has passed after the radar signals had been detected;
   e) determining alternate spectrum available to the first networked devices;
   f) establishing a timeframe for the first network devices to move to the alternate spectrum or to cease operation; and
   g) determining whether a resumption of service to the first network wireless devices should occur.

2. The method for creating a spectrum sharing system (SSS) according to claim 1, wherein the at least one radar signal predetermined frequency band is within the 3100-3650 MHz spectrum.

3. The method for creating a spectrum sharing system (SSS) according to claim 1, wherein the timeframe for the first network devices to move to the alternate frequency or to cease operation is at least 60 seconds.

4. The method for creating a spectrum sharing system (SSS) according to claim 1, wherein the identified radar characteristics include radar power levels, pulse repetition frequency (PRF), pulse repetition interval (PRI), and pulse width.

5. The method for creating a spectrum sharing system (SSS) according to claim 4, wherein the radar power levels are calculated for each of the protection zones, wherein the calculation includes at least path loss analysis, free space loss equations, terrain data, clutter data, and antenna gain.

6. The method for creating a spectrum sharing system (SSS) according to claim 1, wherein the spectrum sensor, or another SSS wireless network component utilizes a prioritization list of characteristics to rank priority access devices over general access devices.

7. The method for creating a spectrum sharing system (SSS) according to claim 5, wherein the priority access devices are transferred to an alternate spectrum prior to general access devices.

8. A spectrum sharing system (SSS) to control spectrum access and spectrum sharing of first networked wireless devices by identifying the presence of radar signals in a predetermined frequency band within a defined geographic area, the system comprising:
   a) means for establishing a spectrum service, wherein the spectrum service is selected from the group consisting of: licensed spectrum service using licensed devices and unlicensed spectrum service using unlicensed devices;
   b) means for selecting a spectrum service;
   c) means for establishing at least a first and second level of service for the first networked wireless devices, wherein the first level corresponds to priority access and the second level corresponds to general access;
   d) a spectrum sensor by itself or a spectrum sensor in conjunction with another SSS wireless network device, wherein the spectrum sensor operates in the selected spectrum service and controls spectrum access for the first networked wireless devices, the spectrum sensor by itself or a spectrum sensor in conjunction with another SSS wireless network device includes means for: i) detecting radar signals, ii) identifying the characteristics of the radar signals, iii) establishing at least one radar signal in the predetermined frequency band and determines and identifies radar signals that are in compliance with or not in compliance with the predetermined frequency band, iv) identifying first network wireless devices that cause interference with the at least one radar signal predetermined frequency band, v) establishing geographical longitudinal and latitudinal boundaries around each of the identified first networked wireless devices wherein such boundaries operate as protection zones wherein all identified enclosed wireless devices will not operate within the at least one radar signal predetermined frequency band, vi) exchanging, transmitting, or receiving data regarding protection zones for second networked wireless devices, vii) allowing or denying spectrum access to first networked devices upon presence or lack of presence of radar signals in the predetermined frequency band, and viii) terminating the protection zones upon radar signals no longer being detected or a time period has passed after the radar signals had been detected;
   e) means for determining alternate spectrum available to the first networked devices;
   f) means for establishing a timeframe for the first network devices to move to the alternate spectrum or to cease operation; and
   g) means for determining whether a resumption of service to the first network wireless devices should occur.

9. The spectrum sharing system to control spectrum access according to claim 8, wherein the at least one radar signal threshold frequency band is within 3100-3650 MHz spectrum.

10. The spectrum sharing system to control spectrum access according to claim 8, wherein the timeframe for the first network devices to move to the alternate frequency or to cease operation is at least 60 seconds.

11. The spectrum sharing system to control spectrum access according to claim 8, wherein the identified radar characteristics include radar power levels, pulse repetition frequency (PRF), pulse repetition interval (PRI), and pulse width.

12. The spectrum sharing system to control spectrum access according to claim 11, wherein the radar power levels are calculated for each of the protection zones, wherein the calculation includes at least path loss analysis, free space loss equations, terrain data, clutter data, and antenna gain.

13. The spectrum sharing system to control spectrum access according to claim 8, wherein the spectrum sensor by itself or another SSS wireless network component utilizes a prioritization list of characteristics to rank priority access devices over general access devices.

14. The spectrum sharing system to control spectrum access according to claim 13, wherein the priority access devices are transferred to an alternate spectrum prior to general access devices.

15. The spectrum sharing system to control spectrum access according to claim 8, wherein the spectrum sensor is disposed in the wireless device.

16. A method for creating a spectrum sharing system (SSS) to control spectrum access and spectrum sharing of first networked wireless devices by identifying the presence of radar signals in a predetermined frequency band within a defined geographic area, the method comprising:
   a) establishing a spectrum service, the spectrum service being an unlicensed spectrum service using unlicensed devices;
   b) selecting a spectrum service;
   c) establishing at least a first and second level of service for the first networked wireless devices, wherein the first level corresponds to priority access and the second level corresponds to general access;
   d) providing a spectrum sensor by itself and/or in conjunction with another SSS wireless network component, wherein the spectrum sensor operates in the selected spectrum service and controls spectrum access for the first networked wireless devices, the spectrum sensor by itself and/or in conjunction with another SSS wireless network component further: i) detects radar signals, ii) identifies the characteristics of the radar signals, iii) establishes at least one radar signal in the predetermined frequency band and determines and identifies radar signals that are in compliance with or not in compliance with the predetermined frequency band, iv) identifies first network wireless devices that cause interference with the at least one radar signal predetermined frequency band, v) establishes geographical longitudinal and latitudinal boundaries around each of the identified first networked wireless devices wherein such boundaries operate as protection zones wherein all identified enclosed wireless devices will not operate within the at least one radar signal predetermined frequency band, vi) exchanges, transmits, or receives data regarding protection zones for second networked wireless devices, vii) allows or denies spectrum access to first networked devices upon presence or lack of presence of radar signals in the predetermined frequency band, and viii) terminates the protection zones upon radar signals no longer being detected or a time period has passed after the radar signals had been detected;
   e) determining alternate spectrum available to the first networked devices;
   f) establishing a timeframe for the first network devices to move to the alternate spectrum or to cease operation; and
   g) determining whether a resumption of service to the first network wireless devices should occur.

17. The method for creating a spectrum sharing system (SSS) according to claim 16, wherein the at least one radar signal predetermined frequency band is within the 3100-3650 MHz spectrum.

18. The method for creating a spectrum sharing system (SSS) according to claim 16, wherein the timeframe for the first network devices to move to the alternate frequency or to cease operation is at least 60 seconds.

19. The method for creating a spectrum sharing system (SSS) according to claim 16, wherein the identified radar characteristics include radar power levels, pulse repetition frequency (PRF), pulse repetition interval (PRI), and pulse width.

20. The method for creating a spectrum sharing system (SSS) according to claim 16, the radar power levels are calculated for each of the protection zones, wherein the calculation includes at least path loss analysis, free space loss equations, terrain data, clutter data, and antenna gain.

* * * * *